United States Patent
Islam et al.

(10) Patent No.: US 12,382,541 B2
(45) Date of Patent: *Aug. 5, 2025

(54) SYSTEMS, METHODS, AND DEVICES FOR SIGNALING FOR POWER SAVING

(71) Applicant: Apple Inc., Cupertino, CA (US)

(72) Inventors: Toufiqul Islam, Santa Clara, CA (US); Hong He, San Jose, CA (US); Qiaoyang Ye, San Jose, CA (US); Honglei Miao, Munich (DE); Dae Won Lee, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/335,762

(22) Filed: Jun. 15, 2023

(65) Prior Publication Data

US 2023/0389125 A1    Nov. 30, 2023

Related U.S. Application Data

(63) Continuation of application No. 17/265,312, filed as application No. PCT/US2019/051214 on Sep. 16, 2019, now Pat. No. 11,729,857.

(Continued)

(51) Int. Cl.
*H04W 76/28* (2018.01)
*H04W 52/02* (2009.01)
*H04W 72/23* (2023.01)

(52) U.S. Cl.
CPC ....... *H04W 76/28* (2018.02); *H04W 52/0216* (2013.01); *H04W 52/0235* (2013.01); *H04W 72/23* (2023.01)

(58) Field of Classification Search
CPC ............ H04W 76/28; H04W 52/0216; H04W 52/0235; H04W 72/23; H04W 72/535;
(Continued)

(56) References Cited

U.S. PATENT DOCUMENTS

| 9,872,252 B1 | 1/2018 | Ang | |
| 12,048,047 B2 * | 7/2024 | Shi | H04W 76/28 |

(Continued)

FOREIGN PATENT DOCUMENTS

| CN | 102210109 | 10/2011 |
| CN | 102450060 | 5/2012 |

(Continued)

OTHER PUBLICATIONS

International Search Report and Written Opinion for Application No. PCT/US2019/051214; Jan. 30, 2020.

(Continued)

*Primary Examiner* — Rownak Islam
(74) *Attorney, Agent, or Firm* — Kowert, Hood, Munyon, Rankin & Goetzel, P.C.

(57) ABSTRACT

Systems, Methods, Devices, and Apparatuses for power saving are provided. In at least one embodiment, a device may be configured for discontinuous reception (DRX) mode and further receive signaling indicating whether or not to wake and/or may receiving signaling indicating whether or not to go-to-sleep. The signaling may be implemented as group-specific signaling.

20 Claims, 20 Drawing Sheets

Related U.S. Application Data

(60) Provisional application No. 62/732,466, filed on Sep. 17, 2018.

(58) Field of Classification Search
CPC .............. H04W 68/02; H04W 52/0229; H04W 52/028; H04L 1/08; H04L 5/001; H04L 5/0053; H04L 5/0055; H04L 5/0098; Y02D 30/70
USPC .......................................................... 370/311
See application file for complete search history.

(56) References Cited

U.S. PATENT DOCUMENTS

| | | | |
|---|---|---|---|
| 2007/0109987 A1 | 5/2007 | Kohlmann | |
| 2016/0286603 A1 | 9/2016 | Vajapeyam | |
| 2018/0332655 A1 | 11/2018 | Ang | |
| 2020/0037247 A1 | 1/2020 | Liao | |
| 2020/0037396 A1* | 1/2020 | Islam | H04W 52/0229 |
| 2020/0092073 A1 | 3/2020 | Papasakellariou | |
| 2020/0187293 A1* | 6/2020 | Kuang | H04W 76/28 |
| 2021/0168719 A1* | 6/2021 | Sugiyama | H04W 52/0235 |
| 2021/0195521 A1 | 6/2021 | Muller | |
| 2021/0314866 A1 | 10/2021 | Lee | |
| 2021/0368438 A1 | 11/2021 | Li | |

FOREIGN PATENT DOCUMENTS

| | | |
|---|---|---|
| CN | 103636264 | 3/2014 |
| CN | 104205993 | 12/2014 |
| KR | 10-2018-0020168 | 2/2018 |
| WO | 2015018045 | 2/2015 |
| WO | 2018132100 | 7/2018 |
| WO | 2018175760 | 9/2018 |
| WO | 2019030335 | 2/2019 |

OTHER PUBLICATIONS

Ericsson "Wake-up signal configurations and procedures for NB-IoT"; R101805855 3GPP TSG RAN WG1 Meeting #93; May 11, 2018.

Ericsson "DRX with short on-Duration and Wake-up signaling"; R2-1811627 3GPP TSG RAN WG2 #103; Aug. 10, 2018.

Qualcomm Incorporated "Efficient monitoring of DL control channels"; R1-1804914 3GPP TSG RAN WG1 Meeting #92bis: Apr. 7, 2018.

International Preliminary Report on Patentability for Application No. PCT/US2019/051214; Sep. 8, 2020.

Office Action for CN Patent Application No. 201980060692.X; Jan. 17, 2024.

Notice of Grant for CN 201980060692X; Feb. 21, 2025.

* cited by examiner

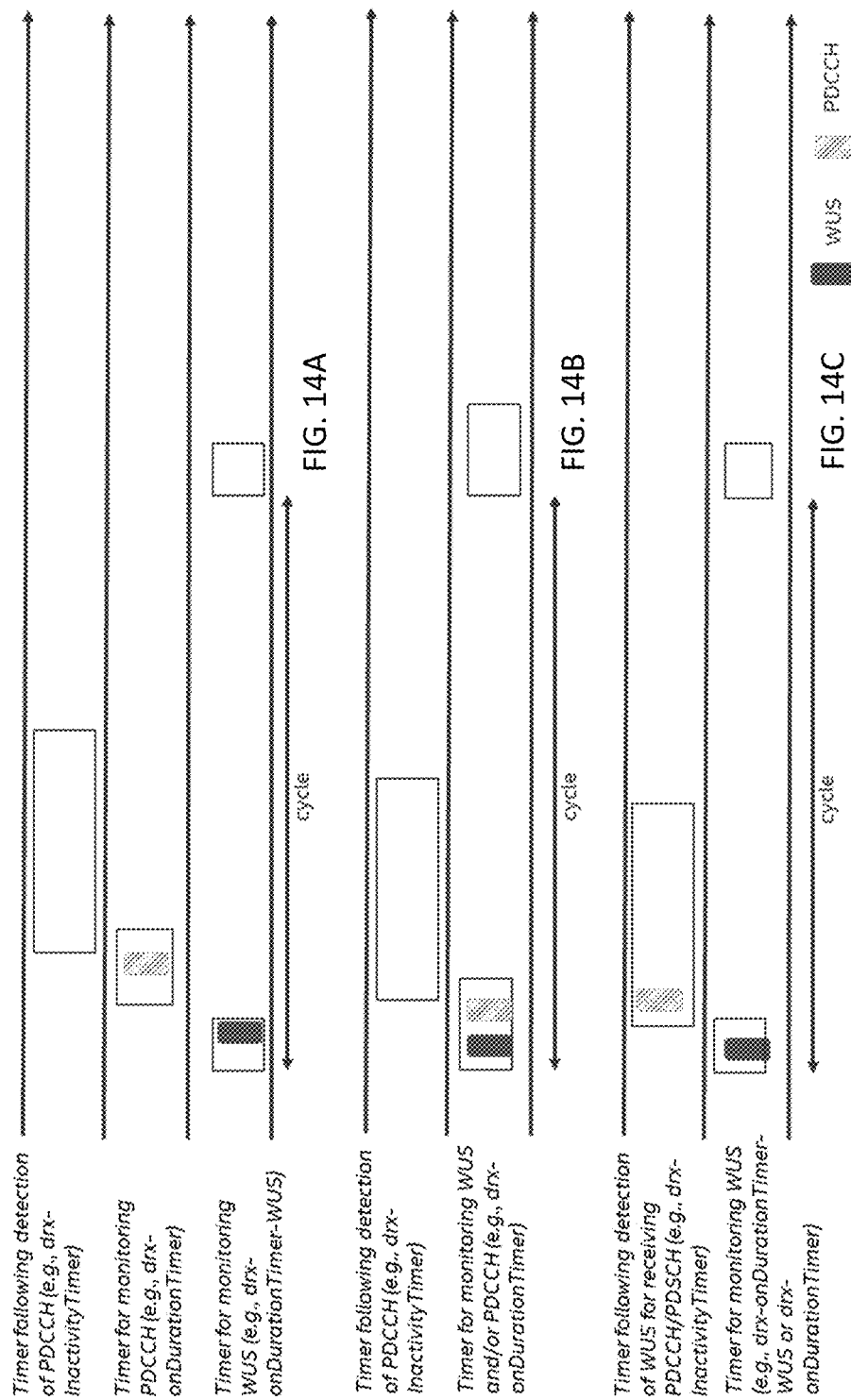

SYSTEMS, METHODS, AND DEVICES FOR SIGNALING FOR POWER SAVING

RELATED APPLICATION(S)

This application is a continuation of U.S. application Ser. No. 17/265,312, titled "Systems, Methods, and Devices for Signaling for Power Saving", filed Feb. 2, 2021, which is a national phase entry of PCT Application No. PCT/US2019/051214, titled "Systems, Methods, and Devices for Signaling for Power Saving", filed Sep. 16, 2019, which claims the benefit of priority to U.S. Provisional Application No. 62/732,466, titled "Control Channel Signaling for UE Power Saving", filed Sep. 17, 2018. The aforementioned applications are hereby incorporated by reference in their entireties as though fully and completely set forth herein.

TECHNICAL FIELD

Various embodiments relate generally to the field of wireless communications.

BACKGROUND

Energy efficiency is of paramount importance for operation of UEs (e.g., 5G/NR UEs), which may have a diverse range of supported applications compared to LTE devices. In particular, energy consumption should be low when no data is expected/received by the UE. For example, traffic pattern in many 5G use cases can be bursty and served in short durations. Dynamic UE transition between active state and sleep state may facilitate improved UE power consumption. In particular, control channel monitoring in RRC_connected mode that does not result in any data transmission contributes to a significant portion of UE power consumption. Hence, some network assistance mechanisms can be used to reduce unnecessary PDCCH monitoring operation and trigger the UE to sleep whenever possible.

Furthermore, in NR, control channel monitoring, operation bandwidth, and many other transmission parameters are specifically configured for a UE. Hence, it is important to explore UE specific signaling mechanisms that address individual UE requirements and configuration. On the other hand, it may not be always feasible to assign control channel resources in a UE specific manner, such as when load is high in the cell. If a group of UEs can monitor a common time-frequency resource, probability of control channel blocking and/or system overhead can be reduced.

SUMMARY

Various exemplary embodiments of the present disclosure include control channel signaling mechanisms where a group of UEs monitor for a common channel resource, and the control information may have UE specific information grouped/multiplexed or may also have group-common information for the group of UEs. In various example, various or several L1 control channel signaling mechanisms can be implemented to adapt DRX configuration parameters and/or trigger go-to-sleep or wake-up behavior of UE.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 11A-14C and 17 show flow diagrams of monitoring and signaling according to various exemplary embodiments of the present disclosure.

FIG. 17 shows flow diagrams of monitoring and including Wake-Up-Signals according to various exemplary embodiments of the present disclosure.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Figure 1:
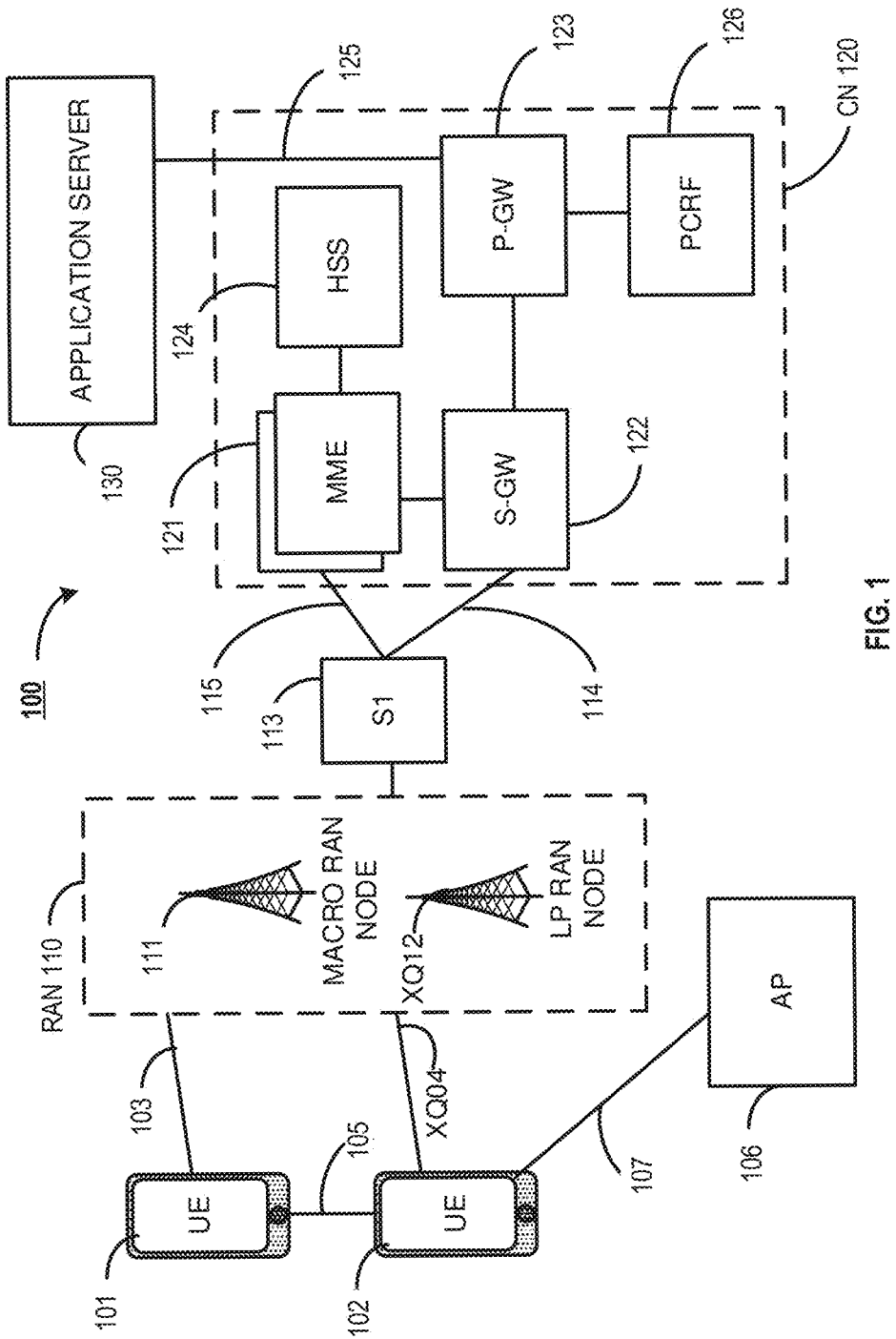
FIG. 1 illustrates an architecture of a system of a network in accordance with various exemplary embodiments of the present disclosure.

FIG. 1 illustrates an architecture of a system 100 of a network in accordance with some embodiments. The system 100 is shown to include a user equipment (UE) 101 and a UE 102. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 101 and 102 are illustrated as smartphones (e.g., handheld touch-screen mobile computing devices connectable to one or more cellular networks), but may also include any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 101 and 102 may include an Internet of Things (IoT) UE, which may include a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections (or channels) 103 and 104, respectively, each of which includes a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink (SL) interface including one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 105 may be used in vehicular applications and communications technologies, which are often referred to as V2X systems. V2X is a mode of communication where UEs (for example, UEs 101, 102) communicate with each other directly over the PC5/SL interface 105 and can take place when the UEs 101, 102 are served by RAN nodes 111, 112 or when one or more UEs are outside a coverage area of the RAN 110. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vehicle UEs (vUEs) 101, 102, RAN nodes 111, 112, application servers 130, and pedestrian UEs 101, 102 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 101, 102 may be implemented/employed as Vehicle Embedded Communications Systems (VECS) or vUEs.

The UE 102 is shown to be configured to access an access point (AP) 106 (also referred to as "WLAN node 106", "WLAN 106", "WLAN Termination 106" or "WT 106" or the like) via connection 107. The connection 107 may include a local wireless connection, such as a connection consistent with any IEEE 802.11 protocol, wherein the AP 106 may include a wireless fidelity (WiFi®) router. In this example, the AP 106 is shown to be connected to the Internet without connecting to the core network of the wireless system (described in further detail below). In various embodiments, the UE 102, RAN 110, and AP 106 may be configured to utilize LTE-WLAN aggregation (LWA) operation and/or WLAN LTE/WLAN Radio Level Integration with IPsec Tunnel (LWIP) operation. The LWA operation may involve the UE 102 in RRC_CONNECTED being configured by a RAN node 111, 112 to utilize radio resources of LTE and WLAN. LWIP operation may involve the UE 102 using WLAN radio resources (e.g., connection 107) via Internet Protocol Security (IPsec) protocol tunneling to authenticate and encrypt packets (e.g., internet protocol (IP) packets) sent over the connection 107. IPsec tunneling may include encapsulating entirety of original IP packets and adding a new packet header, thereby protecting the original header of the IP packets.

The RAN 110 can include one or more access nodes that enable the connections 103 and 104. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and may include ground stations (e.g., terrestrial access points) or satellite stations providing coverage within a geographic area (e.g., a cell). The term "Road Side Unit" or "RSU" may refer to any transportation infrastructure entity implemented in or by a gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals may include a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid includes a number of resource blocks, which describe the mapping of certain physical channels to resource elements. Each resource block includes a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to six resource element groups (REGs). Each REG comprises one resource block in one OFDM symbol. The PDCCH can be transmitted using one or more CCEs, depending on the size of the downlink control information (DCI) and the channel condition. Different numbers of CCEs (e.g., aggregation level, L=1, 2, 4, 8 or 16) can be used for transmission of the PDCCH.

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 includes the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may include a database for network users, including subscription-related information to support the network entities' handling of communication sessions. The CN 120 may include one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
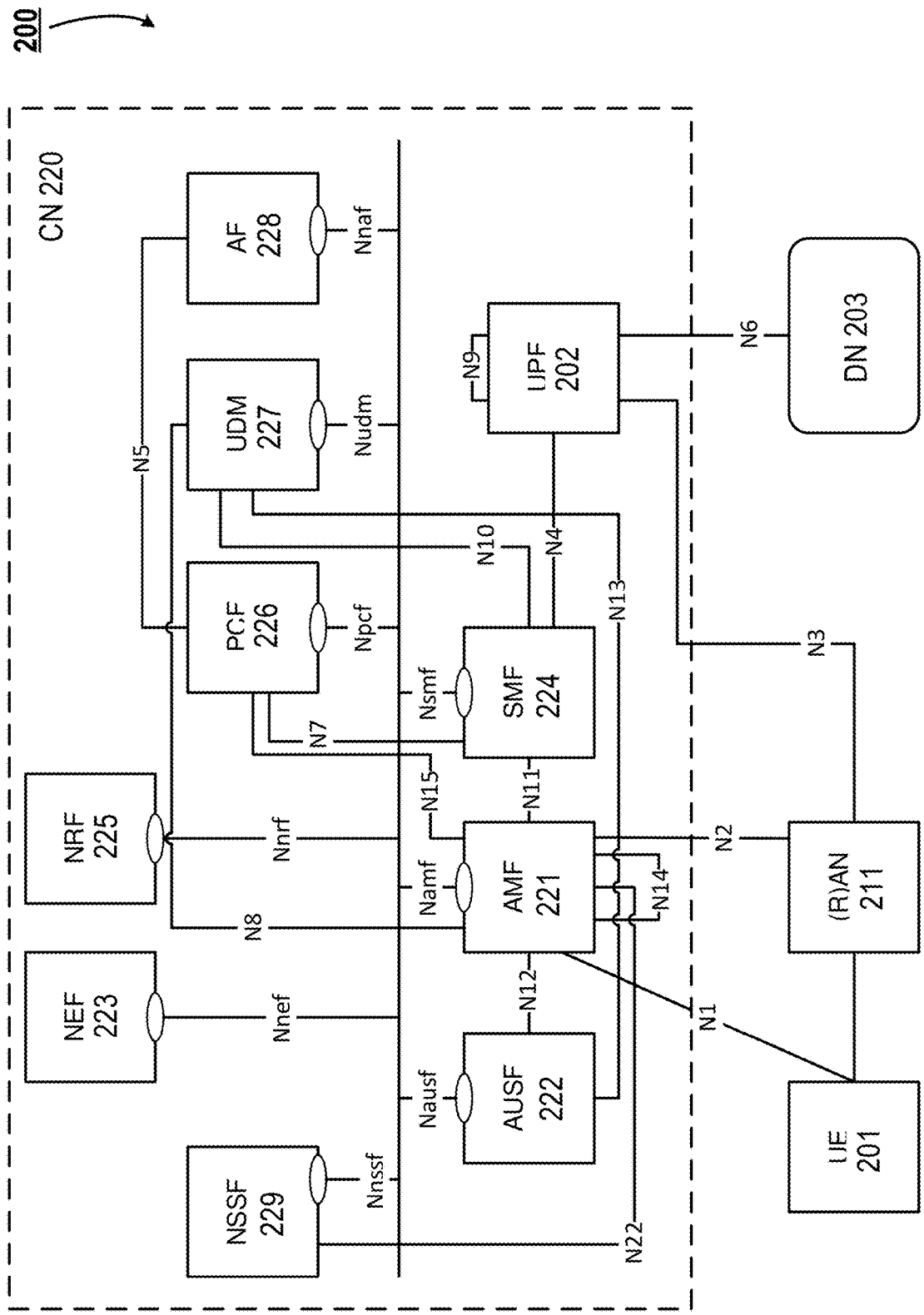
FIG. 2 illustrates an architecture of a system of a network in accordance with various exemplary embodiments of the present disclosure.

FIG. 2 illustrates an architecture of a system 200 of a network in accordance with some embodiments. The system 200 is shown to include a UE 201, which may be the same or similar to UEs 101 and 102 discussed previously; a RAN node 211, which may be the same or similar to RAN nodes 111 and 112 discussed previously; a Data Network (DN) 203, which may be, for example, operator services, Internet access or 3rd party services; and a 5G Core Network (5GC or CN) 220.

The CN 220 may include an Authentication Server Function (AUSF) 222; an Access and Mobility Management Function (AMF) 221; a Session Management Function (SMF) 224; a Network Exposure Function (NEF) 223; a Policy Control Function (PCF) 226; a Network Function (NF) Repository Function (NRF) 225; a Unified Data Management (UDM) 227; an Application Function (AF) 228; a User Plane Function (UPF) 202; and a Network Slice Selection Function (NSSF) 229.

The UPF 202 may act as an anchor point for intra-RAT and inter-RAT mobility, an external PDU session point of interconnect to DN 203, and a branching point to support multi-homed PDU session. The UPF 202 may also perform packet routing and forwarding, perform packet inspection, enforce user plane part of policy rules, lawfully intercept packets (UP collection), traffic usage reporting, perform QoS handling for user plane (e.g., packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 202 may include an uplink classifier to support routing traffic flows to a data network. The DN 203 may represent various network operator services, Internet access, or third party services. DN 203 may include, or be similar to, application server 130 discussed previously. The UPF 202 may interact with the SMF 224 via an N4 reference point between the SMF 224 and the UPF 202.

The AUSF 222 may store data for authentication of UE 201 and handle authentication related functionality. The AUSF 222 may facilitate a common authentication framework for various access types. The AUSF 222 may communicate with the AMF 221 via an N12 reference point between the AMF 221 and the AUSF 222; and may communicate with the UDM 227 via an N13 reference point between the UDM 227 and the AUSF 222. Additionally, the AUSF 222 may exhibit an Nausf service-based interface.

The AMF 221 may be responsible for registration management (e.g., for registering UE 201, etc.), connection management, reachability management, mobility management, and lawful interception of AMF-related events, and access authentication and authorization. The AMF 221 may be a termination point for an N11 reference point between the AMF 221 and the SMF 224. The AMF 221 may provide transport for Session Management (SM) messages between the UE 201 and the SMF 224, and act as a transparent proxy for routing SM messages. AMF 221 may also provide transport for short message service (SMS) messages between UE 201 and an SMS function (SMSF) (not shown by FIG. 2). AMF 221 may act as Security Anchor Function (SEAF), which may include interaction with the AUSF 222 and the UE 201, as well as receipt of an intermediate key that was established as a result of the UE 201 authentication process. Where UMTS Subscriber Identity Module (USIM) based authentication is used, the AMF 221 may retrieve the security material from the AUSF 222. AMF 221 may also include a Security Context Management (SCM) function, which receives a key from the SEAF that it uses to derive access-network specific keys. Furthermore, AMF 221 may be a termination point of RAN CP interface, which may include or be an N2 reference point between the (R)AN 211 and the AMF 221; and the AMF 221 may be a termination point of NAS (N1) signalling, and perform NAS ciphering and integrity protection.

AMF 221 may also support NAS signalling with a UE 201 over an N3 interworking-function (IWF) interface. The N3IWF may be used to provide access to untrusted entities. N3IWF may be a termination point for the N2 interface between the (R)AN 211 and the AMF 221 for the control plane, and may be a termination point for the N3 reference point between the (R)AN 211 and the UPF 202 for the user plane. As such, the AMF 221 may handle N2 signalling from the SMF 224 and the AMF 221 for PDU sessions and QoS, encapsulate/de-encapsulate packets for IPSec and N3 tunnelling, mark N3 user-plane packets in the uplink, and enforce QoS corresponding to N3 packet marking, which may take into account QoS requirements associated to such marking received over N2. N3IWF may also relay uplink and downlink control-plane NAS signalling between the UE 201 and AMF 221 via an N1 reference point between the UE 201 and the AMF 221, and relay uplink and downlink user-plane packets between the UE 201 and UPF 202. The N3IWF also provides mechanisms for IPsec tunnel establishment with the UE 201. The AMF 221 may exhibit an Namf service-based interface, and may be a termination point for an N14 reference point between two AMFs 221 and an N17 reference point between the AMF 221 and a 5G-Equipment Identity Register (5G-EIR) (not shown by FIG. 2).

The SMF 224 may be responsible for session management (e.g., session establishment, modify and release, including tunnel maintain between UPF and AN node). The SMF 224 may also allocate and manage UE IP addresses (including optional authorization), select and control UP functions, and configures traffic steering at the UPF 202 to route traffic to a proper destination. The SMF 224 may also terminate interfaces towards Policy Control Functions, control part of policy enforcement and QoS, and perform lawful interception (e.g., for SM events and interface to LI system). The SMF 224 may also terminate SM parts of NAS messages, provide downlink data notification, and initiate AN specific SM information, sent via AMF over N2 to AN, and determine Session and Service Continuity (SSC) mode of a session.

The SMF 224 may include the following roaming functionality: handle local enforcement to apply QoS SLAs (VPLMN); charging data collection and charging interface (VPLMN); lawful intercept (in VPLMN for SM events and interface to LI System); and support for interaction with external DN for transport of signalling for PDU session authorization/authentication by external DN. An N16 reference point between two SMFs 224 may be included in the system 200, which may be between another SMF 224 in a visited network and the SMF 224 in the home network in roaming scenarios. Additionally, the SMF 224 may exhibit the Nsmf service-based interface.

The NEF 223 may provide means for securely exposing the services and capabilities provided by 3GPP network functions for third party, internal exposure/re-exposure, Application Functions (e.g., AF 228), edge computing or fog computing systems, etc. In such embodiments, the NEF 223 may authenticate, authorize, and/or throttle the AFs. NEF 223 may also translate information exchanged with the AF 228 and information exchanged with internal network functions. For example, the NEF 223 may translate between an AF-Service-Identifier and an internal 5GC information. NEF 223 may also receive information from other network functions (NFs) based on exposed capabilities of other network functions. This information may be stored at the NEF 223 as structured data, or at a data storage NF using standardized interfaces. The stored information can then be re-exposed by the NEF 223 to other NFs and AFs, and/or used for other purposes such as analytics. Additionally, the NEF 223 may exhibit an Nnef service-based interface.

The NRF 225 may support service discovery functions, receive NF Discovery Requests from NF instances, and provide the information of the discovered NF instances to the NF instances. NRF 225 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF 225 may exhibit the Nnrf service-based interface.

The PCF 226 may provide policy rules to control plane function(s) to enforce them, and may also support unified policy framework to govern network behavior. The PCF 226 may also implement a front end (FE) to access subscription information relevant for policy decisions in a Unified Data Repository (UDR) of the UDM 227. The PCF 226 may communicate with the AMF 221 via an N15 reference point between the PCF 226 and the AMF 221, which may include a PCF 226 in a visited network and the AMF 221 in case of roaming scenarios. The PCF 226 may communicate with the AF 228 via an N5 reference point between the PCF 226 and the AF 228; and with the SMF 224 via an N7 reference point between the PCF 226 and the SMF 224. The system 200 and/or CN 220 may also include an N24 reference point between the PCF 226 (in the home network) and a PCF 226 in a visited network. Additionally, the PCF 226 may exhibit an Npcf service-based interface.

The UDM 227 may handle subscription-related information to support the network entities' handling of communication sessions, and may store subscription data of UE 201. For example, subscription data may be communicated between the UDM 227 and the AMF 221 via an N8 reference point between the UDM 227 and the AMF 221 (not shown by FIG. 2). The UDM 227 may include two parts, an application FE and a User Data Repository (UDR) (the FE and UDR are not shown by FIG. 2). The UDR may store subscription data and policy data for the UDM 227 and the PCF 226, and/or structured data for exposure and application data (including Packet Flow Descriptions (PFDs) for application detection, application request information for multiple UEs 201) for the NEF 223. The Nudr service-based interface may be exhibited by the UDR to allow the UDM 227, PCF 226, and NEF 223 to access a particular set of the stored data, as well as to read, update (e.g., add, modify), delete, and subscribe to notification of relevant data changes in the UDR. The UDM 227 may include a UDM FE, which is in charge of processing credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with the SMF 224 via an N10 reference point between the UDM 227 and the SMF 224. UDM 227 may also support SMS management. An SMS-FE implements the similar application logic as discussed previously. Additionally, the UDM 227 may exhibit the Nudm service-based interface.

The AF 228 may provide application influence on traffic routing, provide access to the Network Capability Exposure (NCE), and interact with the policy framework for policy control. The NCE may be a mechanism that allows the 5GC and AF 228 to provide information to each other via NEF 223, which may be used for edge computing implementations. In such implementations, the network operator and third party services may be hosted close to the UE 201 access point of attachment to achieve an efficient service delivery through the reduced end-to-end latency and load on the transport network. For edge computing implementations, the 5GC may select a UPF 202 close to the UE 201 and execute traffic steering from the UPF 202 to DN 203 via the N6 interface. This may be based on the UE subscription data, UE location, and information provided by the AF 228. In this way, the AF 228 may influence UPF (re)selection and traffic routing. Based on operator deployment, when AF 228 is considered to be a trusted entity, the network operator may permit AF 228 to interact directly with relevant NFs. Additionally, the AF 228 may exhibit an Naf service-based interface.

The NSSF 229 may select a set of network slice instances serving the UE 201. The NSSF 229 may also determine allowed Network Slice Selection Assistance Information (NSSAI) and the mapping to the Subscribed Single-NSSAIs (S-NSSAIs), if needed. The NSSF 229 may also determine the AMF set to be used to serve the UE 201, or a list of candidate AMF(s) 221 based on a suitable configuration and possibly by querying the NRF 225. The selection of a set of network slice instances for the UE 201 may be triggered by the AMF 221 with which the UE 201 is registered by interacting with the NSSF 229, which may lead to a change of AMF 221. The NSSF 229 may interact with the AMF 221 via an N22 reference point between AMF 221 and NSSF 229; and may communicate with another NSSF 229 in a visited network via an N31 reference point (not shown by FIG. 2). Additionally, the NSSF 229 may exhibit an Nnssf service-based interface.

As discussed previously, the CN 220 may include an SMSF, which may be responsible for SMS subscription checking and verification, and relaying SM messages to/from the UE 201 to/from other entities, such as an Short Message Service (SMS)-Global Systems for Mobile Communication (GMSC)/Inter-Working Mobile Switching Center (IWMSC)/SMS-router. The SMS may also interact with AMF 221 and UDM 227 for notification procedure that the UE 201 is available for SMS transfer (e.g., set a UE not reachable flag, and notifying UDM 227 when UE 201 is available for SMS).

The CN 220 may also include other elements that are not shown by FIG. 2, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (e.g., UE contexts), via N18 reference point between any NF and the UDSF (not shown by FIG. 2). Individual NFs may share a UDSF for storing their respective unstructured data or individual NFs may each have their own UDSF located at or near the individual NFs. Additionally, the UDSF may exhibit an Nudsf service-based interface (not shown by FIG. 2). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 2 for clarity. In one example, the CN 220 may include an Nx interface, which is an inter-CN interface between the MME (e.g., MME 121) and the AMF 221 in order to enable interworking between CN 220 and CN 120. Other example interfaces/reference points may include an N5g-EIR service-based interface exhibited by a 5G-EIR, an N27 reference point between an NRF in the visited network and the NRF in the home network; and an N31 reference point between the NSSF in the visited network and the NSSF in the home network.

In yet another example, system 200 may include multiple RAN nodes 211 wherein an Xn interface is defined between two or more RAN nodes 211 (e.g., gNBs and the like) connecting to 5GC 220, between a RAN node 211 (e.g., gNB) connecting to 220 and an eNB (e.g., a RAN node 111 of FIG. 1), and/or between two eNBs connecting to 5GC 220. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; and mobility support for UE 201 in a connected mode (e.g., CM-CONNECTED) including functionality to manage the UE mobility for connected mode between one or more RAN nodes 211. The mobility support may include context transfer from an old (source) serving RAN node 211 to new (target) serving RAN node 211; and control of user plane tunnels between old (source) serving RAN node 211 to new (target) serving RAN node 211. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be the same or similar to the user plane and/or control plane protocol stack(s) shown and described herein.

Figure 3:
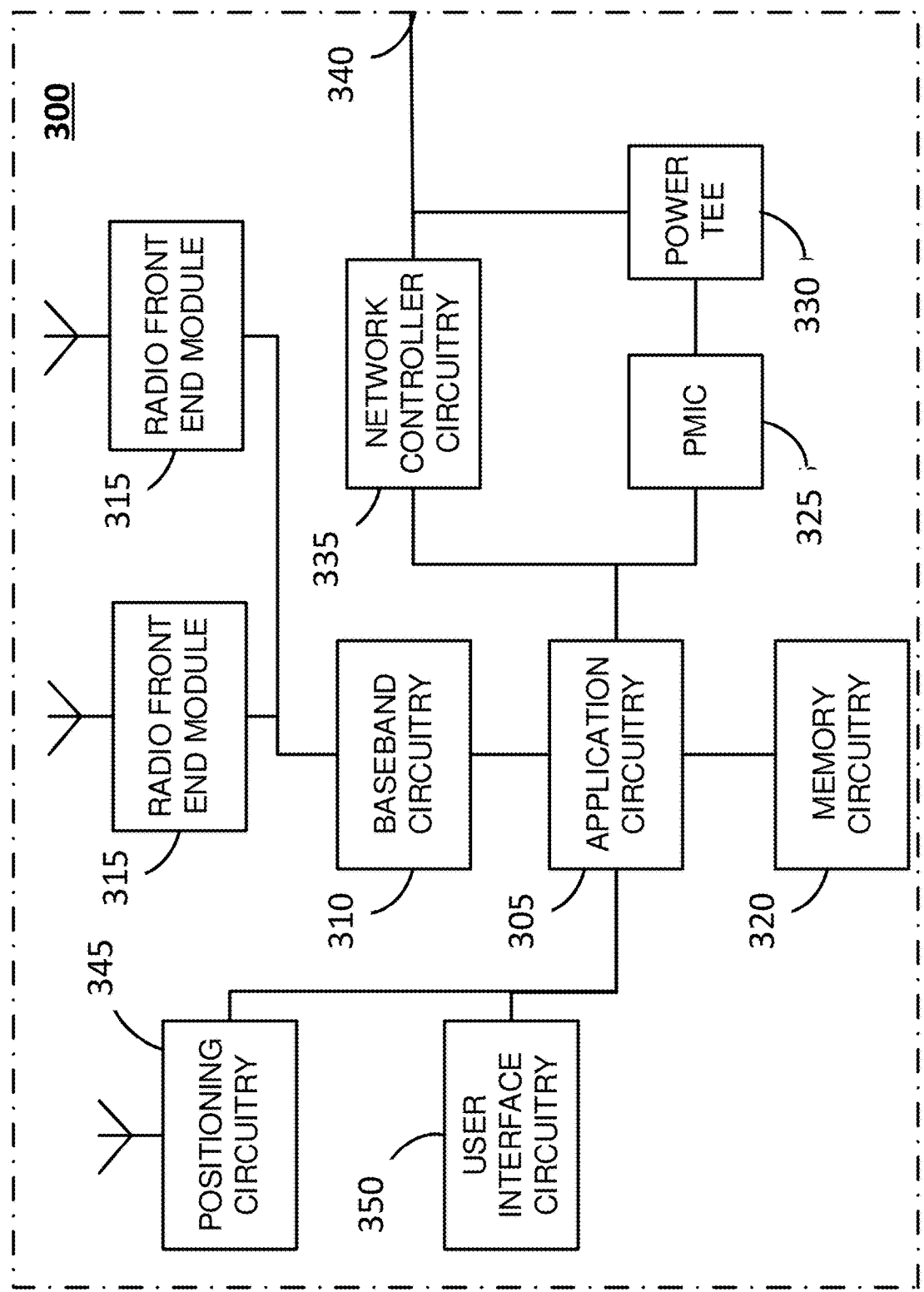
FIG. 3 illustrates an example of infrastructure equipment in accordance with various exemplary embodiments of the present disclosure.

FIG. 3 illustrates an example of infrastructure equipment 300 in accordance with various embodiments. The infrastructure equipment 300 (or "system 300") may be implemented as a base station, radio head, RAN node, etc., such as the RAN nodes 111 and 112, and/or AP 106 shown and described previously. In other examples, the system 300 could be implemented in or by a UE, application server(s) 130, and/or any other element/device discussed herein. The system 300 may include one or more of application circuitry 305, baseband circuitry 310, one or more radio front end modules 315, memory 320, power management integrated circuitry (PMIC) 325, power tee circuitry 330, network controller 335, network interface connector 340, satellite positioning circuitry 345, and user interface 350. In some embodiments, the device 300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry". As used herein, the term "processor circuitry" may refer to, is part of, or includes circuitry capable of sequentially and automatically carrying out a sequence of arithmetic or logical operations; and recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network 120 (or CN 220 discussed previously) may be referred to as "network elements". The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry 305 may include one or more central processing unit (CPU) cores and one or more of cache memory, low drop-out voltage regulators (LDOs), interrupt controllers, serial interfaces such as SPI, I$^2$C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 305 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 300 may not utilize application circuitry 305, and instead may include a special-purpose processor/controller to process IP data received from an EPC or 5GC, for example.

Additionally or alternatively, application circuitry 305 may include circuitry such as, but not limited to, one or more field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 305 may include logic blocks or logic fabric including other interconnected resources that may be programmed to perform various functions, such as the procedures, methods, functions, etc. of the various embodiments discussed herein. In such embodiments, the circuitry of application circuitry 305 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in lookup-tables (LUTs) and the like.

The baseband circuitry 310 may be implemented, for example, as a solder-down substrate including one or more integrated circuits, a single packaged integrated circuit soldered to a main circuit board or a multi-chip module containing two or more integrated circuits. Although not shown, baseband circuitry 310 may include one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 310 may include protocol processing circuitry with one or more instances of control circuitry (not shown) to provide control functions for the digital baseband circuitry and/or radio frequency circuitry (for example, the radio front end modules 315).

User interface circuitry 350 may include one or more user interfaces designed to enable user interaction with the system 300 or peripheral component interfaces designed to enable peripheral component interaction with the system 300. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 315 may include a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 315. The RFEMs 315 may incorporate both millimeter wave antennas and sub-millimeter wave antennas.

The memory circuitry 320 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 320 may be implemented as one or more of solder down packaged integrated circuits, socketed memory modules and plug-in memory cards.

The PMIC 325 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 330 may provide for electrical power drawn from a network cable to provide both power supply and data connectivity to the infrastructure equipment 300 using a single cable.

The network controller circuitry 335 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 300 via network interface connector 340 using a physical connection, which may be electrical (commonly referred to as a "copper interconnect"), optical, or wireless. The network controller circuitry 335 may include one or more dedicated processors and/or FPGAs to communicate using one or more of the aforementioned protocol. In some implementations, the network controller circuitry 335 may include multiple controllers to provide connectivity to other networks using the same or different protocols.

The positioning circuitry 345 may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 345 may include various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 345 and/or positioning circuitry implemented by UEs 101, 102, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 345 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine time of flight (ToF) values for each received GNSS signal from the ToAs and the ToTs, and then may determine, from the ToFs, a three-dimensional (3D) position and clock deviation. The 3D position may then be converted into a latitude, longitude and altitude. The positioning circuitry 345 may provide data to application circuitry 305, which may include one or more of position data or time data. Application circuitry 305 may use the time data to synchronize operations with other radio base stations (e.g., RAN nodes 111, 112, 211 or the like).

The components shown by FIG. 3 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I²C interface, an SPI interface, point to point interfaces, and a power bus, among others.

Figure 4:
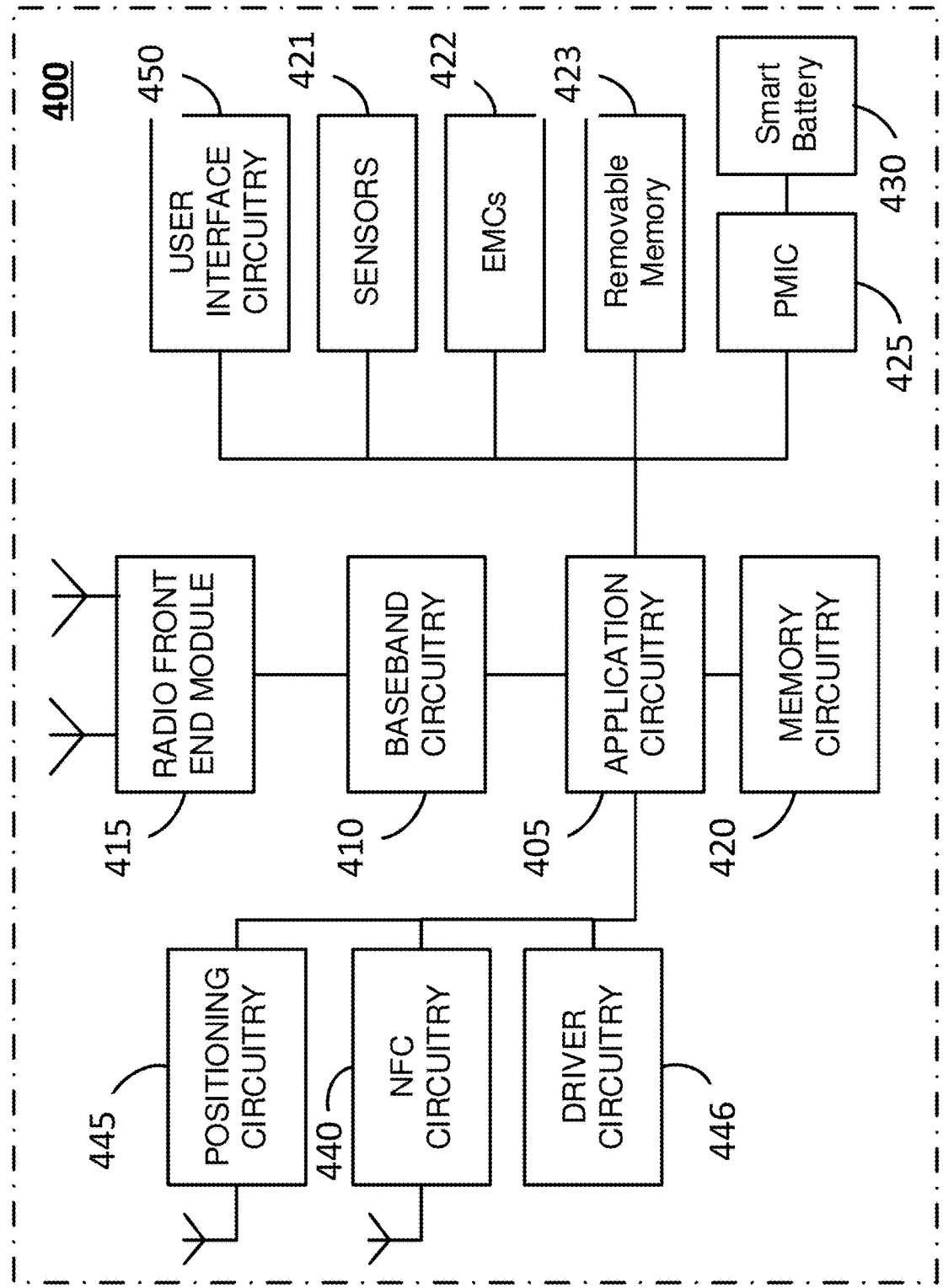
FIG. 4 illustrates an example of a platform (or "device") in accordance with various exemplary embodiments of the present disclosure.

FIG. 4 illustrates an example of a platform 400 (or "device 400") in accordance with various embodiments. In embodiments, the computer platform 400 may be suitable for use as UEs 101, 102, 201, application servers 130, and/or any other element/device discussed herein. The platform 400 may include any combinations of the components shown in the example. The components of platform 400 may be implemented as integrated circuits (ICs), portions thereof, discrete electronic devices, or other modules, logic, hardware, software, firmware, or a combination thereof adapted in the computer platform 400, or as components otherwise incorporated within a chassis of a larger system. The block diagram of FIG. 4 is intended to show a high level view of components of the computer platform 400. However, some of the components shown may be omitted, additional components may be present, and different arrangement of the components shown may occur in other implementations.

The application circuitry 405 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit (I²C) or universal programmable serial interface circuit, real time clock (RTC), timer-counters including interval and watchdog timers, general purpose input-output (10), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 400. In some embodiments, processors of application circuitry 305/405 may process IP data packets received from an EPC or 5GC.

Application circuitry 405 may be or may include a microprocessor, a multi-core processor, a multithreaded processor, an ultra-low voltage processor, an embedded processor, or other known processing element. In one example, the application circuitry 405 may include an Intel® Architecture Core™ based processor, such as a Quark™, an Atom™, an i3, an i5, an i7, or an MCU-class processor, or another such processor available from Intel® Corporation, Santa Clara, CA. The processors of the application circuitry 405 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc.; an ARM-based design licensed from ARM Holdings, Ltd.; or the like. In some implementations, the application circuitry 405 may be a part of a system on a chip (SoC) in which the application circuitry 405 and other components are formed into a single integrated circuit, or a single package, such as the Edison™ or Galileo™ SoC boards from Intel® Corporation.

Additionally or alternatively, application circuitry 405 may include circuitry such as, but not limited to, one or more field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 405 may include logic blocks or logic fabric including other interconnected resources that may be programmed to perform various functions, such as the procedures, methods, functions, etc. of the various embodiments discussed herein. In such embodiments, the circuitry of application circuitry 405 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in lookup-tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits. Although not shown, baseband circuitry 410 may include one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 410 may include protocol processing circuitry with one or more instances of control circuitry (not shown) to provide control functions for the digital baseband circuitry and/or radio frequency circuitry (for example, the radio front end modules 415).

The radio front end modules (RFEMs) 415 may include a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 415. The RFEMs 415 may incorporate both millimeter wave antennas and sub-millimeter wave antennas.

The memory circuitry 420 may include any number and type of memory devices used to provide for a given amount of system memory. As examples, the memory circuitry 420 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 420 may be developed in accordance with a Joint Electron Devices Engineering Council (JEDEC) low power double data rate (LPDDR)-based design, such as LPDDR2, LPDDR3, LPDDR4, or the like. Memory circuitry 420 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 420 may be on-die memory or registers associated with the application circuitry 405. To provide for persistent storage of information such as data, applications, operating systems and so forth, memory circuitry 420 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 400 may incorporate the three-dimensional (3D) cross-point (XPOINT) memories from Intel® and Micron®.

Removable memory circuitry 423 may include devices, circuitry, enclosures/housings, ports or receptacles, etc. used to coupled portable data storage devices with the platform 400. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 400 may also include interface circuitry (not shown) that is used to connect external devices with the platform 400. The external devices connected to the platform 400 via the interface circuitry may include sensors 421, such as accelerometers, level sensors, flow sensors, temperature sensors, pressure sensors, barometric pressure sensors, and the like. The interface circuitry may be used to connect the platform 400 to electro-mechanical components (EMCs) 422, which may allow platform 400 to change its state, position, and/or orientation, or move or control a mechanism or system. The EMCs 422 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 400 may be configured to operate one or more EMCs 422 based on one or more captured events and/or instructions or control signals received from a service provider and/or various clients.

In some implementations, the interface circuitry may connect the platform 400 with positioning circuitry 445, which may be the same or similar as the positioning circuitry 345 discussed with regard to FIG. 3.

In some implementations, the interface circuitry may connect the platform 400 with near-field communication (NFC) circuitry 440, which may include an NFC controller coupled with an antenna element and a processing device. The NFC circuitry 440 may be configured to read electronic tags and/or connect with another NFC-enabled device.

The driver circuitry 446 may include software and hardware elements that operate to control particular devices that are embedded in the platform 400, attached to the platform 400, or otherwise communicatively coupled with the platform 400. The driver circuitry 446 may include individual drivers allowing other components of the platform 400 to interact or control various input/output (I/O) devices that may be present within, or connected to, the platform 400. For example, driver circuitry 446 may include a display driver to control and allow access to a display device, a touchscreen driver to control and allow access to a touchscreen interface of the platform 400, sensor drivers to obtain sensor readings of sensors 421 and control and allow access to sensors 421, EMC drivers to obtain actuator positions of the EMCs 422 and/or control and allow access to the EMCs 422, a camera driver to control and allow access to an embedded image capture device, audio drivers to control and allow access to one or more audio devices.

The power management integrated circuitry (PMIC) 425 (also referred to as "power management circuitry 425") may manage power provided to various components of the platform 400. In various embodiments, with respect to the baseband circuitry 410, the PMIC 425 may control power-source selection, voltage scaling, battery charging, or DC-to-DC conversion. The PMIC 425 may often be included when the platform 400 is capable of being powered by a battery 430, for example, when the device is included in a UE 101, 102, 201.

In some embodiments, the PMIC 425 may control, or otherwise be part of, various power saving mechanisms of the platform 400. For example, if the platform 400 is in an RRC_Connected state, where it is still connected to the RAN node as it expects to receive traffic shortly, then it may enter a state known as Discontinuous Reception Mode (DRX) after a period of inactivity. During this state, the platform 400 may power down for brief intervals of time and thus save power. If there is no data traffic activity for an extended period of time, then the platform 400 may transition off to an RRC_Idle state, where it disconnects from the network and does not perform operations such as channel quality feedback, handover, etc. The platform 400 goes into a very low power state and it performs paging where again it periodically wakes up to listen to the network and then powers down again. The platform 400 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 430 may power the platform 400, although in some examples the platform 400 may be mounted deployed in a fixed location, and may have a power supply coupled to an electrical grid. The battery 430 may be a lithium ion battery, a metal-air battery, such as a zinc-air battery, an aluminum-air battery, a lithium-air battery, and the like. In some implementations, such as in V2X applications, the battery 430 may be a typical lead-acid automotive battery.

In some implementations, the battery 430 may be a "smart battery," which includes or is coupled with a Battery Management System (BMS) or battery monitoring integrated circuitry. The BMS may be included in the platform 400 to track the state of charge (SoCh) of the battery 430. The BMS may be used to monitor other parameters of the battery 430 to provide failure predictions, such as the state of health (SoH) and the state of function (SoF) of the battery 430. The BMS may communicate the information of the battery 430 to the application circuitry 405 or other components of the platform 400. The BMS may also include an analog-to-digital (ADC) convertor that allows the application circuitry 405 to directly monitor the voltage of the battery 430 or the current flow from the battery 430. The battery parameters may be used to determine actions that the platform 400 may perform, such as transmission frequency, network operation, sensing frequency, and the like.

A power block, or other power supply coupled to an electrical grid may be coupled with the BMS to charge the battery 430. In some examples, the power block 128 may be replaced with a wireless power receiver to obtain the power wirelessly, for example, through a loop antenna in the computer platform 400. In these examples, a wireless battery charging circuit may be included in the BMS. The specific charging circuits chosen may depend on the size of the battery 430, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform 400 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an I$^2$C interface, an SPI interface, point to point interfaces, and a power bus, among others.

Figure 5:
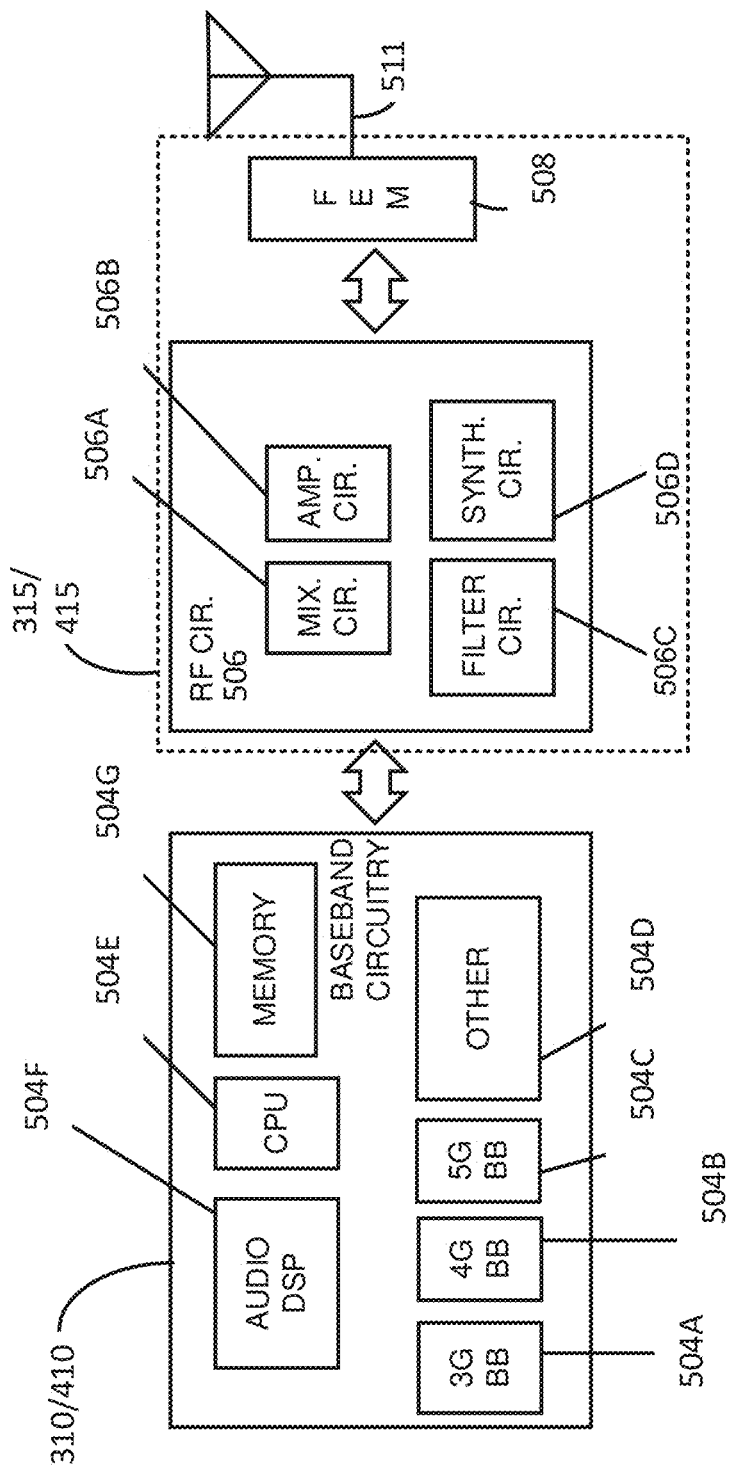
FIG. 5 illustrates example components of baseband circuitry and radio front end modules in accordance with various embodiments.

FIG. 5 illustrates example components of baseband circuitry 310/410 and radio front end modules (RFEM) 315/415 in accordance with some embodiments. As shown, the RFEM 315/415 may include Radio Frequency (RF) circuitry

506, front-end module (FEM) circuitry 508, one or more antennas 511 coupled together at least as shown.

The baseband circuitry 310/410 may include circuitry such as, but not limited to, one or more single-core or multi-core processors. The baseband circuitry 310/410 may include one or more baseband processors or control logic to process baseband signals received from a receive signal path of the RF circuitry 506 and to generate baseband signals for a transmit signal path of the RF circuitry 506. Baseband processing circuitry 310/410 may interface with the application circuitry 305/405 for generation and processing of the baseband signals and for controlling operations of the RF circuitry 506. For example, in some embodiments, the baseband circuitry 310/410 may include a third generation (3G) baseband processor 504A, a fourth generation (4G) baseband processor 5046, a fifth generation (5G) baseband processor 504C, or other baseband processor(s) 504D for other existing generations, generations in development or to be developed in the future (e.g., second generation (2G), sixth generation (6G), etc.). The baseband circuitry 310/410 (e.g., one or more of baseband processors 504A-D) may handle various radio control functions that enable communication with one or more radio networks via the RF circuitry 506. In other embodiments, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some embodiments, modulation/demodulation circuitry of the baseband circuitry 310/410 may include Fast-Fourier Transform (FFT), precoding, or constellation mapping/demapping functionality. In some embodiments, encoding/decoding circuitry of the baseband circuitry 310/410 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 310/410 may include one or more audio digital signal processor(s) (DSP) 504F. The audio DSP(s) 504F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 310/410 and the application circuitry 305/405 may be implemented together such as, for example, on a system on a chip (SoC).

In some embodiments, the baseband circuitry 310/410 may provide for communication compatible with one or more radio technologies. For example, in some embodiments, the baseband circuitry 310/410 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 310/410 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path which may include circuitry to down-convert RF signals received from the FEM circuitry 508 and provide baseband signals to the baseband circuitry 310/410. RF circuitry 506 may also include a transmit signal path which may include circuitry to up-convert baseband signals provided by the baseband circuitry 310/410 and provide RF output signals to the FEM circuitry 508 for transmission.

In some embodiments, the receive signal path of the RF circuitry 506 may include mixer circuitry 506A, amplifier circuitry 506B and filter circuitry 506C. In some embodiments, the transmit signal path of the RF circuitry 506 may include filter circuitry 506C and mixer circuitry 506A. RF circuitry 506 may also include synthesizer circuitry 506D for synthesizing a frequency for use by the mixer circuitry 506A of the receive signal path and the transmit signal path. In some embodiments, the mixer circuitry 506A of the receive signal path may be configured to down-convert RF signals received from the FEM circuitry 508 based on the synthesized frequency provided by synthesizer circuitry 506D. The amplifier circuitry 506B may be configured to amplify the down-converted signals and the filter circuitry 506C may be a low-pass filter (LPF) or band-pass filter (BPF) configured to remove unwanted signals from the down-converted signals to generate output baseband signals. Output baseband signals may be provided to the baseband circuitry 310/410 for further processing. In some embodiments, the output baseband signals may be zero-frequency baseband signals, although this is not a requirement. In some embodiments, mixer circuitry 506A of the receive signal path may include passive mixers, although the scope of the embodiments is not limited in this respect.

In some embodiments, the mixer circuitry 506A of the transmit signal path may be configured to up-convert input baseband signals based on the synthesized frequency provided by the synthesizer circuitry 506D to generate RF output signals for the FEM circuitry 508. The baseband signals may be provided by the baseband circuitry 310/410 and may be filtered by filter circuitry 506C.

In some embodiments, the mixer circuitry 506A of the receive signal path and the mixer circuitry 506A of the transmit signal path may include two or more mixers and may be arranged for quadrature downconversion and upconversion, respectively. In some embodiments, the mixer circuitry 506A of the receive signal path and the mixer circuitry 506A of the transmit signal path may include two or more mixers and may be arranged for image rejection (e.g., Hartley image rejection). In some embodiments, the mixer circuitry 506A of the receive signal path and the mixer circuitry 506A may be arranged for direct downconversion and direct upconversion, respectively. In some embodiments, the mixer circuitry 506A of the receive signal path and the mixer circuitry 506A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 310/410 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer circuitry 506D may be a fractional-N synthesizer or a fractional N/N+1 synthesizer, although the scope of the embodiments is not limited in this respect as other types of frequency synthesizers may be suitable. For example, synthesizer circuitry 506D may be a delta-sigma synthesizer, a frequency multiplier, or a synthesizer including a phase-locked loop with a frequency divider.

The synthesizer circuitry 506D may be configured to synthesize an output frequency for use by the mixer circuitry 506A of the RF circuitry 506 based on a frequency input and a divider control input. In some embodiments, the synthesizer circuitry 506D may be a fractional N/N+1 synthesizer.

In some embodiments, frequency input may be provided by a voltage controlled oscillator (VCO), although that is not a requirement. Divider control input may be provided by either the baseband circuitry 310/410 or the applications processor 305/405 depending on the desired output frequency. In some embodiments, a divider control input (e.g., N) may be determined from a look-up table based on a channel indicated by the applications processor 305/405.

Synthesizer circuitry 506D of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path which may include circuitry configured to operate on RF signals received from one or more antennas 511, amplify the received signals and provide the amplified versions of the received signals to the RF circuitry 506 for further processing. FEM circuitry 508 may also include a transmit signal path which may include circuitry configured to amplify signals for transmission provided by the RF circuitry 506 for transmission by one or more of the one or more antennas 511. In various embodiments, the amplification through the transmit or receive signal paths may be done solely in the RF circuitry 506, solely in the FEM 508, or in both the RF circuitry 506 and the FEM 508.

In some embodiments, the FEM circuitry 508 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 506). The transmit signal path of the FEM circuitry 508 may include a power amplifier (PA) to amplify input RF signals (e.g., provided by RF circuitry 506), and one or more filters to generate RF signals for subsequent transmission (e.g., by one or more of the one or more antennas 511).

Processors of the application circuitry 305/405 and processors of the baseband circuitry 310/410 may be used to execute elements of one or more instances of a protocol stack. For example, processors of the baseband circuitry 310/40, alone or in combination, may be used execute Layer 3, Layer 2, or Layer 1 functionality, while processors of the baseband circuitry 310/410 may utilize data (e.g., packet data) received from these layers and further execute Layer 4 functionality (e.g., transmission communication protocol (TCP) and user datagram protocol (UDP) layers). As referred to herein, Layer 3 may include a radio resource control (RRC) layer, described in further detail below. As referred to herein, Layer 2 may include a medium access control (MAC) layer, a radio link control (RLC) layer, and a packet data convergence protocol (PDCP) layer, described in further detail below. As referred to herein, Layer 1 may include a physical (PHY) layer of a UE/RAN node, described in further detail below.

Figure 6:
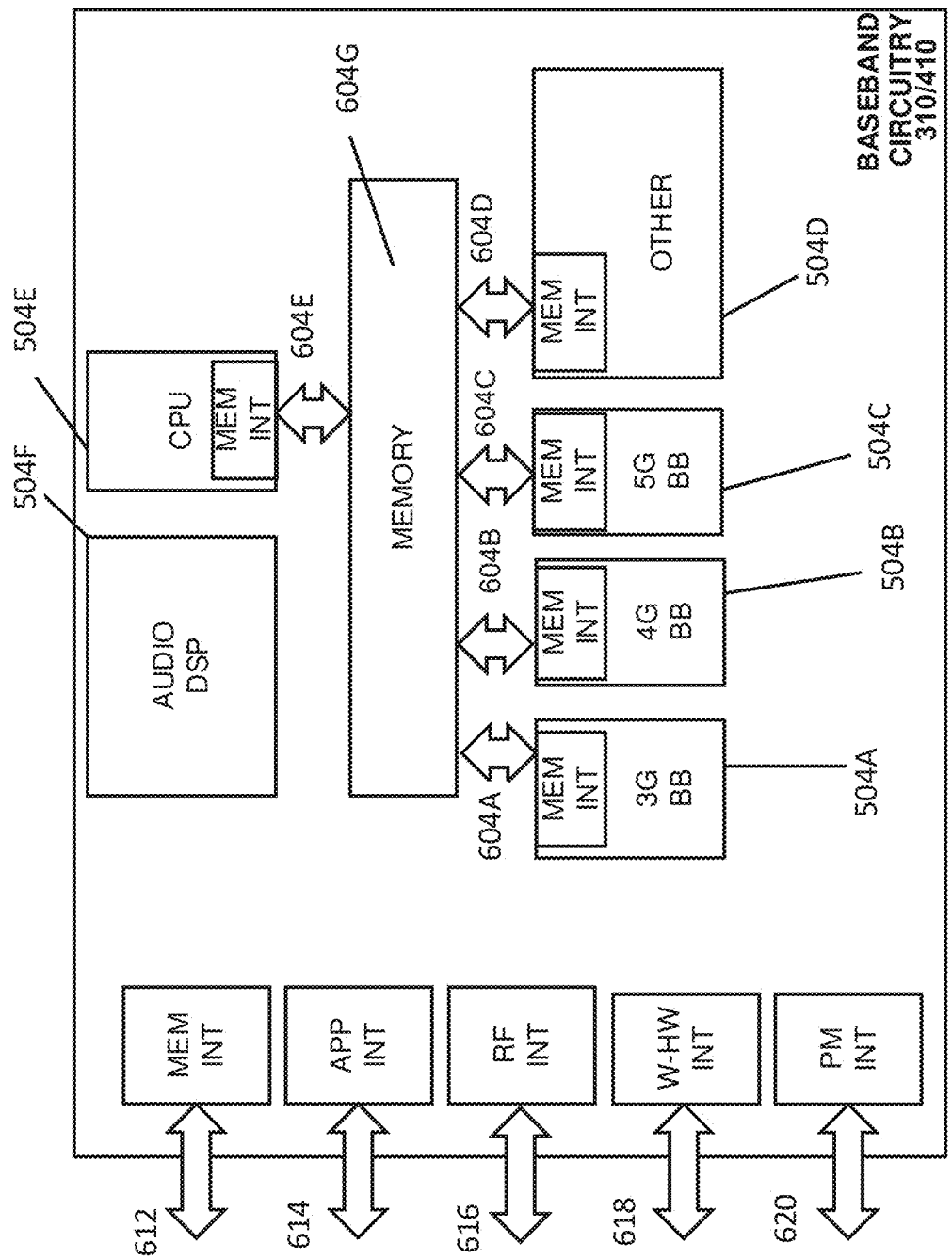
FIG. 6 illustrates example interfaces of baseband circuitry in accordance with various embodiments.

FIG. 6 illustrates example interfaces of baseband circuitry in accordance with some embodiments. As discussed above, the baseband circuitry 310/410 of FIG. 3 to FIG. 4 may include processors 504A-504E and a memory 504G utilized by said processors. Each of the processors 504A-504E may include a memory interface, 604A-604E, respectively, to send/receive data to/from the memory 504G.

The baseband circuitry 310/410 may further include one or more interfaces to communicatively couple to other circuitries/devices, such as a memory interface 612 (e.g., an interface to send/receive data to/from memory external to the baseband circuitry 310/40), an application circuitry interface 614 (e.g., an interface to send/receive data to/from the application circuitry 305/405 of FIG. 3 to FIG. 4), an RF circuitry interface 616 (e.g., an interface to send/receive data to/from RF circuitry 506 of FIG. 5), a wireless hardware connectivity interface 618 (e.g., an interface to send/receive data to/from Near Field Communication (NFC) components, Bluetooth® components (e.g., Bluetooth® Low Energy), Wi-Fi® components, and other communication components), and a power management interface 620 (e.g., an interface to send/receive power or control signals to/from the PMIC 55.

Figure 7:
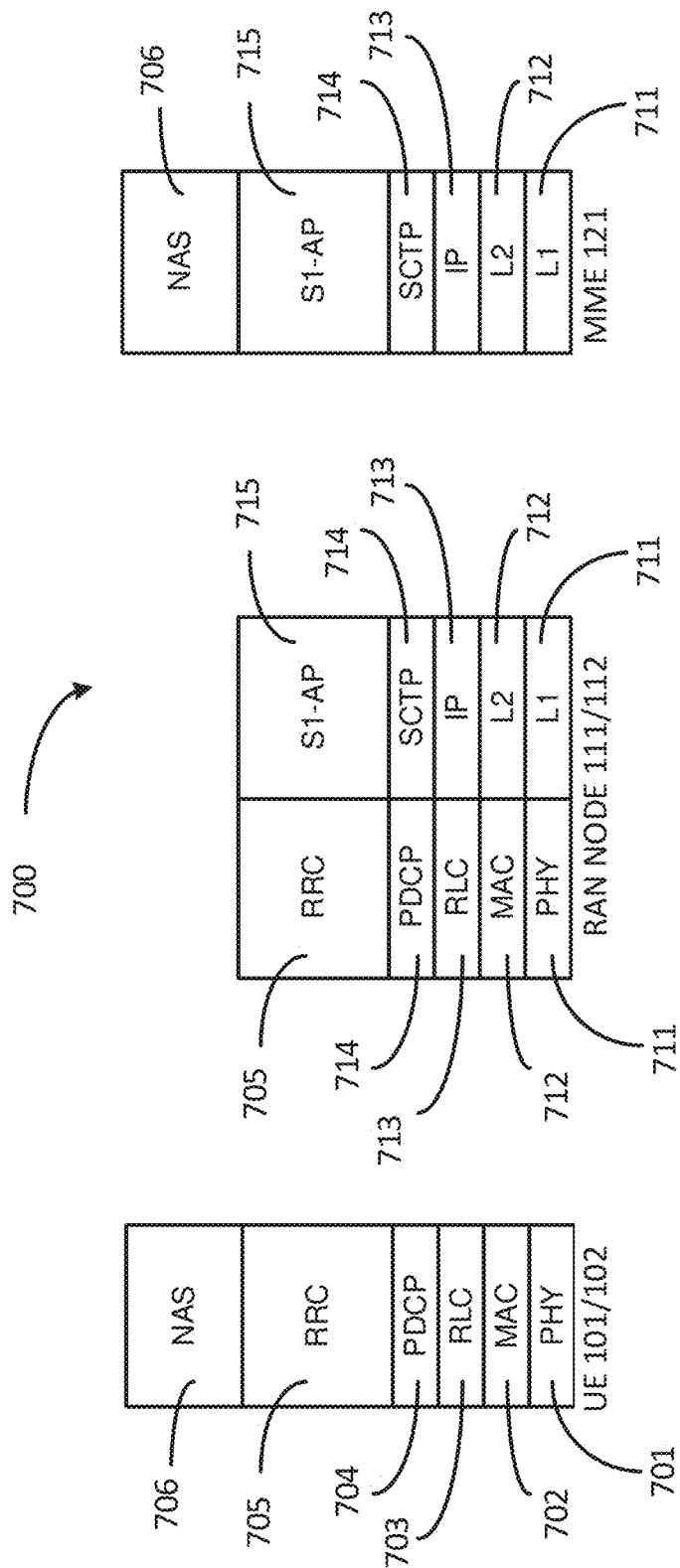
FIG. 7 shows an illustration of a control plane protocol stack in accordance with various exemplary embodiments of the present disclosure.

FIG. 7 is an illustration of a control plane protocol stack in accordance with some embodiments. In this embodiment, a control plane 700 is shown as a communications protocol stack between the UE 101 (or alternatively, the UE 102), the RAN node 111 (or alternatively, the RAN node 112), and the MME 121.

The PHY layer 701 may transmit or receive information used by the MAC layer 702 over one or more air interfaces. The PHY layer 701 may further perform link adaptation or adaptive modulation and coding (AMC), power control, cell search (e.g., for initial synchronization and handover purposes), and other measurements used by higher layers, such as the RRC layer 705. The PHY layer 701 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 702 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 703 may operate in a plurality of modes of operation, including: Transparent Mode (TM), Unacknowledged Mode (UM), and Acknowledged Mode (AM). The RLC layer 703 may execute transfer of upper layer protocol data units (PDUs), error correction through automatic repeat request (ARQ) for AM data transfers, and concatenation, segmentation and reassembly of RLC SDUs for UM and AM data transfers. The RLC layer 703 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 704 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 705 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may include one or more information elements (IEs), which may each include individual data fields or data structures.

The UE 101 and the RAN node 111 may utilize a Uu interface (e.g., an LTE-Uu interface) to exchange control plane data via a protocol stack including the PHY layer 701, the MAC layer 702, the RLC layer 703, the PDCP layer 704, and the RRC layer 705.

The non-access stratum (NAS) protocols 706 form the highest stratum of the control plane between the UE 101 and the MME 121. The NAS protocols 706 support the mobility of the UE 101 and the session management procedures to establish and maintain IP connectivity between the UE 101 and the P-GW 123.

The S1 Application Protocol (S1-AP) layer 715 may support the functions of the S1 interface and include Elementary Procedures (EPs). An EP is a unit of interaction between the RAN node 111 and the CN 120. The S1-AP layer services may include two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 714 may ensure reliable delivery of signaling messages between the RAN node 111 and the MME 121 based, in part, on the IP protocol, supported by the IP layer 713. The L2 layer 712 and the L1 layer 711 may refer to communication links (e.g., wired or wireless) used by the RAN node and the MME to exchange information.

The RAN node 111 and the MME 121 may utilize an S1-MME interface to exchange control plane data via a protocol stack including the L1 layer 711, the L2 layer 712, the IP layer 713, the SCTP layer 714, and the S1-AP layer 715.

Figure 8:
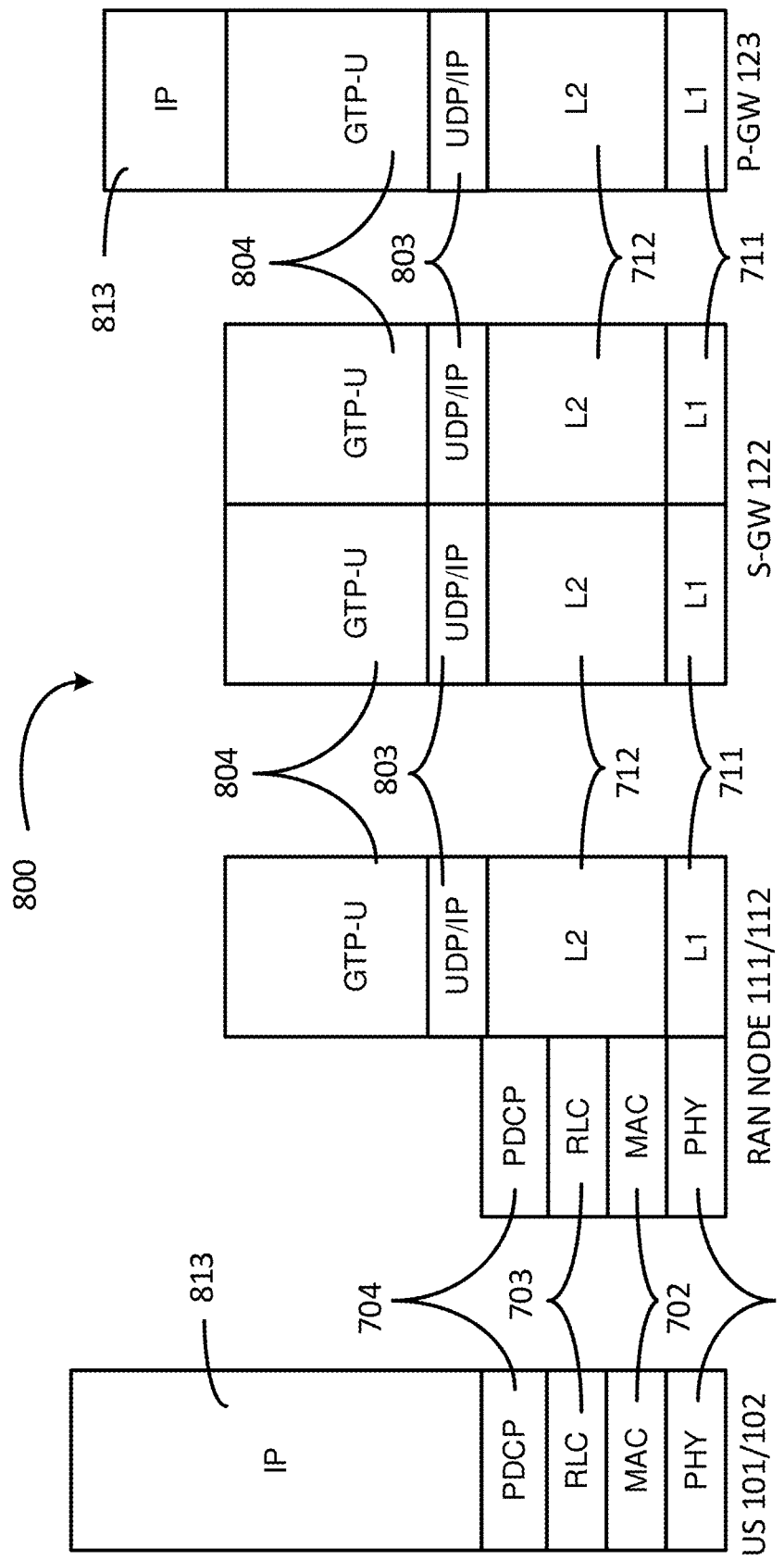
FIG. 8 is an illustration of a user plane protocol stack in accordance with various embodiments.

FIG. 8 is an illustration of a user plane protocol stack in accordance with some embodiments. In this embodiment, a user plane 800 is shown as a communications protocol stack between the UE 101 (or alternatively, the UE 102), the RAN node 111 (or alternatively, the RAN node 112), the S-GW 122, and the P-GW 123. The user plane 800 may utilize at least some of the same protocol layers as the control plane 700. For example, the UE 101 and the RAN node 111 may utilize a Uu interface (e.g., an LTE-Uu interface) to exchange user plane data via a protocol stack including the PHY layer 701, the MAC layer 702, the RLC layer 703, the PDCP layer 704.

The General Packet Radio Service (GPRS) Tunneling Protocol for the user plane (GTP-U) layer 804 may be used for carrying user data within the GPRS core network and between the radio access network and the core network. The user data transported can be packets in any of IPv4, IPv6, or PPP formats, for example. The UDP and IP security (UDP/IP) layer 803 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack including the L1 layer 711, the L2 layer 712, the UDP/IP layer 803, and the GTP-U layer 804. The S-GW 122 and the P-GW 123 may utilize an S5/S8a interface to exchange user plane data via a protocol stack including the L1 layer 711, the L2 layer 712, the UDP/IP layer 803, and the GTP-U layer 804. As discussed above with respect to FIG. 7, NAS protocols support the mobility of the UE 101 and the session management procedures to establish and maintain IP connectivity between the UE 101 and the P-GW 123.

Figure 9:
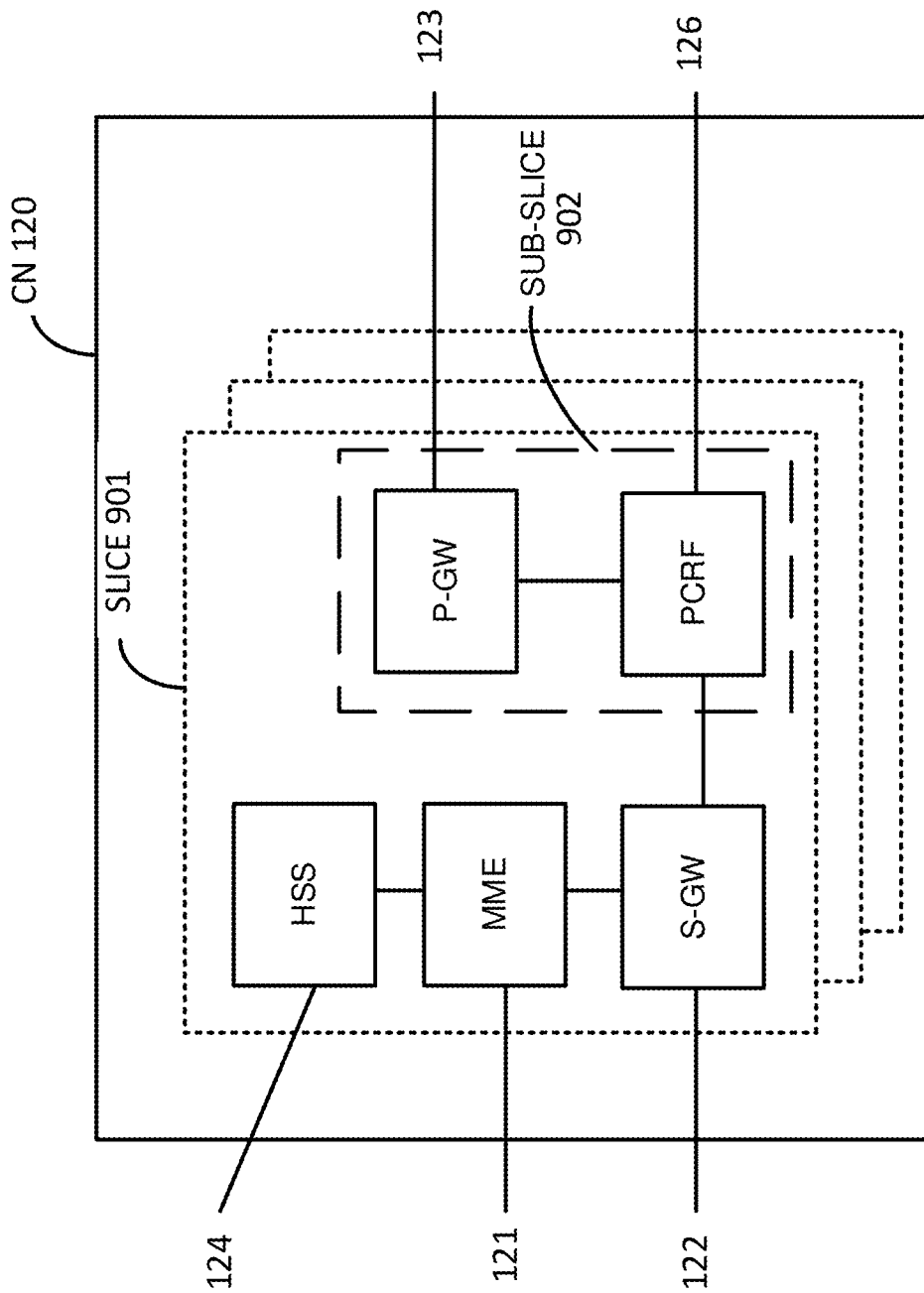
FIG. 9 illustrates components of a core network in accordance with various exemplary embodiments of the present disclosure.

FIG. 9 illustrates components of a core network in accordance with some embodiments. The components of the CN 120 may be implemented in one physical node or separate physical nodes including components to read and execute instructions from a machine-readable or computer-readable medium (e.g., a non-transitory machine-readable storage medium). In embodiments, the components of CN 220 may be implemented in a same or similar manner as discussed herein with regard to the components of CN 120. In some embodiments, Network Functions Virtualization (NFV) is utilized to virtualize any or all of the above described network node functions via executable instructions stored in one or more computer-readable storage mediums (described in further detail below). A logical instantiation of the CN 120 may be referred to as a network slice 901, and individual logical instantiations of the CN 120 may provide specific network capabilities and network characteristics. A logical instantiation of a portion of the CN 120 may be referred to as a network sub-slice 902 (e.g., the network sub-slice 902 is shown to include the PGW 123 and the PCRF 126).

As used herein, the terms "instantiate", "instantiation", and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to set of network functions (NFs) instances and the resources (e.g., compute, storage, and networking resources) required to deploy the network slice.

With respect to 5G systems (see e.g., FIG. 2), a network slice may include the CN control plane and user plane NFs, NG RANs in a serving PLMN, and a N3IWF functions in the serving PLMN. Individual network slices may have different Single Network Slice Selection Assistance Information (S-NSSAI) and/or may have different Slice/Service Types (SSTs). Network slices may differ for supported features and network functions optimizations, and/or multiple network slice instances may deliver the same service/features but for different groups of UEs (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G access node (AN) and associated with eight different S-NSSAIs. Moreover, an AMF instance serving an individual UE may belong to each of the network slice instances serving that UE.

NFV architectures and infrastructures may be used to virtualize one or more NFs, alternatively performed by proprietary hardware, onto physical resources including a combination of industry-standard server hardware, storage hardware, or switches. In other words, NFV systems can be used to execute virtual or reconfigurable implementations of one or more EPC components/functions.

Figure 10:
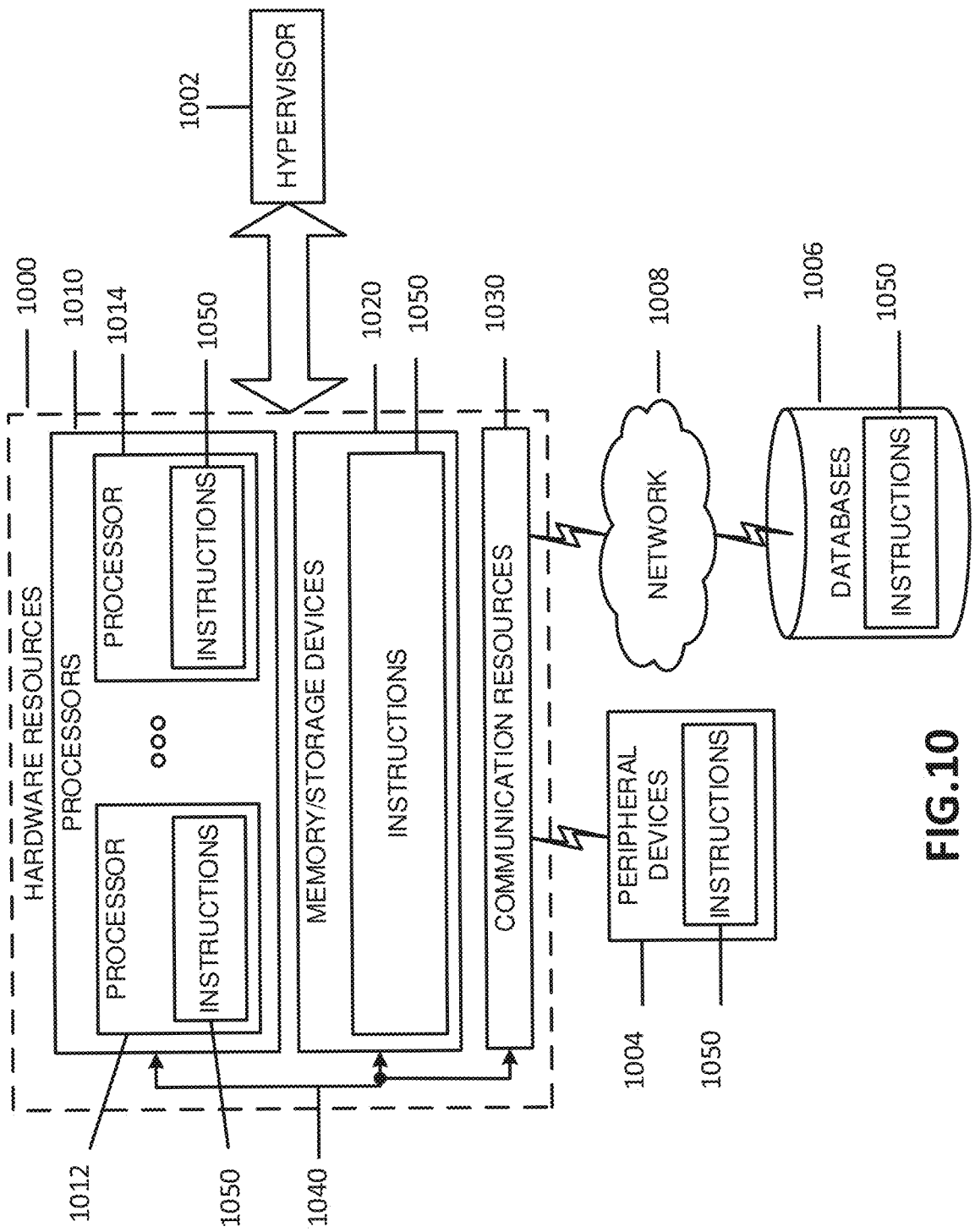
FIG. 10 shows a block diagram illustrating components, according to various exemplary embodiments of the present disclosure.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. For one embodiment, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1002 may be executed to provide an execution environment for one or more network slices/sub-slices to utilize the hardware resources 1000. A "virtualized resource" may refer to compute, storage, and/or network resources provided by virtualization infrastructure to an application, device, system, etc.

The processors 1010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014.

The memory/storage devices 1020 may include main memory, disk storage, or any suitable combination thereof. The memory/storage devices 1020 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1050 may include software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below in the example section. In another example, circuitry associated with a UE, a base station (e.g., a DN, a gNodeB, etc.), a network element, etc., as described above in connection with one or more of the preceding figures may be configured to operate in accordance with one or more of the examples set forth below in the example section.

Factors contributing to mobile radio communication terminal device (e.g., UE) power consumption in connected mode (e.g., RRC_connected state) are PDCCH monitoring: How many times UE monitors for PDCCH at the configured PDCCH occasions which do not result in grant assigned Operating BWP size Number f UE Rx/Tx #antennas and active RF chains Measurement operations UE can operate in a discontinuous receiving (DRX) mode in order to save UE power by avoiding monitoring for PDCCH continuously. A DRX operation may include an ON duration or ON state (e.g., monitoring state of UE), in which the UE turns ON and monitors for transmissions from the network, as part of DRX cycle. Existing solutions include higher layer configured DRX mode in connected state where DRX configuration includes following RRC configured parameters, such as shown in Table 1. Please refer to 3GPP specifications 38.321 for detail description of the parameters which is assumed to be attached to this application as reference.

Various embodiments provide methods to adapt DRX operation to dynamic nature of traffic arrival pattern so as to minimize the power consumption of a given UE.

The most contributing factors to UE power consumption in connected mode (e.g., RRC_connected state) are PDCCH monitoring (e.g., based on how many times a UE monitors for PDCCH at the configured PDCCH occasions which do not result in grant assigned), operating BWP size, the number of UE Rx/Tx #antennas and active RF chains, measurement operations.

A UE may operate in a discontinuous receiving (DRX) mode in order to save UE power by avoiding monitoring for PDCCH continuously. Typical DRX operation includes an ON duration, when UE turns ON and monitor for transmissions (e.g., PDCCH) from the network, as part of DRX cycle. Existing solutions include higher layer configured DRX mode in connected state where DRX configuration includes following RRC configured parameters, such as shown in Table 1. Details of the parameters are found in 3GPP specifications 38.321, which is incorporated herein by reference In various exemplary embodiments of the present disclosure, based on nature of active traffic flow to/from a mobile radio communication terminal device (e.g., UE), one DRX configuration from a set of configured DRX configurations can be activated at a given time. One exemplary DRX configuration includes at least the set of parameters indicated in the above list in Table 1. A first DRX configuration may be different from a second DRX configuration if at least the value of one parameter in the DRX configurations is different.

Table 2 shows an example in which K configurations may be configured for a mobile radio communication terminal device (e.g., UE) by higher layer e.g. through RRC signaling, of which an index referring to one of the configurations can be indicated e.g. by MAC control element (CE) or Downlink control Information (DCI). Each configuration has one or more parameters from Table 1 and possibly more parameters, such as wake-up signal monitoring duration, offset to start location of wake-up signal monitoring duration, offset to start location of ON duration for control

TABLE 1

DRX configuration parameters drx-onDurationTimer: the duration at the beginning of a DRX Cycle, this is when UE monitors for at least PDCCHs;
drx-SlotOffset: the delay before starting the drx-onDurationTimer;
drx-StartOffset: the subframe where the DRX Cycle starts;
drx-InactivityTimer: the duration after the PDCCH occasion in which a PDCCH indicates a new UL or DL transmission for the MAC entity;
drx-RetransmissionTimerDL (per DL HARQ process): the maximum duration until a DL retransmission is received;
drx-RetransmissionTimerUL (per UL HARQ process): the maximum duration until a grant for UL retransmission is received;
drx-LongCycle: the Long DRX cycle;
drx-ShortCycle (optional): the Short DRX cycle;
drx-ShortCycleTimer (optional): the duration the UE shall follow the Short DRX cycle;
drx-HARQ-RTT-TimerDL (per DL HARQ process): the minimum duration before a DL assignment for HARQ retransmission is expected by the MAC entity;
drx-HARQ-RTT-TimerUL (per UL HARQ process): the minimum duration before a UL HARQ retransmission grant is expected by the MAC entity.

In (new radio) NR, a mobile radio communication terminal device (e.g., UE) may support diverse traffic types and in some occasions, data can be quite bursty, and delivered over a short duration. One set of semi-statically configured RRC parameters of DRX operation may not adapt well to diverse traffic pattern and bursty traffic.

channel e.g., monitoring after wake-up signal is detected etc., further details of which are provided in the following sections. Here, offset to start location of wake-up signal monitoring duration imply that wake-up signal can be configured to be monitored at an offset from configured start location of next DRX ON duration or drx-onDurationTimer.

Moreover, offset to start location of ON duration for control channel monitoring imply that offset is from when wake-up signal is detected. Examples provided in later sections elaborate more on this offset.

TABLE 2

Multiple configurations

| DRX-Config Index | Configuration content |
|---|---|
| 0 | Parameter 1, Parameter 2, etc. |
| 1 | . . . |
| . . . | . . . |
| K | . . . |

In various embodiments, a new MAC CE can be added to activate one of several configured DRX-Configs to be used for the MAC entity of the respective cell group or a serving cell. This would enable a mobile radio communication terminal device (e.g., UE) to faster adjust multiple DRX parameters through a single MAC command compared to the existing DRX (re)configuration mechanism using semi-static RRC reconfiguration message. The number of supported DRX-Configs per MAC entity, i.e., K in the above table can be a UE capability parameter or fixed in specification and further determines the size of MAC CE.

Furthermore, in various embodiments, in NR, a mobile radio communication terminal device (e.g., UE) may be able to communicate with multiple numerologies, either in different bandwidth parts or carriers, where UE may or may not be able to simultaneously transmit/receive with different numerologies. Transmission with different numerologies require separate FFTs and possibly different RF chains. Hence, in some designs, UE may be configured with one or more numerology-specific or bandwidth part (BWP) specific or carrier-specific DRX configurations.

In at least one exemplary embodiment of the present disclosure, different numerologies can be configured for different BWPs, and BWP switching can be performed by either explicit DCI command or background timer operation, i.e., bwp-inactivityTimer. If different DRX configurations are desired for different BWPs with various numerologies, it can be beneficial that the DRX configuration can be switched along with the BWP switching. To this end, the DRX configurations in Table-2 can be linked with a particular BWP ID and/or cell ID within the cell group. In some embodiments, DRX configuration with larger value setting of drx-InactivityTimer may be configured for default BWP compared to that of other mobile radio communication terminal device/UE-specific BWPs, which may be technically motivated by the fact that default BWP is typically used when the mobile radio communication terminal device/UE almost completes the data communications and larger value has less impacts on packet latency.

In various exemplary embodiments, dynamic L1 signaling may be implemented for faster adaptation of DRX parameters and/or transition between active and sleep state. That is, in accordance with exemplary embodiments of the present disclosure, and in contrast to existing solutions where DRX mode is configured by RRC signaling, dynamic L1 signaling such as downlink control information (DCI) e.g., in a PDCCH or sequence can be used to notify UE of adaptation of DRX parameters and/or activation/deactivation of DRX mode and/or to go to sleep and/or wake up from sleep. In particular, dynamic L1 wake-up signal and/or go-to-sleep signal can be exploited to potentially increase sleep duration of a UE.

Below are additional some terminologies that may be relied in the present disclosure:

| | |
|---|---|
| ON state/Active state/Network Access Mode | UE is in the state where it can receive signaling/transmission from the network, such as DCI, e.g., in a PDCCH, CSI measurement signaling, etc. |
| OFF state/Sleep state/Power Saving Mode/ non-active state | UE is in the state where it does not receive any signaling/transmission from the network |
| DRX mode | UE is operating with a cycle that comprises a duration of active state and a duration of sleep state |
| Wake up Signal/WUS | UE receives a signaling from network after it was in a sleep/OFF state, the signal if detected properly, triggers the UE to turn ON or be active for a given subsequent duration to monitor for DCIs e.g., PDCCHs and/or other transmissions/signaling from the network. Following detection of WUS, UE may turn ON after a period or immediately. The UE may be triggered to wake up or monitor DCIs/PDCCH subsequent to detection of WUS for a duration that is part of a DRX cycle or for a duration that is not part of a DRX cycle and/or can be larger or smaller than a DRX cycle. |
| Go to sleep (GTS) signal | UE receives a signaling from network while it is in ON/active state, the signal if detected properly, triggers the UE to turn OFF or go to sleep for a given subsequent duration. Following detection of GTS, UE may turn OFF after a period or immediately. The UE may be triggered to go to sleep subsequent to detection of GTS signal for a duration that is part of a DRX cycle or for a duration that is not part of a DRX cycle and/or can be larger or smaller than a DRX cycle. |
| C-DRX | UE is operating in a DRX mode in RRC-connected state |
| Group-common DCI/common DCI | Control information conveyed in a common downlink control channel that is monitored by a group of UEs. If the DCI is appended with CRC scrambled by an RNTI, the common DCI is transmitted in a PDCCH. |

In exemplary embodiments of the present disclosure, a mobile radio communication terminal device (e.g., UE) can be configured to receive GTS signaling when the UE is ON or active. In one or more embodiments, a mobile radio communication terminal device (e.g., UE) can receive higher layer signaling GTS_Signaling=ON/OFF by RRC, i.e., if ON, UE monitors for GTS signaling, if OFF, UE does not monitor for GTS. Enabling/disabling of GTS signal monitoring can be group-specific, e.g., cell specific, or UE specific configured (e.g. by dedicated RRC signaling).

For example, the UE can be ON i) as part of DRX cycle when UE is in a configured/activated DRX mode with a given/indicated DRX configuration ii) when it is not configured/activated with any DRX mode and continuously monitoring for transmission/signaling from the network. GTS signaling can trigger the UE to sleep and stop monitoring PDCCH for a specified/configured/indicated sleep duration In various embodiments, at least two parameters can be identified related to GTS signaling such as
 1) offset to start position of the sleep duration, T_GTS_A
 2) sleep duration, T_GTS_B In some exemplary embodiments, a mobile radio communication terminal device (e.g., UE) may be configured by higher layer (e.g. RRC signaling) with one index for GTS periodicity and GTS slot offset, which points to one row in a predefined table in specification. More specifically, the offset value may be defined relative to the beginning of the ongoing DRX Cycle.

The T_GTS_A and/or T_GTS_B can or may be indicated as part of GTS signaling or can be higher layer configured, for example, as part of a DRX configuration or GTS signaling configuration. In at least one example, T_GTS_A and/or T_GTS_B can be fixed in specifications or a predefined mapping can be obtained based on one or more DRX parameters, such as DRX ON duration drx-onDuration-Timer and/or dix-InactivityTimer etc. Unit of offset to start position of sleep duration, e.g., T_GTS_A and sleep duration, e.g., T_GTS_B can be in symbols or slots, for a given numerology or in ms or sub-ms.

In a first example, a mobile radio communication terminal device (e.g., UE) is operating with a configured C-DRX mode within a BWP or a carrier, e.g., with a given DRX cycle with certain configured ON duration, when UE monitors for at least PDCCHs. The UE can be configured to monitor a L1 signaling for GTS during the active/ON state of the DRX mode. Depending on how long ON duration is configured, GTS signaling can put the UE to sleep before configured ON duration ends, cf. FIG. 11A where GTS signal is received during configured ON duration, or can trigger micro-sleep within the ON duration, as shown in FIG. 11B.

The ON duration can include one or more of the following: drx-onDurationTimer, drx-InactivityTimer, dix-RetransmissionTimerDL, drx-RetransmissionTimerUL, where in at least one example, drx-onDurationTimer is the minimum ON duration at the beginning of a DRX cycle, and other configured durations are used such as drx-InactivityTimer, drx-RetransmissionTimerDL, dnr-RetransmissionTimerUL if there is a grant received for DL/UL transmission during drx-onDuration Timer.

Referring back to the first example, L1 signaling for GTS only triggers the UE to go to sleep. UE continues to follow existing DRX configuration where sleep or active state duration can only be modified if GTS trigger is received. For example, the dashed area in FIG. 11 implies skipped ON duration, this also applies to other subsequent figures unless mentioned otherwise.

Figure 11A:
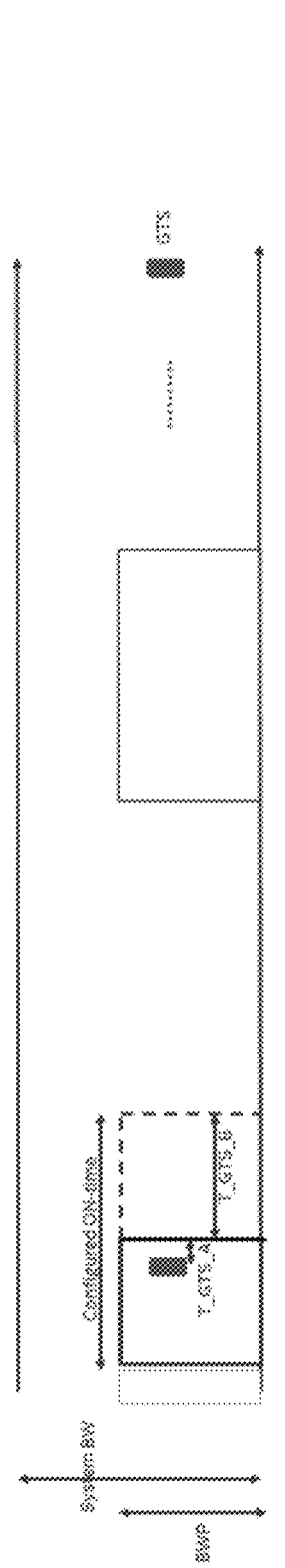
Figure 11B:
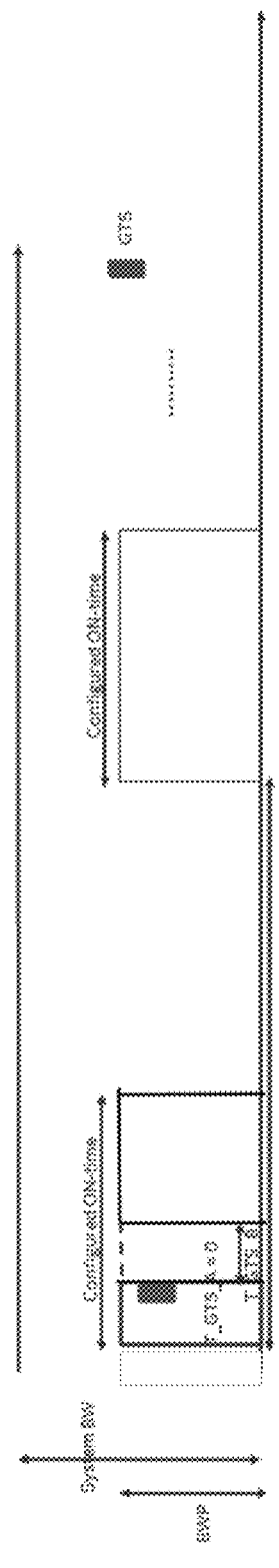

According to exemplary embodiments of the present disclosure, FIGS. 11A and 11B show C-DRX mode operation where a mobile radio communication terminal device receives GTS signaling (e.g., GTS L1 signaling) during ON state. In the exemplary embodiment of FIG. 11A, the mobile radio communication terminal device (e.g., UE) receives the GTS signaling during ON state to put the UE to sleep before ON duration ends or for a micro-sleep. In the exemplary embodiment of FIG. 11B, the mobile radio communication terminal device (e.g., UE) receives the GTS signaling during ON state to put the UE to sleep before ON duration ends within the configured ON duration. FIG. 11 shows an exemplary embodiment in which the indicated or configured sleep duration when GTS trigger is received may span more than a DRX cycle.

More specifically, FIGS. 11A and 11B show two examples, where in FIG. 11A, T_GTS_B is set such that UE is put to sleep for the remainder of the configured ON duration, whereas in FIG. 11B, T_GTS_B is a rather small value which only triggers a micro-sleep and after the elapsed time, UE wakes up to monitor PDCCH or other signaling for the remainder of the ON duration. T_GTS_A maybe a function of mobile radio communication terminal device (e.g., UE) capability or alternatively is fixed in specification/ standard. In another example, T_GTS_B maybe a function of UE capability as well. For example, T_GTS_B in FIG. 11B may need to take into account how fast a UE can wake up to monitor PDCCH for remaining part of ON duration. In at least one example, it is also possible that T_GTS_B is set to a value which may be equal to or larger than DRX cycle. In some cases, if network expects that a given UE may not receive PDCCH for one or more subsequent DRX cycle or if some latency can be tolerated for transmission, it may indicate a large T_GTS_B so that UE may be put to sleep spanning one or more subsequent DRX cycles, i.e., one or more subsequent ON durations are skipped. This is shown in FIG. 11C wherein UE is signaled to sleep three DRX cycles starting from the DRX cycle where UE receives the GTS signaling.

Figure 11C:
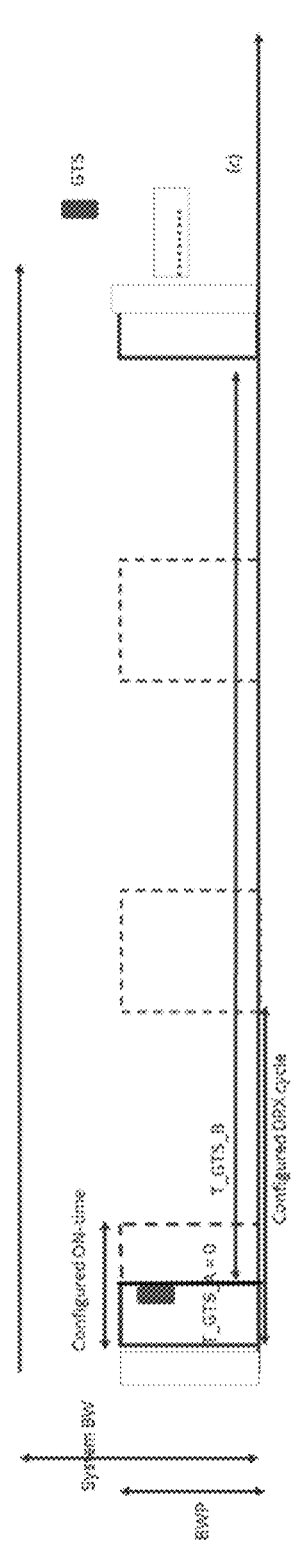

In the example of FIGS. 11A-C, T_GTS_A is shown as the duration between the location of GTS signal detection and start position of sleep duration. More generally, T_GTS_A may refer to an offset to the start position of sleep duration from a given reference point, where the examples of reference point in time include:

Offset is counted from the next symbol after GTS signaling is received, i.e., if GTS signaling spans symbols i, i+1, . . . , i+K, K=>1, offset counting starts from symbol i+K+1, until the symbol before or when sleep duration starts, i.e., until symbol j−1 or j if sleep duration starts at j Offset is counted from the first symbol when GTS signaling is received, i.e., from symbol i if GTS signaling spans symbols i, i+1, . . . , i+K, K=>1, until the symbol before or when sleep duration starts if GTS signaling spans symbols i, i+1, . . . , i+K, K=>1, until the symbol before or when sleep duration starts Offset is counted from the last symbol where GTS signaling is received, i.e., if GTS signaling spans symbols i, i+1, . . . , i+K, K=>1, offset counting starts from symbol i+K, until the symbol before or when sleep duration starts, i.e., until symbol j−1 or j if sleep duration starts at j Offset is counted from the slot boundary, i.e., from the beginning of the current slot where GTS signaling is received, until the symbol before or when sleep duration starts Offset is counted from the beginning of current sub-frame or a given sub-frame until the symbol before or when sleep duration start In at least one exemplary embodiment of the present disclosure, L1 signaling may trigger GTS along with switching one or more DRX parameters. For example, L1 signaling may switch the UE to a short DRX cycle from a long DRX cycle or vice versa. The mobile radio communication terminal device, e.g., UE, may assume the configured values of drx-ShortCycle and drx-ShortCycleTimer or L1 signalling ma indicate these values explicitly which in this case overrides the configured values. The rest of the DRX parameters may then be RRC configured. In one example, the updated DRX parameters or switched DRX configuration may be effective after T_GTS_A expires or duration indicated by T_GTS_B ends or be applied after the end of current DRX cycle or from next Nth DRX cycle, N=>1. The parameter N may be fixed in specifications, configured by higher layer signaling, or explicitly indicated in the L1 signaling.

In various exemplary embodiments of the present disclosure, the L1 trigger providing GTS may additionally indicate bandwidth part so that the mobile radio communication terminal e.g., UE, wakes up in the different bandwidth part that indicated by the received GTS. The UE may be in the new indicated bandwidth part for a duration configured by a timer or until further signalling is received to switch. If a timer is configured, then upon expiry UE reverts back to previous or a given default bandwidth part and continue with configured DRX operation. In one example, the UE may switch to the new BWP in the next DRX cycle after the sleep duration indicated by the GTS signalling expires or the UE may switch to the new BWP after the end of current DRX cycle or in next Nth DRX cycle, N=>1. In at least one example, the UE may keep operating with a common DRX configuration for all bandwidth parts or when switched to a different bandwidth parts, UE may assume bandwidth part specific DRX configuration, if supported.

Figure 12:
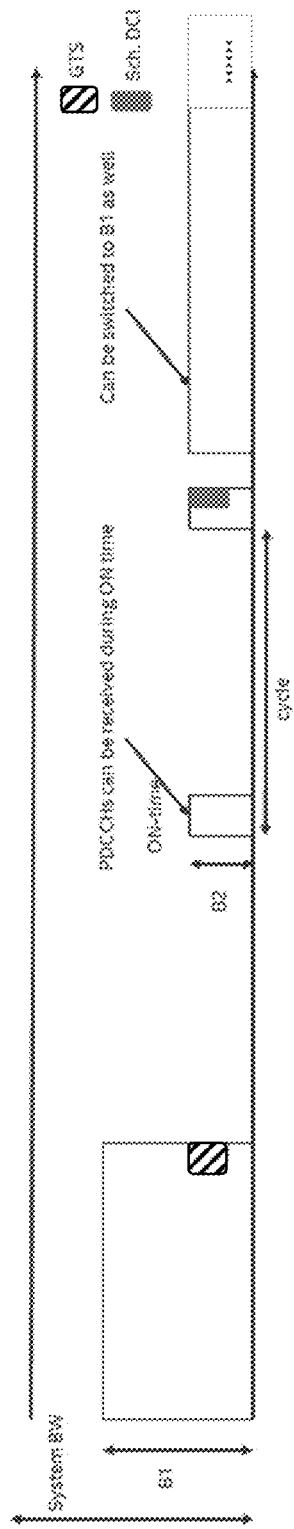

In accordance with exemplary embodiments of the present disclosure, FIG. 12 shows a mobile radio communication terminal device, e.g., a UE, that is in active state and is continuously monitoring for DCIs, and L1 signaling is provided for GTS and/or activation of DRX mode. As shown, the UE wakes up on a different bandwidth part following the indication in GTS signaling when next DRX cycle begins.

In the example of FIG. 12, it is assumed that UE receives the GTS and/or activation in bandwidth part B1, and the L1 signaling may optionally indicate bandwidth part to the UE so that UE is in a different bandwidth part B2 during the active/ON state in the DRX mode. Smaller bandwidth part B2 compared to B1 may provide power saving gain.

In another example, a mobile radio communication terminal device (e.g., UE) may not be configured with a DRX configuration or may not have any activated DRX mode with a DRX configuration and L1 signaling for GTS may dynamically put the UE to sleep for a given duration. In such examples, an L1 trigger for GTS may indicate the duration of the sleep and/or start position of the duration. Alternatively, GTS signaling may dynamically indicate that UE skips monitoring a following/subsequent N=>1 PDCCH monitoring occasions.

In various exemplary embodiments of the present disclosure, a mobile radio communication terminal device, e.g., a UE, can be configured to receive a Wake-up Signal (NUS) following a sleep state when UE is operating in DRX mode with a given DRX configuration. In at least one embodiment, UE can receive higher layer signaling WUS_transmission=ON/OFF by RRC. That is, if ON, then the UE monitors for a WUS, if OFF, the UE does not monitor for a WUS. The enabling/disabling of WUS monitoring can be group-specific, e.g., cell specific, or device (e.g., UE) specific and configured (e.g. by dedicated RRC signaling). In one or more examples, a UE can receive WUS to transition from deep sleep state to light sleep state or active state or from light sleep state to active state.

In various exemplary embodiments of the present disclosure, a mobile radio communication terminal device/UE can be configured with a WUS monitoring duration. In such examples, the UE is only ON for this duration, unless WUS is detected which would require the UE to wake up and monitor for a configured ON duration for regular PDCCH and other signaling monitoring. This may result in more power saving compared to the case when UE always wakes up for a configured ON duration for PDCCH monitoring which can be much longer than duration of WUS monitoring. In one example, UE may monitor WUS every N DRX cycles, N being positive integer. The value of N can be device/UE specific and configured by RRC signaling. As mentioned above, configured ON duration following WUS detection, e.g., for PDCCH monitoring, may include one or more of drx-onDurationTimer, drx-InactivityTimer. Note that WUS monitoring duration may additionally be used for beam management and/or other necessary synchronization operation if needed, which in at least one example, can be performed even before UE monitors WUS. In one or more examples, WUS may provide or contain additional information for the UE to attain or maintain synchronism with one or more cells.

Accordingly, a parameter can be identified, such as monitoring window for WUS drx-onDurationTimer-WUS which in one example, which can be configured in addition to drx-onDurationTimer, where in one example, drx-onDurationTimer>drx-onDurationTimer-WUS. drx-onDurationTimer does not start unless a WUS is detected during drx-onDurationTimer-WUS. A DRX configuration may include drxonDurationTimer-WUS as part of the configuration. In one example, the minimum ON duration every DRX cycle is drx-onDurationTimer-WUS, unlike drx-onDurationTimer which is the minimum ON duration in existing C-DRX mode operation that does not reply on WUS.

Figure 13A:
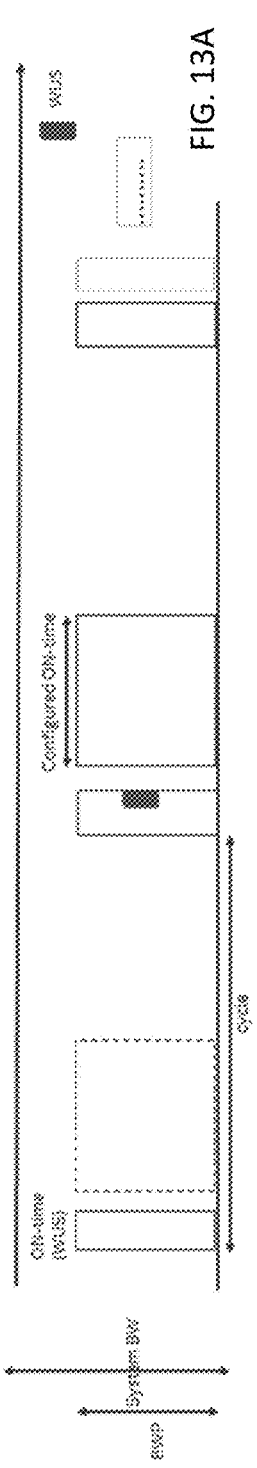
Figure 13B:
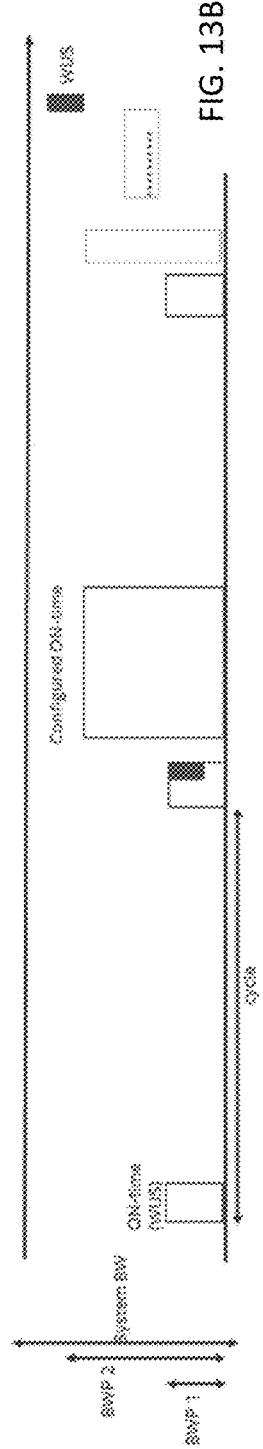
Figure 13C:
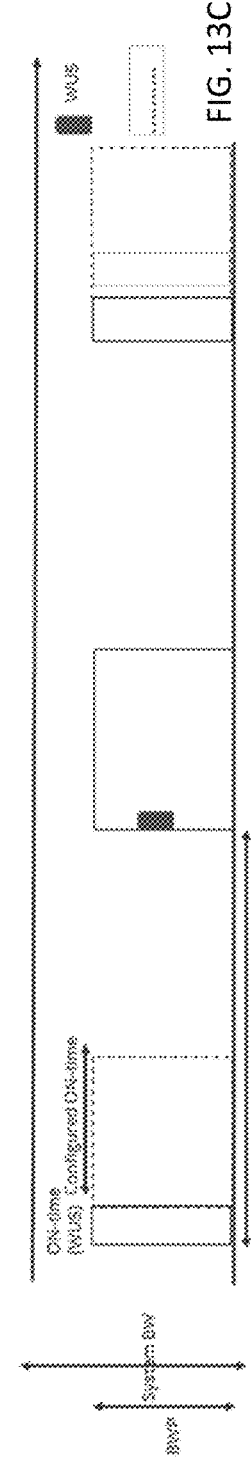
Figure 13D:
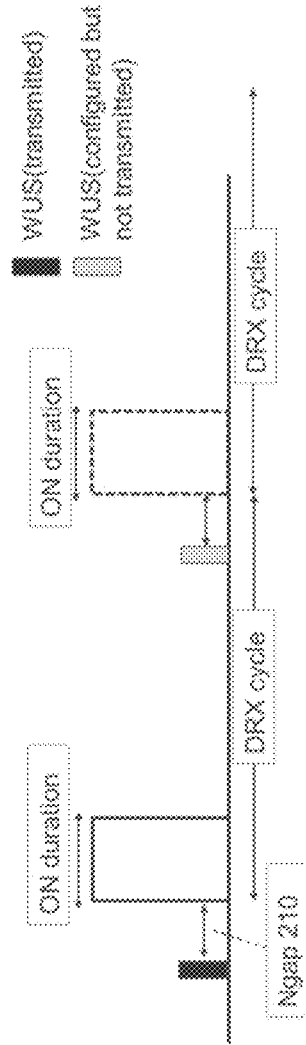

FIGS. 13A-D show, according to exemplary embodiments of the present disclosure, a mobile radio communication terminal device, e.g., a UE, operating with a DRX mode, such as with two configured ON times. One configured ON time being drx-onDurationTimer (configured ON time in FIGS. 13A-C) and another configured ON-time being drx-onDurationTimer-WUS (ON time (WUS) in FIGS. 13A-C). FIG. 13D shows one exemplary WUS configuration for on-off DRX operation.

In the example of FIG. 13A a mobile radio communication terminal device, e.g., UE, turns ON for monitoring WUS for a limited duration according to a configured DRX cycle, and if detected, it wakes up and monitor for a configured –ON duration after a period of time. The period of time or duration is referred to as offset or gap in the examples below. In the example of FIG. 13B, a WUS, if detected by the UE, may trigger the UE to switch BWP for active state operation. In the example of FIG. 13C, the UE immediately starts monitoring for PDCCH and other signaling for the configured ON duration after WUS is detected.

In the examples of FIGS. 13A-B, there is a gap between when drxonDurationTimer-WUS ends and dix-onDurationTimer starts. The gap can alternatively called an offset. In FIG. 3(b), it is assumed that WUS may potentially indicate BWP, i.e., UE wakes up and start monitoring for regular PDCCH or scheduling DCI in a different, possibly, larger BWP than used for WUS monitoring. In another example, similar to what is shown in FIG. 13B, WUS can be monitored in a small BWP (e.g., BWP 1) and if detected, UE may switch to a default/configured bandwidth part (e.g., BWP 2) or the bandwidth part where the UE was previously in before DRX mode was configured. In the example of FIG. 13C, it is assumed that drx-onDurationTimer starts immediately after drx-onDurationTimer-WUS ends and WUS is detected.

In various embodiments, a parameter can be identified, $N_{gap}$, which can indicate the inactivity duration which starts after drxonDurationTimer-WUS expires and ends before drx-onDurationTimer starts. This $N_{gap}$ is the offset I.e. the duration during which UE prepares for next DRX ON duration. $N_{gap}$ can be expressed in terms of symbols or slots in a given numerology or in ms. In some designs or examples, $N_{gap}$ can be indicated as part of the WUS signaling. In at least one example, if UE detects WUS early during the monitoring window, UE may sleep for the remaining duration of the monitoring window and turns ON when configured ON duration for PDCCH monitoring starts. In that context, $N_{gap}$ can be expressed as the time between the location of successful detection of WUS and when ON duration for PDCCH monitoring starts. Alternatively, the $N_{gap}$ can still be defined as the duration between the end of WUS monitoring occasion and the start of on-duration for PDCCH monitoring.

In one example, if a mobile radio communication terminal device, e.g., a UE, is configured to monitor WUS, the DRX cycle may start with the ON time for WUS monitoring, drx-onDurationTimer-WUS, being the duration at the beginning of a DRX Cycle instead of dix-onDurationTimer as in existing solutions that do not include WUS monitoring. In that context, drx-SlotOffset may indicate the delay before starting the dix-onDurationTimer-WUS. So, drx-onDurationTimer may start after an offset or immediately upon detection of a WUS. Alternatively, in another example, DRX cycle can begin with dix-onDurationTimer as in legacy system and an offset can be configured to identify the location of WUS monitoring window, e.g., UE can be configured to turn ON for the WUS monitoring window, e.g., drx-onDurationTimer-WUS, before the configured location where drx-onDurationTimer is supposed to start if WUS is detected where there can be an offset between when drx-onDurationTimer-WUS ends or WUS is detected and dix-onDurationTimer starts.

In another example, the start position of ON duration for PDCCH monitoring dix-onDurationTimer may be indicated as offset to a reference point, e.g., a given/current sub-frame or slot boundary or where DRX cycle starts or the location/CORESET where WUS is detected or when monitoring window for WUS ends. This additional offset parameter can be part of a DRX configuration, e.g., if SlotOffset is used to indicate the delay before DRX cycle starts with drx-onDurationTimer-WUS or the offset can be dynamically indicated as part of WUS. In one example, WUS may dynamically indicate ON duration drx-onDurationTimer. Indicated ON duration may override the configured ON duration as part of DRX configuration. The indicated ON duration may span one or more DRX cycles.

The examples shown in FIGS. 13A-C may assume the DRX starts from the monitoring window for WUS, or drx-onDurationTimer-WUS. In at least one other exemplary embodiment, referencing to FIG. 13D, the WUS monitoring window or duration may be $N_{gap}$ symbols or slots for a given numerology or ms 210 before the beginning of a configured DRX Cycle so as to keep the PDCCH monitoring activity in DRX cycle as in legacy if it occurs. If UE does not detect the WUS signal in the monitoring window or occasion that indicates UE to perform DRX operations in the next M DRX cycles, the UE will skip the PDCCH monitoring in the next M DRX cycles; If detected, the legacy DRX operation is performed, that is, the UE turns ON at the beginning of the DRX cycle for a configured ON duration for PDCCH monitoring. The values of M maybe fixed in specifications or configured by higher layers and/or one value of M is dynamically indicated by WUS at least based on the real-time traffic characteristic of the said UE. In addition, $N_{gap}$ value may be reported by UE as part of UE capability and then configured accordingly. It is assumed that M=1 in the example of FIG. 13D.

In at least one embodiment, L1 signaling may trigger WUS along with switching one or more DRX parameters. For example, L1 signaling may switch the mobile radio communication terminal (e.g. UE) to a short DRX cycle from a long DRX cycle. The UE may assume the configured values of drx-ShortCycle and drx-ShortCycleTimer or L1 signalling may indicate these values explicitly which in this case over-rides the configured values. Rest of the DRX parameters can be RRC configured.

In at last one other example, the L1 trigger providing WUS may additionally indicate bandwidth part so that the UE wakes up in a different bandwidth part, such as in the example of FIG. 13B. The UE may be in the new bandwidth part for a duration configured by a timer or until further signalling is received to switch. If a timer is configured, then upon expiration, the UE may reverts back to previous or a given default bandwidth part and continue with configured DRX operation.

In at least one example, WUS may indicate whether a mobile radio communication terminal device/UE exits the DRX mode or just wakes up for the subsequent ON duration for monitoring scheduling DCI.

FIGS. 14A-C show different examples of monitoring timer for WUS, PDCCH, and subsequent PDSCHs in accordance with exemplary embodiments of the present disclosure.

In various examples, WUS detection may imply that a mobile radio communication device terminal (e.g., a UE) may receive PDCCH/scheduling DCI or other transmission from a network soon. In at least one example, e.g., according to FIG. 14A, a mobile radio communication terminal device (e.g., a UE) monitors for WUS according to a timer, such as drx-onDurationTimer-WUS. If the UE detects a WUS, the UE turns ON and monitors for PDCCH subsequently, for a duration given by another timer, such as drx-onDurationTimer. If the UE detects PDCCH, the UE starts another timer, such as drx-InactivityTimer for subsequent PDSCH and further PDCCH monitoring and detection. The timer for monitoring PDCCH may start X=>1 symbols or slots after successful detection of WUS, for a given numerology. Similarly, the timer for PDSCH and/or subsequent PDCCH and/or other transmission reception may start X=>1 symbols or slots after successful detection of PDCCH, for a given numerology.

In at least one other example, e.g., according to FIG. 14B, two timers are configured instead of three in FIG. 14A. As detection of WUS implies PDCCH for a UE is imminent, an ON duration timer is used which can be used for both monitoring WUS and/or PDCCH. PDCCH monitoring follows WUS detection of course. Note that WUS can be transmitted in a sequence or PDCCH/DCI. If WUS is transmitted in a PDCCH, then UE just monitors for PDCCH directly, according to the PDCCH monitoring configuration for WUS, which may be different from regular PDCCH monitoring for data scheduling. The example of FIG. 14B assumes an initial timer when the UE turns ON as part of DRX cycle contains one or more PDCCH monitoring occasions and/or one or more WUS monitoring occasions. After the UE detects a WUS, the UE may start monitoring for PDCCH in one or more subsequent occasions. After detection of PDCCH, the UE starts another time for receiving subsequent PDSCH and/or PDCCH and/or other transmissions from network. The first timer maybe dix-onDurationTimer where the UE monitors for both WUS and/or scheduling DCI/PDCCH. It may be possible that the WUS is transmitted in a PDCCH or sequence as well. The second timer can be analogous to drx-InactivityTimer, which may start X=>1 symbols or slots after successful detection of PDCCH, for a given numerology. In at least one example, the UE monitors for WUS PDCCH at M=>1 occasions during the timer, and once WUS is detected, the UE monitors for regular PDCCH at N=>1 occasions out of K=>N occasions configured within the timer. In other words, after detection of WUS, there may be only N occasions remaining within the timer to monitor for PDCCH/scheduling DCI.

The PDCCH carrying WUS and PDCCH for scheduling may have different configuration and monitoring properties.

In at least another example, e.g., according to FIG. 14C, two timers are configured instead of three in FIG. 14A. As detection of WUS implies PDCCH for a UE is imminent, an ON duration timer is used which can be used for monitoring WUS, such as dix-onDurationTimer or dix-onDuration-Timer-WUS. Upon detection of WUS, the UE starts another timer for PDCCH and/or PDSCH reception, a timer that can be analogous to drx-InactivityTimer. In this example, the difference compared to legacy system is that in legacy system drx-onDurationTimer is used for monitoring PDCCH and dix-InactivityTimer starts after detection of PDCCH. Whereas in this example, it is assumed that an initial ON duration timer is used, such as dix-onDuration-Timer or dix-onDurationTimer-WUS for monitoring WUS only. Note that WUS can be transmitted in a sequence or in a PDCCH, where in one example, the PDCCH can be a scheduling DCI as well. Alternatively, WUS can be transmitted in a different PDCCH (e.g., not scheduling DCI) or a sequence. In this example, the second timer includes monitoring occasions for receiving PDCCHs/scheduling Das and receiving subsequent PDSCHs, e.g., unlike legacy systems, here the UE may start the second timer before receiving PDCCH. Unless WUS is transmitted in a scheduling DCI or PDCCH, scheduling DCI/PDCCHs are received during the second timer, such as drx-Inactivity-Timer. Here, UE starts drx-InactivityTimer following detection of WUS because network is likely to send WUS because there is a PDCCH going to be sent to the UE, and the UE can just start drx-InactivityTimer right way for receiving PDCCH/PDSCHs, instead of using another intermediate timer, as shown in FIG. 14A. Hence, in one example, drx-onDurationTimer may be re-defined in NR which may include monitoring occasions of WUS only, and drx-InactivityTimer may be re-defined which may include monitoring for PDCCH/scheduling Das and subsequent PDSCHs. Of course, drx-InactivityTimer maybe triggered multiple times if needed, such as when UE receives PDCCH near the end of current drx-InactivityTimer. The second timer may start after X=>1 symbols or slots following successful detection of WUS during first timer, based on a given numerology. In one example, if WUS is transmitted in a scheduling DCI (or, if receiving a first scheduling DCI serve as WUS as well, implicitly/explicitly) during the first timer such as drx-onDurationTimer or drx-onDurationTimer-WUS, the corresponding PDCCH may be transmitted in the second timer, such as drx-InactivityTimer.

The timers considered in the examples in FIG. 4 can be UE specific or group-specific configured, by RRC signalling. One or more of the timers can be part of a DRX configuration.

In accordance with various exemplary embodiments, various types of DRX mode operation can be configured to a mobile radio communication terminal device (e.g., UE) in connected mode:

Type 1: Activation and/or de-activation of DRX mode with at least one DRX configuration by RRC or MAC CE
  i. Type 1a: RRC signaling can be provided to (re)configure one or more DRX parameters/switch DRX configuration
  ii. Type 1 b: L1 signaling can be provided to update DRX parameters/switch DRX configuration and/or indicate go-to-sleep and/or wake-up trigger
  iii. Type 1c: RRC signaling or a combination of L1 and RRC signaling can be provided to (re)configure one or more DRX parameters/switch DRX configuration and/or L1 signaling can be provided to indicate go-to-sleep and/or wake-up trigger
  iv. Type Id: A new MAC control element (CE) may be introduced for DRX parameters reconfiguration, which is identified by a MAC PDU subheader with a dedicated LCID (Logical Channel Group ID). In addition, it may have a fixed size and consist a field to indicate the DRX parameter set or configuration index to be applied by MAC entity. In addition, L1 signaling can be provided to indicate go-to-sleep and/or wake-up trigger Type 2: Activation and/or de-activation of DRX mode with at least one DRX configuration by L1 signaling
  i. Type 2a: RRC or MAC CE signaling can be provided to reconfigure one or more DRX parameters/switch DRX configuration
  ii. Type 2b: L1 signaling can be provided to update DRX parameters/switch DRX configuration and/or indicate go-to-sleep and/or wake-up trigger
  iii. Type 2c: RRC/MAC CE signaling or a combination of L1 and RRC/MAC CE signaling can be provided to (re)configure one or more DRX parameters/switch DRX configuration and/or L1 signaling can be provided to indicate go-to-sleep and/or wake-up trigger.

In various exemplary embodiments, the activation of DRX mode with at least one DRX configuration does not necessarily imply DRX configuration index is always indicated in the L1 signaling that provides activation trigger, rather it may also be possible that the mobile radio communication terminal device/UE is configured with at least one DRX configuration by prior higher layer signaling such as RRC signaling and L1 activation signaling just turns ON the DRX mode with the previously indicated DRX configuration.

In at least one exemplary embodiment of the present disclosure, RRC signaling or L1 signaling may activate the DRX mode which may expire based on a timer. For example, if a mobile radio communication terminal device (e.g., a UE) receives a subsequent L1 signaling trigger such as WUS or scheduling DCI in ON duration, which may serve as indication to terminate DRX mode, the UE may exit the DRX mode. Otherwise the UE may continue to operate in DRX mode until the timer expires.

Examples of L1 signaling may include sequence-based or DCI-based transmission, e.g., in a PDCCH or a combination of them, where both can be device (e.g., UE) specific or group-common. The unit of one or more of different configured or indicated durations or periodicity or offset can be expressed in sub-ms and/or ms and/or symbols/slot(s) of a given numerology. Examples of higher layer signaling in the context of following embodiments include NR minimum system information (MSI), NR remaining minimum system information (RMSI), NR other system information (OSI) or radio resource control (RRC) signaling, where RRC signaling can be mobile radio communication terminal device (e.g., UE) specific or group common.

In various exemplary embodiments of the present disclosure, DCI based L1 signaling design may be implemented, e.g., where a group of mobile radio communication terminals (e.g., UEs) monitor a common time-frequency resource to obtain control information which can be UE specific and/or group-common. The DCI can be transmitted in a PDCCH associated with a common RNTI or the DCI can be transmitted in a sequence without associating any RNTI. Although it this application we consider RRC_connected mode UE, it should be understood that similar mechanisms can be applied to UE in other states/mode, if relevant, such as IDLE or inactive states.

In various examples, in a given cell, a group of mobile radio communication terminal devices (e.g., UEs) can be formed that monitor a DCI format which is appended with CRC that is masked with a common RNTI, e.g., PDCCH associated with a common RNTI such as power saving RNTI or DRX RNTI or GTS RNTI or WUS RNTI, depending on the functionality of the DCI format. The RNTI can be configured by higher layers via NR minimum system information (MSI), NR remaining minimum system information (RMSI), NR other system information (OSI) or radio resource control (RRC) signaling.

In such examples, DCI with common RNTI may be received in a common time-frequency resource, such as common search space or in a UE specific time-frequency resource such as UE specific search space.

Below are examples of where the group-common DCI (GC-DCI) has mobile radio communication terminal device (e.g., UE) specific content.

Figure 15:
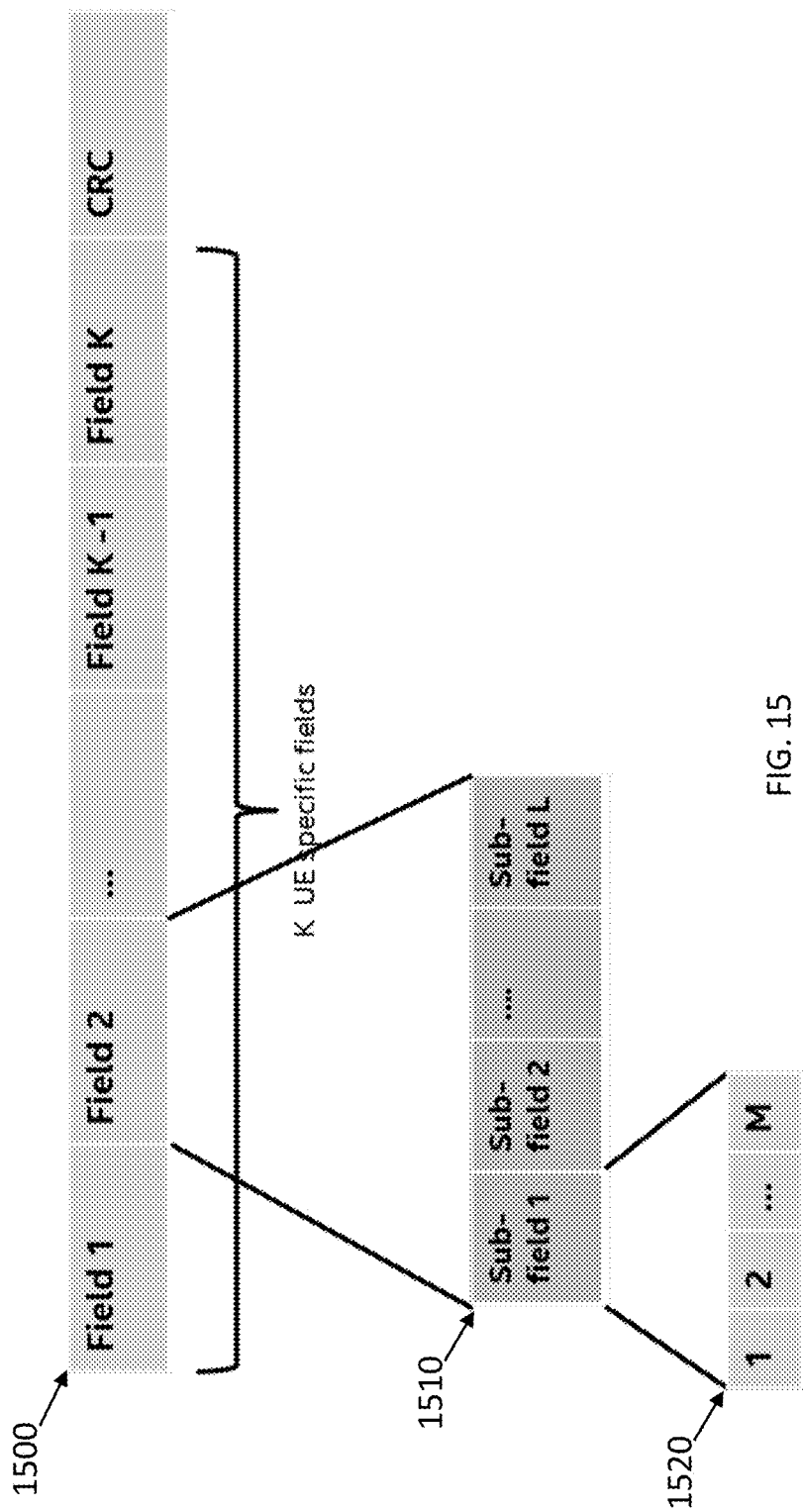
FIGS. 15-16 and 18 shows exemplary message formats according to various exemplary embodiments of the present disclosure.

FIG. 15 shows a common DCI format structure with mobile radio communication terminal device (e.g., UE) specific fields in accordance with exemplary embodiments of the present disclosure. In other words, FIG. 15 is an example of a generic structure for a group-common DCI with device specific content.

In the example of FIG. 15, there are K=>1 fields mobile radio communication terminal device (e.g., UE) specifically configured, e.g., network maps devices/UEs to respective fields which can be obtained via a prior higher layer signaling, such as RRC signaling. Each device/UE specific field may have L=>1 sub-fields, where each sub-fields may have M=>1 bits in each. Hence, excluding the CRC bits, the DCI format has overall KLM bits, where there are LM bits in each UE specific field.

In at least one example, a common DCI format can be used for signaling GTS. In one embodiment, the each radio communication terminal device/UE specific field may have just 1 bit, where bit=1 may indicate GTS, and bit=0 may indicate no GTS trigger for the given UE.

Figure 16:
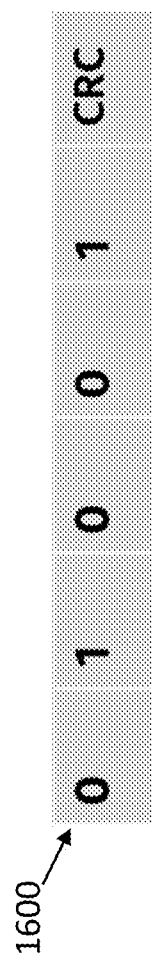

FIG. 16 shows a common DCI format structure with five UE specific fields, where each UE specific field has 1 bit in it. Bit=1 indicates GTS trigger TRUE, bit=0 indicates GTS trigger FALSE, in accordance with exemplary embodiments of the present disclosure. That is, FIG. 16 shows an example where K=5 UEs are configured to monitor a common DCI, where only UEs mapped to 2nd and 5th fields are indicated GTS trigger, other mobile radio communication terminal devices (e.g., UEs) are not provided with any GTS trigger. Hence, upon detecting the DCI format, mobile radio communication terminal devices (e.g., UEs) mapped to 2nd and 5th fields may go to sleep, whereas other UEs continue to be in active state either until the end of a configured ON duration or until further signaling is received.

In at least one example, a single bit field may be used to indicate activation and/or deactivation of a DRX mode as well. For example, as shown in FIG. 16, bit value 1 may indicate activation of DRX mode with a given DRX configuration for the respective mobile radio communication terminal devices (e.g., UEs). If the UE is not operating based on any DRX mode, then activation of DRX mode may alternatively serve as GTS as well, for example, when the UE sleeps for an offset before DRX cycle starts. In other words, GTS signaling may trigger periodic ON/OFF behavior for a UE which can be similar to activation of a DRX mode, or alternatively, GTS signaling may indicate sleep duration for an instance without implying any periodicity, that is, the UE wakes up after indicated sleep duration and resume operation according to pre-existing configuration.

If the DCI only provides GTS trigger, mobile radio communication terminal devices (e.g., UEs) that received the trigger as TRUE, may follow device/UE specific configured set of parameters such as T_GTS_A and/or T_GTS_B, as described herein, e.g., in regards to GTS signaling. Mobile radio communication terminal devices/UEs may continue to follow existing DRX configuration after sleep duration expires.

Figure 17:
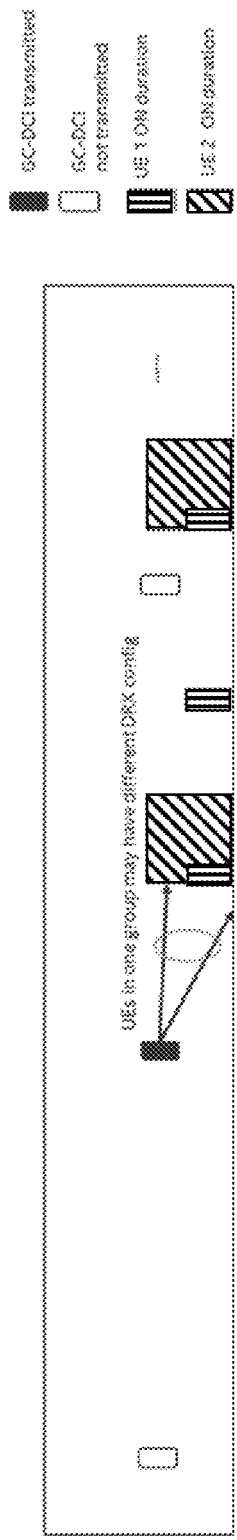

In various examples, multiple mobile radio communication terminal devices (e.g., UEs) receiving GTS and/or activation trigger in the GC-DCI may have different DRX configurations, e.g., different DRX cycles and/or different ON durations etc. For example, in the exemplary embodiment of FIG. 17 shows two mobile radio communication terminal devices (e.g., UEs) that have received GTS or an activation trigger in a GC DCI, however each UE has different DRX configurations.

In at least one example, one or more of the following higher layer configuration can be provided to a mobile radio communication terminal device (e.g., a UE) so that the UE reacts accordingly following a GTS trigger:

Start the sleep duration after an offset, if an offset is configured. If not, then how fast UE can go to sleep may be subject to UE capability, i.e., as soon as it detects the GTS trigger as TRUE and turn off the RF or baseband components.

Sleep for a given duration. Duration may also be function of configured ON duration such as UE sleep for the remainder Switch to a different BWP in the next Kth DRX cycle, K=>1

Monitor for a reduced number of PDCCH candidates for one or more of the subsequent ON durations In at least one example, one or more mobile radio communication terminal device (e.g., UE) specific configurations can be dynamically indicated in the mobile radio communication terminal device (e.g., UE) specific fields, such as:

Offset to the start position of sleep duration

Sleep duration

Bandwidth part ID, if the UE wakes up in a different bandwidth part subsequent to the sleep duration, Switch DRX parameters within the existing DRX configuration, e.g., switching between long and short DRX cycles Index of a DRX configuration where the UE specific field may comprise more than one bit, and/or may have more than one sub-fields, in order to dynamically indicate one or more parameters.

In at least one example, a mobile radio communication terminal device or UE specific field may have K bits which indicate index of a configuration from a set of configuration set. Each configuration may comprise one or more of the above parameters or indications. For example, UE specific field may have 2 bits which may be configured as follows:

| Bit values | Indicated value/Parameter Set/Trigger |
|---|---|
| 00 | GTS trigger FALSE |
| 01 | GTS trigger TRUE and a first pair of {T_GTS_A, T_GTS_B} |
| 10 | GTS trigger TRUE and a second pair of {T_GTS_A, T_GTS_B} |

-continued

| Bit values | Indicated value/Parameter Set/Trigger |
|---|---|
| 11 | GTS trigger TRUE and a given bandwidth part ID for switching |

In one or more exemplary embodiments of the present disclosure, common DCI format can be used for signaling WUS. In at least one exemplary embodiment, each mobile radio communication terminal device/UE specific field may have just 1 bit, where bit=1 may indicate wake-up, and bit=0 may indicate no wake-up for a given mobile radio communication terminal device/UE.

Figure 18:
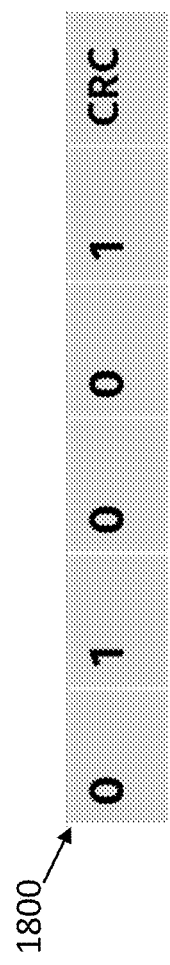

The exemplary embodiment of FIG. 18 shows a common DCI format structure with five mobile radio communication terminal device/UE specific fields, where each mobile radio communication terminal device/UE specific field has 1 bit in it. Bit=1 indicates WUS trigger TRUE, bit=0 indicates WUS trigger FALSE. FIG. 18 shows an example where K=5 mobile radio communication terminals (e.g., UEs) are configured to monitor a common DCI, and where only UEs mapped to 2nd and 5th fields are indicated WUS trigger, the other UEs are not provided with any WUS trigger. Hence, upon detecting the DCI format, UEs mapped to 2nd and 5th fields may wake-up for a subsequent duration to monitor scheduling Das or other PDCCHs, whereas the other UEs do not wake-up and return to sleep until the end of given DRX cycle or until next WUS monitoring occasion.

In one or more exemplary embodiments of the present disclosure, one or more mobile radio communication terminal device/UE specific configurations can be dynamically indicated in the mobile radio communication terminal device/UE specific fields, such as:
  $N_{gap}$ or Offset to the start position of ON duration for PDCCH monitoring, e.g., dix-onDurationTimer or drx-InactivityTime
  ON duration for PDCCH monitoring
  Bandwidth part ID, if the UE wakes up in a different bandwidth part subsequent to WUS detection,
  Switch DRX parameters within the existing DRX configuration, e.g., switching between long and short DRX cycles
  Index of a DRX configuration
  A set (e.g., possibly of reduced size) of PDCCH candidates to monitor for one or more of the subsequent ON durations
  De-activation of DRX mode
where the UE specific field may comprise more than one bit, and/or may have more than one sub-fields, in order to dynamically indicate one or more parameters. One or more parameters that are not dynamically indicated can be instead higher layer configured or not supported as part of a supported feature following WUS detection or indicated as part of a different signaling. For example, $N_{gap}$ can be higher layer configured instead of indicated in WUS.

In at least one other embodiment or option, K set of PDCCH monitoring candidates during ON duration can be configured by higher layers via UE specific RRC signalling. The L1 signalling of WUS may dynamically indicate which one set of PDCCH monitoring candidates is used during the ON duration. For instance, one or more search space set or a subset of search space sets or one or more CORESET may be disabled for PDCCH monitoring during ON duration for power saving.

In one or more examples, mobile radio communication terminal device/UE specific fields may have K bits which indicate index of a configuration from a set of configuration set. Each configuration may comprise one or more of the above parameters or indications. For example, a mobile radio communication terminal device/UE specific field may have 2 bits which may be configured as follows:

| Bit values | Indicated value/Parameter Set/Trigger |
|---|---|
| 00 | WUS trigger FALSE |
| 01 | WUS trigger TRUE and de-activation of DRX mode |
| 10 | WUS trigger TRUE and a given value of $N_{gap}$ and/or a given value of ON duration for PDCCH monitoring |
| 11 | WUS trigger TRUE and a given value of bandwidth part ID |

In various examples, for a given value of $N_{gap}$, ON duration for PDCCH monitoring, or bandwidth part ID can be chosen/mapped to the corresponding bit value labels from a set of supported values of the parameters.

In one or more examples, if activation/deactivation of DRX mode is dynamically indicated or GTS and WUS signaling may serve as activation and deactivation signaling respectively, more generally, a mobile radio communication terminal device/UE can be configured to receive one or more of the following indication in the mobile radio communication terminal device/UE specific field in a common DCI:
  Activation signaling
  Activation signaling with GTS, —mobile radio communication terminal device/UE starts DRX cycle after an offset or sleep duration
  GTS signaling without activation, i.e., GTS signaling can be received independently, e.g., a GTS signaling can be received to put the mobile radio communication device/UE in a micro-sleep, and after expiry, the mobile radio communication device/UE resumes DRX mode operation
  Deactivation signaling
  Deactivation signaling with WUS, i.e., WUS signaling itself serve or indicate deactivation of DRX mode
  WUS signaling without deactivation, that is, the mobile radio communication device/UE just monitors for ON duration for PDCCH monitoring after WUS detection and does not leave DRX mode In one or more examples, a same common RNTI can be used to detect GTS and WUS, if configured for a mobile radio communication terminal device (e.g., UE) to monitor. As GTS and WUS are monitored in different occasions, a separate RNTI may not be needed, from a UE perspective. In at least one example, a unified DCI format with same common RNTI can be used for indicating GTS and WUS and/or activation and deactivation of DRX mode. As transmission occasions of WUS and GTS are mutually exclusive, explicit indication of whether the DCI is sent for GTS or WUS may not be needed. For example, when the UE is in active state and monitoring scheduling DCI, it can only receive GTS. Similarly, when the UE is in DRX mode and turns ON from sleep state, it can only receive WUS. Hence, considering which state UE is currently in, different bit fields inside a UE specific field in GC DCI may have different interpretations, such as:
  A field to indicate activation and deactivation of DRX mode:
    If received during active state while monitoring PDCCHs or scheduling DCI: the bit field=0 may imply activation, 1 may imply deactivation of DRX mode, vice versa If received during WUS monitoring duration: the bit field=0 may imply stay in activated DRX mode, 1 may imply deactivation of DRX mode, vice versa A field to indicate offset to start of sleep or ON duration:
If received during active state while monitoring PDCCHs or scheduling DCI: the field may indicate offset to start of sleep duration
If received during WUS monitoring duration: the field may indicate offset to start of following ON duration for PDCCH monitoring A field to indicate duration of following sleep or ON duration:
If received during active state while monitoring PDCCHs or scheduling DCI: the field may indicate sleep duration
  The indicated sleep duration may span less or more than a DRX cycle
If received during WUS monitoring duration: the field indicates ON duration for PDCCH monitoring
  The indicated sleep duration may span less or more than a DRX cycle A field to indicate bandwidth part ID
If received during active state while monitoring PDCCHs or scheduling DCI: the field indicates the bandwidth part where UE turns ON in subsequent occasion
If received during WUS monitoring duration: the field indicates the bandwidth part where UE wakes up and monitor scheduling DCI A field to indicate the update on the number of PDCCH candidates In at least one example, DRX configuration is not indicated explicitly and with the indication of bandwidth part, a mobile radio communication terminal device (e.g., a UE) identifies a DRX configuration if the DRX configuration is associated with a bandwidth part.

Figure 19:
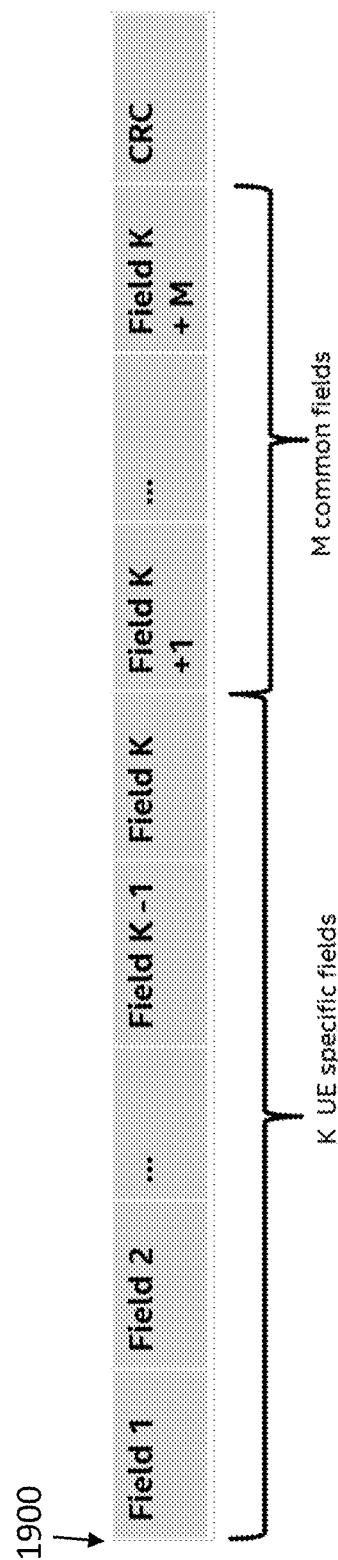
FIG. 19 shows an exemplary signaling flow diagram according to various exemplary embodiments of the present disclosure.

In at least one example, GC DCI may have both mobile radio communication terminal device (e.g., UE) specific and common field(s). The exemplary embodiment of FIG. 19 shows a general structure of such DCI format where there are K mobile radio communication terminal device/UE specific fields and M common fields. Each mobile radio communication terminal device/UE that is configured to monitor the DCI format would obtain control information from respective UE specific field and M common fields.

For example, if the GC DCI is used for GTS, there can be one or more common fields which can be used to indicate one or more of the following:
Offset to start position of sleep duration
Sleep duration—This implies UEs that received GTS trigger as TRUE may have same sleep duration. This may be useful to indicate in a common manner if there is correlation among the traffic arrival pattern of the group of UEs that monitor the GC-DCI Similarly, in the context of GC DCI for WUS, common field(s) can be used to indicate at least the ON duration for PDCCH monitoring following the detection of WUS DCI.

Although not shown in the structures above, GC DCI format for DRX mode adaptation and/or power saving signaling trigger such as WUS/GTS may have some reserved bit fields as well.

Figure 20:
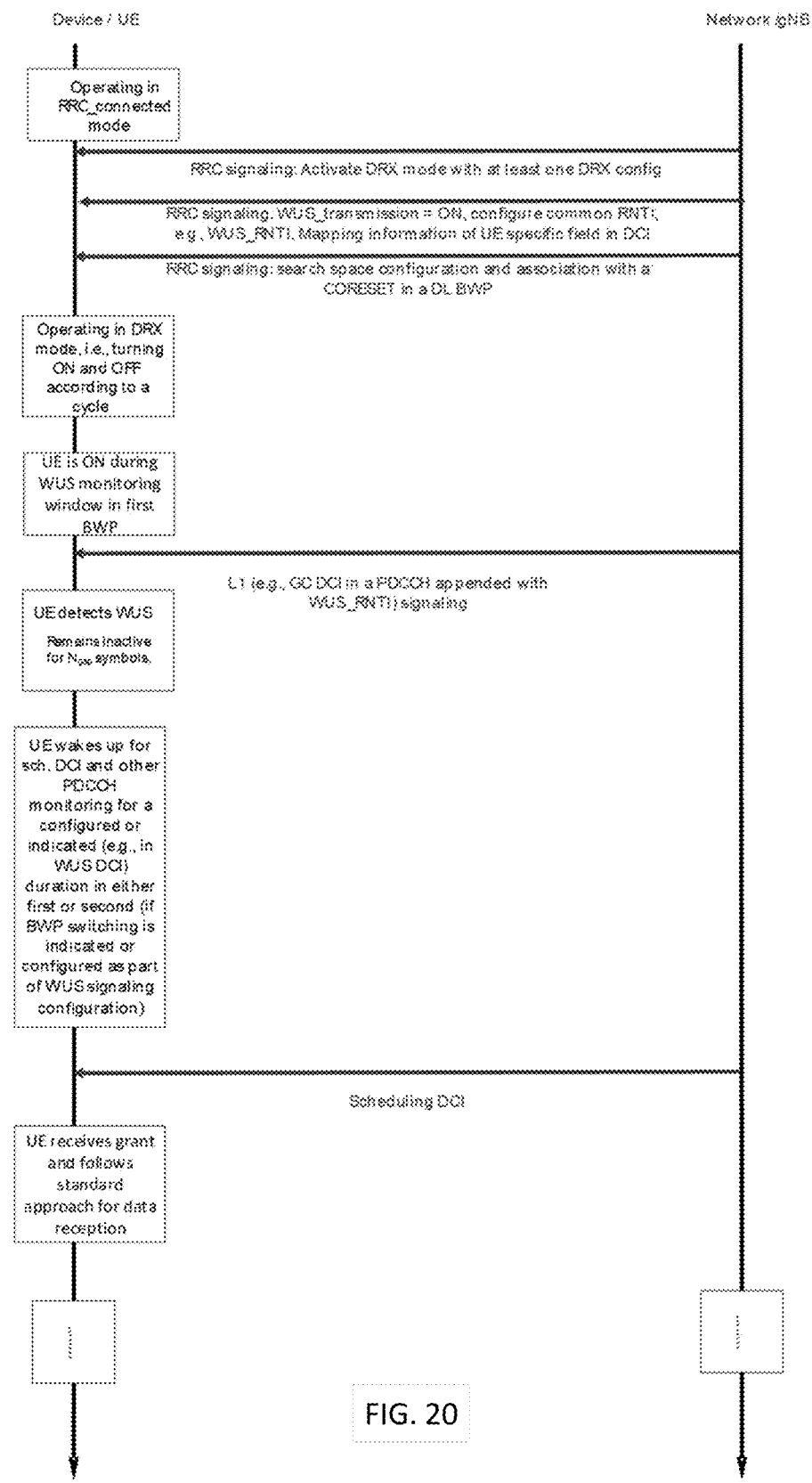
FIG. 20 shows an exemplary flow diagram of processing and mapping UE specific control information according to various exemplary embodiments of the present disclosure.

In accordance with exemplary embodiments of the present disclosure, FIG. 20 includes a call flow chart showing some signaling and mobile radio communication terminal device/UE behavior steps before and after detection of WUS DCI. That is, the flow chart of FIG. 20 shows an example for steps of mobile radio communication terminal device (e.g., UE) operation when the UE is configured to monitor WUS in a common DCI. After the RRC_connection status is established, the UE receives one or more RRC signaling to receive DRX configuration, turn ON signaling for monitoring WUS DCI, necessary other signaling for DCI configuration, search space association etc. Upon detection of WUS DCI, the UE wakes up in a subsequent duration for PDCCH monitoring and continue according to configured DRX mode.

In various embodiments of the present disclosure, DRX_RNTI may be used as the name of the RNTI of the GC DCI format. However, this is an example only and in principle, any name for the RNTI can be used. A mobile radio communication terminal device (e.g., a UE) can be configured to monitor the GC DCI format for GTS and/or WUS and/or other DRX mode adaptation in one or more common search spaces (e.g., search space set), each common search space associated with a CORESET in the active DL bandwidth part. As part of the search space set configuration, the UE may obtain one or more of the following:
higher layer parameter RNTI_monitoring to notify that UE shall monitor for DCI format with DRX RNTI in the search space set in a given CORESET
PDCCH monitoring periodicity, e.g., K=>1 symbols/slots
PDCCH monitoring offset, e.g. M=>0 symbols/slots,
  In one example, M<=K
PDCCH monitoring pattern
  In one example, first symbol(s) of CORESETs are within a slot or a group of symbols
PDCCH candidates per aggregation level In one or more examples, although same search space set may be used to monitor for WUS and GTS DCI, higher layer configuration may be provided for separate DCI format configuration such as GTS DCI may be monitored with multiple aggregation levels, whereas WUS DCI may be monitored with one aggregation level only, to reduce complexity and increase power saving when the mobile radio communication terminal device/UE is operating in DRX mode. Furthermore, the monitoring periodicity can be different for GTS DCI and WUS DCI. For example, during the WUS monitoring window, which can be quite short, there can be more than one monitoring occasion for WUS so that the mobile radio communication terminal device/UE does not miss WUS. For example, once the mobile radio communication terminal device/UE detects WUS, it may not monitor in subsequent occasions for WUS.

In at least one other example, a DCI payload size may be configured by higher layers via MSI, RMSI, OSI or RRC signaling.

In one or more examples, WUS or GTS may be repeated multiple times so that WUS or GTS detection is achieved with high reliability. The repetition factor can be higher layer configured, in a mobile radio communication terminal device (e.g., UE) specific or cell specific or group-specific manner.

In various exemplary embodiments of the present disclosure, instead of appending the DCI format with CRC scrambled by an RNTI, control information can be transmitted in a sequence without CRC, especially if the payload is small. However, in order to realize efficient resource management from network perspective, sequences with the mobile radio communication terminal device/UE specific control information can be code-multiplexed over a common time-frequency resource. In other words, a group of mobile radio communication terminal devices/UEs monitor/receive for respective sequences in the common time-frequency resource. The mobile radio communication terminal device/

UE specific sequences are multiplexed and transmitted in a common time-frequency resource.

Figure 21:
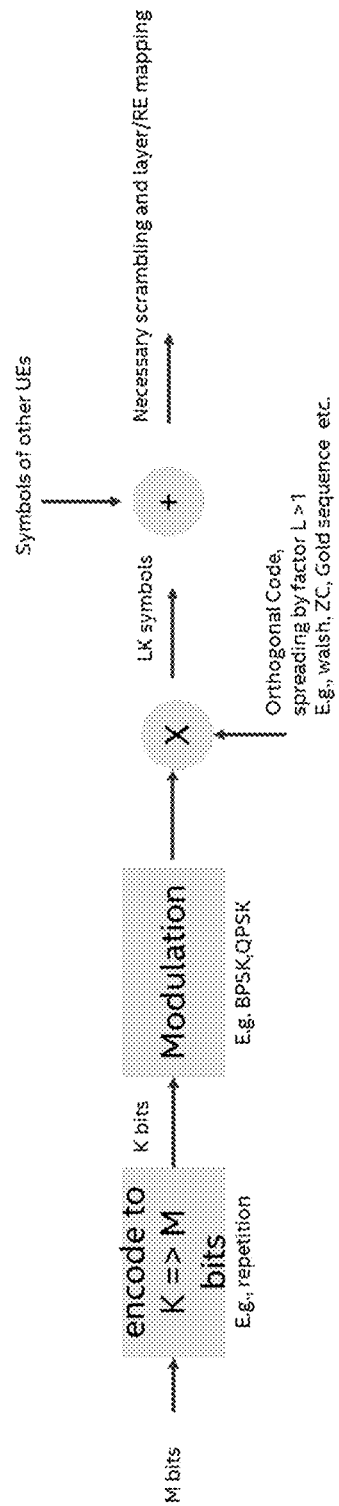
FIG. 21 shows block representations of exemplary resource sets according to various exemplary embodiments of the present disclosure.

The exemplary embodiment of FIG. 21 includes a general structure for mapping mobile radio communication terminal device (e.g., UE) specific control information to an encoded, modulated and spreaded sequence which is multiplexed with symbols of other mobile radio communication terminal devices/UEs, and then a composite multiplexed signal of a group of UEs is mapped to a common set of REs after necessary scrambling, layer processing, and other necessary steps. That is, FIG. 21 shows a general structure where M=>1 bits of control information payload of a mobile radio communication terminal device/UE is encoded into K bits, e.g., simple repetition coding can be applied where K can be multiple of M. The encoded bits are then modulated and subsequently spreaded by an L-point sequence. The sequence can be UE specific configured by higher layer. In one example, sequence can be obtained based on C-RNTI. Choice of sequences may include Walsh sequence, Zadoff-Chu sequence, Gold sequence etc. Finally LK spreaded symbols of different UEs are multiplexed and then mapped to a common set of REs after further processing, such as layer mapping, scrambling etc.

In the following table, the length four spreading sequence examples are shown for normal CP. In one example, each mobile radio communication terminal device/UE is indicated an index from the set, and different UEs monitoring for the sequence in a common resource set are indicated different indices by the network.

| Seq index | Normal CP | | | |
| --- | --- | --- | --- | --- |
| 0 | +1 | +1 | +1 | +1 |
| 1 | +1 | −1 | +1 | −1 |
| 2 | +1 | +1 | −1 | −1 |
| 3 | +1 | −1 | −1 | +1 |
| 4 | +j | +j | +j | +j |
| 5 | +j | −j | +j | −j |
| 6 | +j | +j | −j | −j |
| 7 | +j | −j | −j | +j |

The examples considered above for mobile radio communication terminal device/UE specific content conveyed in a GC DCI are applicable here as well, e.g., M bits of control information payload can be used to indicate GTS/WUS trigger and/or adapting DRX parameters and/or switch DRX configurations etc.

In various exemplary embodiments of the present disclosure, the mobile radio communication terminal device (e.g., UE) needs to be aware of at least one resource set where it finds the sequence-based control information. In one example, one or more resource sets are configured to a UE for each configured DL BWP. The configuration of the resource set(s) can be provided together with bandwidth part configuration or separately. The configuration of each resource set includes one or more of the following:

Resource set index
Number of consecutive symbols
Set of PRBs
CCE-to-REG mapping
REG bundle size, in case of interleaved CCE-to-REG mapping
Cyclic shift for REG bundle interleaver More generally, in various examples, the resource set may map to K=>1 PRBs and M=>1 consecutive symbols. Few examples of resource set RE mapping are shown in FIG. 22.

In one or more alternatives, the K physical resource blocks (PRBs) may or may not be continuous in frequency domain.

Figure 22:
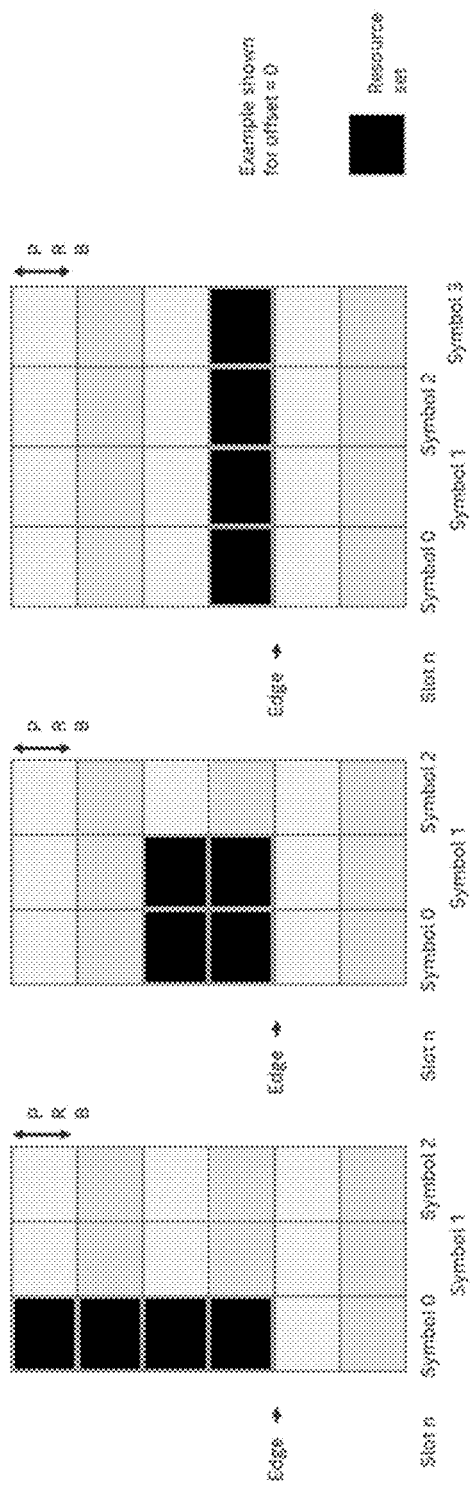
FIG. 22 shows examples of resource set RE mapping.

The exemplary embodiment of FIG. 22 shows a resource set where the multiplexed sequence comprising mobile radio communication terminal device/UE specific control information of K mobile radio communication terminal devices/UEs is shown to mapped to (4 PRBs, 1 offset (OS)), (2 PRBs, 2OSs), (1 PRBs, 4 OSs) as examples.

In various examples, in each resource set, there can be one or more search spaces configured to detect the sequence. As part of the search space configuration, a mobile radio communication terminal device/UE may obtain one or more of the following related to the DCI format:

Association between search space with a resource set
Aggregation levels
Monitoring periodicity, e.g., K=>1 symbols/slots
Monitoring offset, e.g., M symbols/slots, where e.g., M can be 0<=M<K
Monitoring pattern, e.g., first symbol(s) of one or more resource sets within a slot In one or more examples, in order to reduce complexity, search space for monitoring the DCI format based on a sequence can be monitored with just one aggregation level such as 2 or 4 or 8 or 16.

In one or more examples, the resource set can be one of the CORESET configured in the active DL BWP and the search space can be one of the common search space associated with a CORESET. Hence, as part of the common search space configuration, network may notify the mobile radio communication terminal device/UE to monitor for DCI format based on sequence that is not appended with any RNTI in the search space. In other words, as part of search space configuration, the mobile radio communication terminal device/UE will be notified to monitor a sequence-based DCI format in the search space with given aggregation level(s).

In one or more examples, WUS can be a sequence-based DCI without RNTI, whereas GTS DCI can be a PDCCH with RNTI. This may be helpful to ensure low complexity WUS detection.

In another example, where if resource set is different from CORESET, location of the resource can be implicitly obtained from configuration of other resources, such as resource used for SSB, a given CORESET etc. In one example, there can be at least one CORESET configured within a DL BWP and frequency domain location of the resource set for monitoring DCI format in a sequence can be obtained as an offset to the location of a given CORESET. For example, the start PRB of the resource set can be obtained as an offset from the edge PRB of the CORESET. In FIG. 10, offset=0 is considered. Other parameters of the configuration of resource set are higher layer configured.

In one or more examples, the sequence can be mapped to one or more resource sets with or without repetition. The repetition factor can be higher layer configured, such as UE specific or group-based RRC signaling.

In one or more examples, the resource set used for transmitting sequence based DCI for GTS can be avoided for PDSCH scheduling, that is, PDSCH can be rate matched around the resource set.

Although, reduction in unwanted PDCCH monitoring can improve mobile UE power consumption by dynamic DRX mode management, some general signaling mechanisms can be used to activate/deactivate some parameters to improve mobile radio communication terminal device/UE power consumption with or without an active DRX mode operation in place. In particular, for any of the DCI signaling embodiments considered above, one or more of the following parameters can be included in a mobile radio communication terminal device (e.g., a UE) specific field:

Activation and/or de-activation of secondary carriers
   A K=>1 bit field can be used to indicate the carrier ID
Activation and/or de-activation of a set of UE antennas
   A L=>1 bit field can be used to indicate indices or set of indices of UE antennas and/or RF chains
   Network and UE exchange UE antenna configuration and corresponding indices of the UE antennas prior to signaling for activation/deactivation.

Alternatively, MAC CE signaling can be used instead of DCI based signaling to activate/deactivate the parameters.

In various exemplary embodiments, the monitoring occasion(s) of the power saving signal/channel outside the Active Time is "indicated" to the UE by the access node (e.g., gNB) with an offset before the DRX ON. For example, the access mode by explicit signal through higher layer signaling or through the CORESET/search space.

In various exemplary embodiments, for power saving signal/channel configured outside Active Time (scheduled ON or monitor times, e.g., DRX_ON), a new DCI format may be used for a UE, where the UE is configured to monitor the new DCI format, with the power saving information for the UE in the DCI configurable by RRC.

In various exemplary embodiments, a new RNTI (e.g., PS-RNTI) can be used for the PDCCH-based power saving signal/channel decoding at least outside Active Time and may be UE-specifically configured.

In various exemplary embodiments, more than one monitoring occasion for a UE can be configured within a slot or multiple slots before the DRX ON (e.g., monitoring) is implemented.

In various exemplary embodiments, the maximum number of CORESETs for PDCCH-based power saving signal/channel outside Active Time may be no larger than the max number that can be configured inside Active Time. In various embodiments, a wireless device may be a base station e.g., eNodeB, gnB, Network etc. In various embodiments of the present disclosure, a Wake-Up indication may indicate to a UE whether or not to Wake-Up. For example a Wake-Up indication may indicate to a UE to wake up—e.g., may include or be implemented as Wake-Up signal trigger or may be implemented a signal to suppress or prevent waking up in a UE.

The following examples pertain to further exemplary implementations:

Example is 1 a method, including receiving, by a first user-equipment (UE), a first signaling to configure a discontinuous reception (DRX) mode including at least one DRX configuration; operating, by the first UE, in the DRX mode configured with the at least one DRX configuration; receiving by the first UE, a configuration of a second signaling; receiving by the first UE, the second signaling in a time-frequency resource of a common search space, wherein the first UE receives the second signaling during an OFF/non-active state of the DRX mode configured with the at least one DRX configuration, and wherein the second signaling includes a Wake-Up indication; detecting, by the first UE, the Wake-Up indication in the second signaling, wherein the Wake-Up indication indicates for the first UE to wake up; waking up, by the first UE, to monitor downlink control informations (DCIs) in Physical Downlink Control Channels (PDCCHs) after an end of a first duration following the detection of the Wake-Up indication in the second signaling. In Example 2, the method of Example 1, wherein the common search space is associated or assigned to be monitored by at least one UE other than the first UE. In Example 3, the method of Example 2, wherein the common search space is associated with or assigned to be monitoring by a group of UEs, wherein the UE belongs to the group of UEs. In Example 4, the method of any of Examples 1 to 3, wherein the first signaling comprises a Radio Resource Control (RRC) signaling. In Example 5, the method of any of Examples 1 to 4, wherein the second signaling comprises L1 signaling. In Example 6, the method of Example 5 wherein the L1 signaling comprises a group-common DCI message transmitted in a PDCCH. In Example 7, the method of Example 6, wherein the group-common DCI message is appended with a cyclic redundancy check (CRC) scrambled by a common Radio Network Temporary Identifier (RNTI). In Example 8, the method of Example 7, wherein the common RNTI is a Power saving RNTI (PS-RNTI). In Example 9, the method of any of Examples 1 to 8, wherein the first duration is configured by a higher layer signaling received by the UE prior to the second signaling. In Example 10, the method of any of Examples 1 to 9, wherein the first UE receives the second signaling in a first bandwidth part (BWP) and wherein the first UE wakes up in a second BWP after the first duration ends, the second BWP being different from the first BWP. In Example 11, the method of Example 10, wherein the second BWP is larger than the first BWP. In Example 12, the method of any of Example 10 or 11, wherein the configuration of the second control signaling indicates a UE specific field in the group-common DCI, a PDCCH monitoring periodicity, and/or a PDCCH monitoring offset. In Example 13, the method of any of Examples 5 to 12, wherein the group-common DCI message comprises a plurality of UE-specific fields. In Example 14, the method of Example 13, wherein the plurality of UE-specific fields of the group-common DCI message correspond respectively to a plurality of UEs. In Example 15, the method of Example 13 or 14, wherein each of the plurality of UE-specific fields includes at least one bit of information. In Example 16, the method of Example 14 or 15, wherein at least one of the plurality of UE-specific fields includes a Wake-Up indication for at least one of the respective UEs. In Example 17, the method of any of Examples 14 to 16, wherein at least one of the plurality of UE-specific fields includes information indicating an identification of a BWP for at least one respective UE to wake up in ON/active state subsequent to a Wake-Up indication. In Example 18, the method of any of Examples 1 to 17, wherein the first duration is a non-zero gap between an end of a resource where the second signaling is received and a next ON/active state of the UE following the second signaling. In Example 19, the method of any of Examples 1 to 18, further including receiving and detecting, by first the UE, a third signaling via a higher layer signaling, prior to receiving the second signaling, wherein the third signaling configures the first UE to monitor for the second signaling. In Example 20, the method of any of Examples 1 to 19, wherein the at least DRX configuration of the DRX mode includes a configuration for: a duration at the beginning of a DRX Cycle for the DRX mode when the first UE monitors for at least PDCCHs (drx-onDurationTimer), a delay before the first UE starts the drx-onDurationTimer, (drx-SlotOffset), a subframe where the first UE begins the DRX cycle of the DRX mode (drx-StartOffset), a duration after the UE receives a message in PDCCH indicating a new uplink (UL) or downlink (D) transmission for a MAC entity (drx-InactivityTimer), a maximum duration until a DL retransmission is received (drx-RetransmissionTimerDL), a maximum duration until a grant for a UL retransmission is received (drx-RetransmissionTimerUL), a Long DRX cycle (drx-LongCycle), a Short DRX cycle (drx-ShortCycle), a duration the first UE shall follow in an ON/active state after the Short DRX cycle (drx-ShortCycleTimer), a minimum duration before a DL assignment for a HARQ retransmission is expected by the MAC entity (drx-HARQ-RTT-TimerDL), and/or a minimum duration before a UL HARQ retransmission grant is expected by the MAC entity (drx-HARQ-RTT-TimerUL).

Example 21 is an apparatus to be implemented in user equipment (UE), the apparatus including: interface circuitry; and processing circuitry, coupled to the interface circuitry, configured to: receive, via the interface circuitry, a first signaling to configure a discontinuous reception (DRX) mode including at least one DRX configuration; operate in the DRX mode with the at least one DRX configuration; receive, via the interface circuitry, a configuration of a second signaling; receive, via the interface circuitry, the second signaling in a time-frequency resource of a common search space during an OFF/non-active state of the DRX mode configured with the at least one DRX configuration, wherein the second signaling includes a Wake-Up indication; detect the Wake-Up indication in the second signaling, wherein the detected Wake-Up indication indicates for the UE to wake-up; and wake up to an ON/active state to monitor at least downlink control informations (DCIs) in a Physical Downlink Control Channels (PDCCHs) after an end of a first duration following the detection of the Wake-Up indication in the second signaling.

In Example 22, the apparatus of Example 21, wherein the first signaling includes receiving Radio Resource Control (RRC) signaling. In Example 23, The apparatus of Example 21 or 22, wherein receiving the second signaling includes L1 signaling. In Example 24 the apparatus of Example 23, wherein the L1 signaling includes a group-common DCI message transmitted in a PDCCH. In Example 25 the apparatus of Example 24, wherein the group-common DCI message is appended with a CRC scrambled by a common Radio Network Temporary Identifier (RNTI). In Example 26, the apparatus of Example 25, wherein the common RNTI is a Power saving RNTI (PS-RNTI). In Example 27, the apparatus of Example 26, wherein a length the first duration is configured by a higher layer signaling. In Example 28, the apparatus of any of Examples 21 to 27, wherein the processing circuitry is further configured to receive, via the interface circuitry, the first signaling in a first bandwidth part (BWP) and wherein the one or more processors cause the UE to wake up in a second BWP, the second BWP being different from the first BWP. In Example 29, the apparatus of Example 28, wherein a bandwidth of the second BWP is smaller than a bandwidth of the first BWP. In Example 30, the apparatus of Example 28 or 29, wherein the configuration of the second control signaling indicates a UE specific field in the group-common DCI, a PDCCH monitoring periodicity, and/or a PDCCH monitoring offset. In Example 31, the apparatus of any of Examples 24 to 30, wherein the group-common DCI message comprises a plurality of UE-specific fields. In Example 32, the apparatus of Example 31, wherein the plurality of UE-specific fields of the group-common DCI message correspond respectively to a plurality of UEs. In Example 33, the apparatus of Example 31 or 32, wherein each of the plurality of UE-specific fields includes at least one bit of information. In Example 34, the apparatus of any of Examples 32 to 33, wherein at least one of the plurality of UE-specific fields of the group-common DCI message includes information indicating a Wake-Up indication for at least one of the respective UEs. In Example 35, the apparatus of any of Examples 32 to 34, wherein at least one of the plurality of UE-specific fields of the group-common DCI message includes information indicating an identification of a BWP for at least one respective UE to wake up in subsequent to a Wake-Up indication. In Example 36, the apparatus of any of Examples 21 to 35, wherein the first duration is a non-zero gap between an end of a resource where the second signaling is received and a start of a next ON/active state following the second signaling. In Example 37, the apparatus of any of Examples 21 to 36, wherein the processing circuitry is further configured to receive and detect a third signaling, via a higher layer signaling and prior to the second signaling, wherein the third signaling causes the processing circuitry is to monitor for the second signaling. In Example 38, the apparatus of any of Examples 21 to 37, wherein the at least DRX configuration of the DRX mode includes a configuration for: a duration at the beginning of a DRX Cycle for the DRX mode when the first UE monitors for at least PDCCHs (drx-onDurationTimer), a delay before the first UE starts the drx-onDurationTimer, (drx-SlotOffset) a subframe where the first UE begins the DRX cycle of the DRX mode (drx-StartOffset), a duration after the UE receives a PDCCH message indicating a new uplink (UL) or downlink (D) transmission for a MAC entity (drx-InactivityTimer), a maximum duration until a DL retransmission is received (drx-RetransmissionTimerDL), a maximum duration until a grant for a UL retransmission is received (drx-RetransmissionTimerUL), a Long DRX cycle (drx-LongCycle), a Short DRX cycle (drx-ShortCycle), a duration the first UE shall follow the Short DRX cycle (drx-ShortCycleTimer), a minimum duration before a DL assignment for a HARQ retransmission is expected by the MAC entity (drx-HARQ-RTT-TimerDL), and/or a minimum duration before a UL HARQ retransmission grant is expected by the MAC entity (drx-HARQ-RTT-TimerUL). In Example 39, the apparatus of any of Examples 21 to 38, wherein the common search space is associated or assigned to be monitored by at least one UE other than the first UE. In Example 40, the apparatus of Example 39, wherein the common search space is associated with or assigned to be monitoring by a group of UEs, wherein the UE belongs to the group of UEs.

Example 41 is a method, including: transmitting, by a wireless device, a first signaling to configure a discontinuous reception (DRX) mode including at least one DRX configuration in at least one user equipment (UE); transmitting, by the wireless device, a configuration of a second signaling; transmitting, by the wireless device, the second signaling in a time-frequency resource of a common search space during a scheduled an OFF/non-active state expected in the DRX mode of the at least one UE, wherein the second signaling includes a Wake-Up indication, wherein the Wake-Up indication indicates for the at least one UE to wake-up; and transmitting, by the wireless device, at least one message in a Physical Downlink Control Channel (PDCCH) or a Physical Sidelink Shared Channel (PSSCH) message during an ON/active state expected in the at least one UE for monitoring PDCCH or PSSCH messages of the at least UE in response to the Wake-Up indication of the second signaling.

In Example 42, the method of Example 41, wherein the common search space is assigned to or associated with monitoring by a group of UEs including the at least one UE. In Example 43, the method of Example 41 or 42, wherein the first signaling comprises a Radio Resource Control (RRC) signaling. In Example 44, the method of any of Examples 41 to 43, wherein the second signaling comprises a L1 signaling. In Example 45, the method of Example 44, wherein the L1 signaling comprises a group-common DCI message transmitted in PDCCH. In Example 46, the method of Example 45, wherein the group-common DCI message is appended with a CRC scrambled by a common Radio Network Temporary Identifier (RNTI). In Example 47, the method of Example 46, wherein the common RNTI is a Power saving RNTI (PS-RNTI). In Example 48, the method of Example 45, wherein a length of the first duration is indicated in a signaling transmitted before the second signaling. In Example 49, the method of any of Examples 41 to 48, wherein the mobile radio communication device transmits the second signaling in a first bandwidth part (BWP) and transmits the PDCCH or PSSCH message in a second BWP, the second BWP being different from the first BWP. In Example 50, the method of Example 49, wherein the second BWP is larger than the first BWP. In Example 51, the method of any of Examples 45 to 50, wherein the configuration of the second control signaling indicates a UE specific field in the group-common DCI, a PDCCH monitoring periodicity, and/or a PDCCH monitoring offset. In Example 52, the method of any of Examples 45 to 51, wherein the group-common DCI message comprises a plurality of UE-specific fields. In Example 53, the method of Example 52, wherein the plurality of UE-specific fields of the group-common DCI message correspond respectively to a plurality of UEs. In Example 54, the method of Example 52 or 53, wherein each of the plurality of UE-specific fields includes at least one bit of information. In Example 55, the method of Example 53 or 54, wherein at least one of the plurality of UE-specific fields includes information indicating a Wake-Up indication for at least one of the respective UEs. In Example 56, the method of any of Examples 52 to 55, wherein at least one of the plurality of UE-specific fields includes information indicating an identification of a BWP for at least one respective UE to wake up in subsequent to a sent Wake-Up indication. In Example 57, the method of any of Examples 41 to 56, wherein the at least DRX configuration of the DRX mode includes a configuration for: a duration at the beginning of a DRX Cycle for the DRX mode when the first UE monitors for at least PDCCHs (drx-onDurationTimer), a delay before the first UE starts the drx-onDurationTimer, (drx-SlotOffset), a subframe where the first UE begins the DRX cycle of the DRX mode (drx-StartOffset), a duration after the UE receives a PDCCH message indicating a new uplink (UL) or downlink (D) transmission for a MAC entity (drx-InactivityTimer), a maximum duration until a DL retransmission is received (drx-RetransmissionTimerDL), a maximum duration until a grant for a UL retransmission is received (drx-RetransmissionTimerUL), a Long DRX cycle (drx-LongCycle), a Short DRX cycle (drx-ShortCycle), a duration the first UE shall follow the Short DRX cycle (drx-ShortCycleTimer), a minimum duration before a DL assignment for a HARQ retransmission is expected by the MAC entity (drx-HARQ-RTT-TimerDL), and/or a minimum duration before a UL HARQ retransmission grant is expected by the MAC entity (drx-HARQ-RTT-TimerUL). In Example 58, the method of any of Examples 41 to 57, further including: transmitting, by first the wireless device, a third signaling via a higher layer signaling, prior to transmitting the second signaling, wherein the third signaling is configured to indicate for the at least one UE to monitor for the second signaling.

Example 59 is an apparatus to be implemented in a wireless device, the apparatus including: an interface circuitry; and a processing circuitry, coupled with the interface circuitry to: transmit, via the interface circuitry, a first signaling to configure a discontinuous reception (DRX) mode including at least one DRX configuration in at least one user equipment (UE); transmit, via the interface circuitry, a configuration of a second signaling; transmit, via the interface circuitry, the second signaling in a time-frequency resource of a common search space during an expected OFF/non-active state of the DRX mode in the at least one UE, wherein the second signaling includes a Wake-Up-indication, and wherein the Wake-Up indication indicates the at least one UE to wake up; and transmit, by the at least one transmitter, at least one message in a Physical Downlink Control Channel (PDCCH) or a Physical Sidelink Shared Channel (PSSCH) during an ON/active state expected in the at least UE in response to the Wake-Up indication of the second signaling.

In Example 60, the apparatus of Example 59, wherein the common search space is associated with or assigned to a group of UEs for monitoring, wherein the group of UEs includes the at least one UE. In Example 61, the apparatus of Example 59 or 60, wherein the first signaling comprises a Radio Resource Control (RRC) signaling. In Example 62, the apparatus of any of Examples 59 to 61, wherein the second signaling comprises a L1 signaling. In Example 63, the apparatus of Example 62, wherein the L1 signaling includes a group-common DCI message transmitted in a PDCCH. In Example 64, the apparatus of Example 63, wherein the group-common DCI message is appended with a CRC scrambled by a common Radio Network Temporary Identifier (RNTI). In Example 65, the apparatus of Example 64, wherein the common RNTI is a Power saving RNTI (PS-RNTI). In Example 66, the apparatus of Example 63, wherein the one or more processors cause the wireless device to transmit a signaling prior to the transmission of the second signaling indicates a length of a first duration for the at least UE after the second signaling. In Example 67, the apparatus of any of Examples 59 to 66, wherein the processing circuitry is to further transmit, via the interface circuitry, the second signaling in a first bandwidth part (BWP) and transmit the PDCCH or PSSCH message in a second BWP, the second BWP being different from the first BWP. In Example 68, the apparatus of Example 67, wherein the second BWP is larger than the first BWP. In Example 69, the apparatus of any of Examples 63 to 68, wherein the configuration of the second control signaling indicates a UE specific field in the group-common DCI, a PDCCH monitoring periodicity, and/or a PDCCH monitoring offset. In Example 70, the apparatus of any of Examples 63 to 69, wherein the group-common DCI message comprises a plurality of UE-specific fields. In Example 71, the apparatus of Example 70, wherein the plurality of UE-specific fields of the group-common DCI message correspond respectively to a plurality of UEs. In Example 72, the apparatus of Example 70 or 71, wherein each of the plurality of UE-specific fields includes at least one bit of information. In Example 73, the apparatus of any of Examples 70 to 72, wherein at least one of the plurality of UE-specific fields includes information indicating a Wake-Up indication for at least one of the respective UEs. In Example 74. The apparatus of any of Examples 70 to 73, wherein at least one of the plurality of UE-specific fields includes information indicating an identification of a BWP for at least one respective UE to wake up in subsequent to a sent Wake-Up indication. In Example 75, the apparatus of any of Examples 59 to 74, wherein the at least DRX configuration of the DRX mode includes a configuration for: a duration at the beginning of a DRX Cycle for the DRX mode when the first UE monitors for at least PDCCHs (drx-onDurationTimer), a delay before the first UE starts the drx-onDurationTimer, (drx-SlotOffset), a subframe where the first UE begins the DRX cycle of the DRX mode (drx-StartOffset), a duration after the UE receives a PDCCH message indicating a new uplink (UL) or downlink (D) transmission for a MAC entity (drx-InactivityTimer), a maximum duration until a DL retransmission is received (drx-RetransmissionTimerDL), a maximum duration until a grant for a UL retransmission is received (drx-RetransmissionTimerUL), a Long DRX cycle (drx-LongCycle), a Short DRX cycle (drx-ShortCycle), a duration the first UE shall follow the Short DRX cycle (drx-ShortCycleTimer), a minimum duration before a DL assignment for a HARQ retransmission is expected by the MAC entity (drx-HARQ-RTT-TimerDL), and/or a minimum duration before a UL HARQ retransmission grant is expected by the MAC entity (drx-HARQ-RTT-TimerUL).

Example 76 is one or more non-transitory computer-readable media including instructions that when executed by at least one processor of a user equipment (UE), cause the UE to: receive a first signaling to configure a discontinuous reception (DRX) mode including at least one DRX configuration; operate in the DRX mode configured with the least one DRX configuration; receive a configuration of a second signaling; receive the second signaling in a time-frequency resource of a common search space during an OFF/non-active state of the DRX mode configured with the at least one DRX configuration, wherein the second signaling includes a Wake-Up indication; detect the Wake-Up indication in the second signaling, wherein the Wake-Up indication indicates for the UE to wake-up; and wake up to an ON/active state to monitor at least downlink control informations (DCIs) in Physical Downlink Control Channels (PDCCHs) after an end of a first duration following the reception of the second signaling.

In Example 77, the one or more non-transitory computer-readable media of Example 76, wherein the common search space is a search space associated with or assigned to at least one other UE for monitoring. In Example 78, the one or more non-transitory computer-readable media of Example 76 or 77, wherein the first signaling includes a Radio Resource Control (RRC) signaling. In Example 79, the one or more non-transitory computer-readable media of any of Examples 76 to 78, wherein the second signaling includes L1 signaling. In Example 80, the one or more non-transitory computer-readable media of any of Examples 76 to 79, wherein the L1 signaling includes a group-common DCI message. In Example 81, the one or more non-transitory computer-readable media of Example 80, wherein the group-common DCI message comprises a PDCCH signaling including the group-common DCI message transmitted in a PDCCH message. In Example 82, the one or more non-transitory computer-readable media of Example 81, wherein the group-common DCI message is appended with a cyclic redundancy check (CRC) scrambled by a common Radio Network Temporary Identifier (RNTI). In Example 83, the one or more non-transitory computer-readable media of Example 82, wherein the common RNTI is a Power saving RNTI (PS-RNTI). In Example 84, the one or more non-transitory computer-readable media of any of Examples 76 to 83, wherein the at least one processor further causes the UE to receive and detect a third signaling, wherein the third signaling configures a length of the first duration. In Example 85, the one or more non-transitory computer-readable media of any of Examples 76 to 84, wherein the at least one processor further causes the UE to receive the first signaling in a first bandwidth part (BWP) and to wake up in a second BWP, the second BWP being different from the first BWP. In Example 86, the one or more non-transitory computer-readable media of Example 85, wherein the second BWP is smaller than the first BWP. In Example 87, the one or more non-transitory computer-readable media of any of Examples 76 to 86, wherein the configuration of the second control signaling indicates a UE specific field in the group-common DCI, a PDCCH monitoring periodicity, and/or a PDCCH monitoring offset. In Example 88, the one or more non-transitory computer-readable media of any of Examples 80 to 87, wherein the group-common DCI message comprises a plurality of UE-specific fields. In Example 89, the one or more non-transitory computer-readable media of Example 88, wherein the plurality of UE-specific fields of the group-common DCI message correspond respectively to a plurality of UEs. In Example 90, the one or more non-transitory computer-readable media of Example 88 or 89, wherein each of the plurality of UE-specific fields includes at least one bit of information. In Example 91, the one or more non-transitory computer-readable media of any of Examples 88 to 90, wherein at least one of the plurality of UE-specific fields includes a Wake-Up indication for at least one of the respective UEs. In Example 92, the one or more non-transitory computer-readable media of any of Examples 88 to 91, wherein at least one of the plurality of UE-specific fields includes information indicating an identification of a BWP for at least one respective UE to wake up in subsequent to a Wake-Up indication. In Example 93, the one or more non-transitory computer-readable media of any of Examples 76 to 92, wherein the first duration is a non-zero gap between an end of a resource where the second signaling is received and a start of a next ON/active state following the second signaling. In Example 94, the one or more non-transitory computer-readable media of any of Examples 76 to 93, wherein the at least DRX configuration of the DRX mode includes a configuration for: a duration at the beginning of a DRX Cycle for the DRX mode when the first UE monitors for at least PDCCHs (drx-onDurationTimer), a delay before the first UE starts the drx-onDurationTimer (drx-SlotOffset), a subframe where the first UE begins the DRX cycle of the DRX mode (drx-StartOffset), a duration after the UE receives a PDCCH message indicating a new uplink (UL) or downlink (D) transmission for a MAC entity (drx-InactivityTimer), a maximum duration until a DL retransmission is received (drx-RetransmissionTimerDL), a maximum duration until a grant for a UL retransmission is received (drx-RetransmissionTimerUL), a Long DRX cycle (drx-LongCycle), a Short DRX cycle (drx-ShortCycle), a duration the first UE shall follow the Short DRX cycle (drx-ShortCycleTimer), a minimum duration before a DL assignment for a HARQ retransmission is expected by the MAC entity (drx-HARQ-RTT-TimerDL), and/or a minimum duration before a UL HARQ retransmission grant is expected by the MAC entity (drx-HARQ-RTT-TimerUL).

Example 95 is one or more non-transitory computer-readable media having instructions that, when executed by one or more processors of a wireless device, cause the wireless device to, including: transmit a first signaling to configure a discontinuous reception (DRX) mode including at least one DRX configuration in at least one user equipment (UE); transmit a configuration of a second signaling; transmit the second signaling in a time-frequency resource of a common search space in an expected OFF/non-active state in the DRX mode of the at least one UE, wherein the second signaling includes a Wake-Up indication, wherein the Wake-Up indication indicates for the at least one UE to wake up; and transmit a message in a Physical Downlink Control Channel (PDCCH) or a Physical Sidelink Shared Channel (PSSCH) during an ON/active state expected in the at least UE in response to the second signaling including the Wake-Up indication.

In Example 96, the one or more computer-readable media of Example 95, wherein the common search space is associated with or assigned to a group of UEs including the at least one UE. In Example 97, the one or more computer-readable media of Example 95 or 96, wherein the first signaling includes a Radio Resource Control (RRC) signaling. In Example 98, the one or more computer-readable media of any of Examples 95 to 97, wherein the second signaling comprises a L1 signaling. In Example 99, the one or more computer-readable media of Example 98, wherein the L1 signaling includes a group-common DCI message transmitted in PDCCH. In Example 100, the one or more computer-readable media of Example 99, wherein the group-common DCI message is appended with a cyclic redundancy check (CRC) scrambled by a common Radio Network Temporary Identifier (RNTI). In Example 101, the one or more computer-readable media of Example 100, wherein the common RNTI is a Power saving RNTI (PS-RNTI). In Example 102, the one or more computer-readable media of Example 101, wherein one or more processors further cause the UE to transmit a higher layer signaling to configure a length of the first duration before the transmission of the second signaling. In Example 103, the one or more computer-readable media of any of Examples 95 to 102, wherein the mobile radio communication device transmits the second signaling in a first bandwidth part (BWP) and transmits the PDCCH or PSSCH message in a second BWP, the second BWP being different from the first BWP. In Example 104, the one or more computer-readable media of Example 103, wherein the second BWP is larger than the first BWP. In Example 105, the one or more computer-readable media of any of Examples 99 to 104, wherein the configuration of the second control signaling indicates a UE specific field in the group-common DCI, a PDCCH monitoring periodicity, and/or a PDCCH monitoring offset. In Example 106, the one or more computer-readable media of any of Examples 99 to 105, wherein the group-common DCI message includes a plurality of UE-specific fields. In Example 107, the one or more computer-readable media of Example 106, wherein the plurality of UE-specific fields of the group-common DCI message correspond respectively to a plurality of UEs. In Example 108, the one or more computer-readable media of any of Example 106 or 107, wherein each of the plurality of UE-specific fields includes at least one bit of information. In Example 109, the one or more computer-readable media of Example 107, at least one of the plurality of UE-specific fields includes a Wake-Up indication for at least one of the respective UEs. In Example 110, the one or more computer-readable media of any of Examples 106 to 109, wherein at least one of the plurality of UE-specific fields includes information indicating an identification of a BWP for at least one respective UE to wake up in subsequent to a sent Wake-Up indication. In Example 111, the one or more computer-readable media of any of Examples 95 to 110, wherein the at least DRX configuration of the DRX mode includes a configuration for: a duration at the beginning of a DRX Cycle for the DRX mode when the first UE monitors for at least PDCCHs (drx-onDurationTimer), a delay before the first UE starts the drx-onDurationTimer, (drx-SlotOffset), a subframe where the first UE begins the DRX cycle of the DRX mode (drx-StartOffset), a duration after the UE receives a PDCCH message indicating a new uplink (UL) or downlink (D) transmission for a MAC entity (drx-InactivityTimer), a maximum duration until a DL retransmission is received (drx-RetransmissionTimerDL), a maximum duration until a grant for a UL retransmission is received (drx-RetransmissionTimerUL), a Long DRX cycle (drx-LongCycle), a Short DRX cycle (drx-ShortCycle), a duration the first UE shall follow the Short DRX cycle (drx-ShortCycleTimer), a minimum duration before a DL assignment for a HARQ retransmission is expected by the MAC entity (drx-HARQ-RTT-TimerDL), and/or a minimum duration before a UL HARQ retransmission grant is expected by the MAC entity (drx-HARQ-RTT-TimerUL). In Example 112, the one or more computer-readable media of claim 95, further including: transmitting, by first the wireless device, a third signaling, prior to transmitting the second signaling, wherein the third signaling configures the at least one UE to monitor for the second signaling.

In Example 109, an apparatus to be implemented in user equipment (UE) is disclosed, the apparatus comprising interface circuitry; and processing circuitry, coupled to the interface circuitry, configured to: receive, via the interface circuitry, a first signaling to configure a discontinuous reception (DRX) mode including at least one DRX configuration; operate in the DRX mode; receive, via the interface circuitry, a configuration of a second signaling; receive, via the interface circuitry, the second signaling in a time-frequency resource of a common search space during an OFF/non-active state of the DRX mode configured with the at least one DRX configuration, wherein the second signaling includes a Wake-Up indication; detect the Wake-Up indication in the second signaling, wherein the detected Wake-Up indication indicates for the UE to wake-up; and wake up to an ON/active state to monitor at least downlink control informations (DCIs) in Physical Downlink Control Channels (PDCCHs) after an offset following the detection of the Wake-Up indication in the second signaling.

According to one aspect of the disclosure, any reference to a "duration", such as, for example, "a first duration," "a second duration", or "at an end of a first duration", may be referred to as an "offset", such as "a first offset", a "second offset", etc.

According to an aspect of the disclosure, references to PSSCH may be implemented in PSCCH. Accordingly, it is anticipated that any procedures, methods or devices implementing any of the principles described herein which reference implementation in PSSCH may be configured such that the referenced element is performed in PSCCH.

It should be noted that one or more of the features of any of the examples/embodiments above may be combined with any one of the other examples/embodiments.

Abbreviations

For the purposes of the present document, the following abbreviations may apply to the examples and embodiments discussed herein.

3GPP Third Generation Partnership Project
4G Fourth Generation
5G Fifth Generation
5GC 5G Core network
ACK Acknowledgement
AF Application Function
AM Acknowledged Mode
AMBR Aggregate Maximum Bit Rate
AMF Access and Mobility Management Function
AN Access Network
ANR Automatic Neighbour Relation
AP Application Protocol, Antenna Port, Access Point API Application Programming Interface
APN Access Point Name
ARP Allocation and Retention Priority
ARQ Automatic Repeat Request
AS Access Stratum
ASN.1 Abstract Syntax Notation One
AUSF Authentication Server Function
AWGN Additive White Gaussian Noise
BCH Broadcast Channel
BER Bit Error Ratio
BLER Block Error Rate
BPSK Binary Phase Shift Keying
BRAS Broadband Remote Access Server
BSS Business Support System
BS Base Station
BSR Buffer Status Report
BW Bandwidth
BWP Bandwidth Part
C-RNTI Cell Radio Network Temporary Identity
CA Carrier Aggregation, Certification Authority
CAPEX CAPital EXpenditure
CBRA Contention Based Random Access
CC Component Carrier, Country Code, Cryptographic Checksum
CCA Clear Channel Assessment
CCE Control Channel Element
CCCH Common Control Channel
CE Coverage Enhancement
CDM Content Delivery Network
CDMA Code-Division Multiple Access
CFRA Contention Free Random Access
CG Cell Group
CI Cell Identity
CID Cell-ID (e.g., positioning method)
CIM Common Information Model
CIR Carrier to Interference Ratio
CK Cipher Key
CM Connection Management, Conditional Mandatory
CMAS Commercial Mobile Alert Service
CMD Command
CMS Cloud Management System
CO Conditional Optional
CoMP Coordinated Multi-Point
CORESET Control Resource Set
COTS Commercial Off-The-Shelf
CP Control Plane, Cyclic Prefix, Connection Point
CPD Connection Point Descriptor
CPE Customer Premise Equipment
CPICH Common Pilot Channel
CQI Channel Quality Indicator
CPU CSI processing unit, Central Processing Unit
C/R Command/Response field bit
CRAN Cloud Radio Access Network, Cloud RAN
CRB Common Resource Block
CRC Cyclic Redundancy Check
CRI Channel-State Information Resource Indicator, CSI-RS Resource Indicator
C-RNTI Cell RNTI
CS Circuit Switched
CSAR Cloud Service Archive
CSI Channel-State Information
CSI-IM CSI Interference Measurement
CSI-RS CSI Reference Signal
CSI-RSRP CSI reference signal received power
CSI-RSRQ CSI reference signal received quality
CSI-SINR CSI signal-to-noise and interference ratio
CSMA Carrier Sense Multiple Access
CSMA/CA CSMA with collision avoidance
CSS Common Search Space, Cell-specific Search Space
CTS Clear-to-Send
CW Codeword
CWS Contention Window Size
D2 D Device-to-Device
DC Dual Connectivity, Direct Current
DCI Downlink Control Information
DF Deployment Flavour
DL Downlink
DMTF Distributed Management Task Force
DPDK Data Plane Development Kit
DM-RS, DMRS Demodulation Reference Signal
DN Data network
DRB Data Radio Bearer
DRS Discovery Reference Signal
DRX Discontinuous Reception
DSL Domain Specific Language. Digital Subscriber Line
DSLAM DSL Access Multiplexer
DwPTS Downlink Pilot Time Slot
E-LAN Ethernet Local Area Network
E2E End-to-End
ECCA extended clear channel assessment, extended CCA
ECCE Enhanced Control Channel Element, Enhanced CCE
ED Energy Detection
EDGE Enhanced Datarates for GSM Evolution (GSM Evolution)
EGMF Exposure Governance Management Function
EGPRS Enhanced GPRS
EIR Equipment Identity Register
eLAA enhanced Licensed Assisted Access, enhanced LAA
EM Element Manager
eMBB enhanced Mobile Broadband
EMS Element Management System
eNB evolved NodeB, E-UTRAN Node B
EN-DC E-UTRA-NR Dual Connectivity
EPC Evolved Packet Core
EPDCCH enhanced PDCCH, enhanced Physical Downlink Control Channel
EPRE Energy per resource element
EPS Evolved Packet System
EREG enhanced REG, enhanced resource element groups
ETSI European Telecommunications Standards Institute
ETWS Earthquake and Tsunami Warning System
eUICC embedded UICC, embedded Universal Integrated Circuit Card
E-UTRA Evolved UTRA
E-UTRAN Evolved UTRAN
F1AP F1 Application Protocol
F1-C F1 Control plane interface
F1-U F1 User plane interface
FACCH Fast Associated Control CHannel
FACCH/F Fast Associated Control Channel/Full rate
FACCH/H Fast Associated Control Channel/Half rate
FACH Forward Access Channel
FAUSCH Fast Uplink Signalling Channel
FB Functional Block
FBI Feedback Information
FCC Federal Communications Commission
FCCH Frequency Correction CHannel
FDD Frequency Division Duplex
FDM Frequency Division Multiplex
FDMA Frequency Division Multiple Access
FE Front End
FEC Forward Error Correction FFS For Further Study
FFT Fast Fourier Transformation
feLAA further enhanced Licensed Assisted Access, further enhanced LAA
FN Frame Number
FPGA Field-Programmable Gate Array
FR Frequency Range
G-RNTI GERAN Radio Network Temporary Identity
GERAN GSM EDGE RAN, GSM EDGE Radio Access Network
GGSN Gateway GPRS Support Node
GLONASSGLObal'naya NAvigatsionnaya Sputnikovaya Sistema (Engl.: Global Navigation Satellite System)
gNB Next Generation NodeB
gNB-CU gNB-centralized unit, Next Generation NodeB centralized unit
gNB-DU gNB-distributed unit, Next Generation NodeB distributed unit
GNSS Global Navigation Satellite System
GPRS General Packet Radio Service
GSM Global System for Mobile Communications, Groupe Spécial Mobile
GTP GPRS Tunneling Protocol
GTP-U GPRS Tunnelling Protocol for User Plane
GUMMEI Globally Unique MME Identifier
GUTI Globally Unique Temporary UE Identity
HARQ Hybrid ARQ, Hybrid Automatic Repeat Request
HANDO, HO Handover
HFN HyperFrame Number
HHO Hard Handover
HLR Home Location Register
HN Home Network
HPLMN Home Public Land Mobile Network
HSDPA High Speed Downlink Packet Access
HSN Hopping Sequence Number
HSPA High Speed Packet Access
HSS Home Subscriber Server
HSUPA High Speed Uplink Packet Access
HTTP Hyper Text Transfer Protocol
HTTPS Hyper Text Transfer Protocol Secure (https is http/1.1 over SSL, i.e. port 443)
I-Block Information Block
ICCID Integrated Circuit Card Identification
ICIC Inter-Cell Interference Coordination
ID Identity, identifier
IDFT Inverse Discrete Fourier Transform
IE Information element
IEEE Institute of Electrical and Electronics Engineers
IEI Information Element Identifier
IEIDL Information Element Identifier Data Length
IETF Internet Engineering Task Force
IF Infrastructure
IM Interference Measurement, Intermodulation, IP Multimedia
IMC IMS Credentials
IMEI International Mobile Equipment Identity
IMGI International mobile group identity
IMPI IP Multimedia Private Identity
IMPU IP Multimedia PUblic identity
IMS IP Multimedia Subsystem
IMSI International Mobile Subscriber Identity
IoT Internet of Things
IP Internet Protocol
Ipsec IP Security, Internet Protocol Security
IP-CAN IP-Connectivity Access Network
IP-M IP Multicast
IPv4 Internet Protocol Version 4
IPv6 Internet Protocol Version 6
IR Infrared
IRP Integration Reference Point
ISDN Integrated Services Digital Network
ISIM IM Services Identity Module
ISO International Organisation for Standardisation
ISP Internet Service Provider
IWF Interworking-Function
I-WLAN Interworking WLAN
K Constraint length of the convolutional code, USIM Individual key
kB Kilobyte (1000 bytes)
kbps kilo-bits per second
Kc Ciphering key
Ki Individual subscriber authentication key
KPI Key Performance Indicator
KQI Key Quality Indicator
KSI Key Set Identifier
ksps kilo-symbols per second
KVM Kernel Virtual Machine
L1 Layer 1 (physical layer)
L1-RSRP Layer 1 reference signal received power
L2 Layer 2 (data link layer)
L3 Layer 3 (network layer)
LAA Licensed Assisted Access
LAN Local Area Network
LBT Listen Before Talk
LCM LifeCycle Management
LCR Low Chip Rate
LCS Location Services
LI Layer Indicator
LLC Logical Link Control, Low Layer Compatibility
LPLMN Local PLMN
LPP LTE Positioning Protocol
LSB Least Significant Bit
LTE Long Term Evolution
LWA LTE-WLAN aggregation
LWIP LTE/WLAN Radio Level Integration with IPsec Tunnel
LTE Long Term Evolution
M2M Machine-to-Machine
MAC Medium Access Control (protocol layering context)
MAC Message authentication code (security/encryption context)
MAC-A MAC used for authentication and key agreement (TSG T WG3 context)
MAC-I MAC used for data integrity of signalling messages (TSG T WG3 context)
MANO Management and Orchestration
MBMS Multimedia Broadcast and Multicast Service
MBSFN Multimedia Broadcast multicast service Single Frequency Network
MCC Mobile Country Code
MCG Master Cell Group
MCOT Maximum Channel Occupancy Time
MCS Modulation and coding scheme
MDAF Management Data Analytics Function
MDAS Management Data Analytics Service
MDT Minimization of Drive Tests
ME Mobile Equipment
MeNB master eNB
MER Message Error Ratio
MGL Measurement Gap Length
MGRP Measurement Gap Repetition Period
MIB Master Information Block, Management Information Base
MIMO Multiple Input Multiple Output MLC Mobile Location Centre
MM Mobility Management
MME Mobility Management Entity
MN Master Node
MO Measurement Object, Mobile Originated
MPBCH MTC Physical Broadcast CHannel
MPDCCH MTC Physical Downlink Control CHannel
MPDSCH MTC Physical Downlink Shared CHannel
MPRACH MTC Physical Random Access CHannel
MPUSCH MTC Physical Uplink Shared Channel
MPLS MultiProtocol Label Switching
MS Mobile Station
MSB Most Significant Bit
MSC Mobile Switching Centre
MSI Minimum System Information, MCH Scheduling Information
MSID Mobile Station Identifier
MSIN Mobile Station Identification Number
MSISDN Mobile Subscriber ISDN Number
MT Mobile Terminated, Mobile Termination
MTC Machine-Type Communications
mMTC massize MTC, massive Machine-Type Communications
MU-MIMO Multi User MIMO
MWUS MTC wake-up signal, MTC WUS
NACK Negative Acknowledgement
NAI Network Access Identifier
NAS Non-Access Stratum, Non-Access Stratum layer
NCT Network Connectivity Topology
NEC Network Capability Exposure
NE-DC NR-E-UTRA Dual Connectivity
NEF Network Exposure Function
NF Network Function
NFP Network Forwarding Path
NFPD Network Forwarding Path Descriptor
NFV Network Functions Virtualization
NFVI NFV Infrastructure
NFVO NFV Orchestrator
NG Next Generation, Next Gen
NGEN-DC NG-RAN E-UTRA-NR Dual Connectivity
NM Network Manager
NMS Network Management System
N-PoP Network Point of Presence
NMIB, N-MIB Narrowband MIB
NPBCH Narrowband Physical Broadcast CHannel
NPDCCH Narrowband Physical Downlink Control CHannel
NPDSCH Narrowband Physical Downlink Shared CHannel
NPRACH Narrowband Physical Random Access CHannel
NPUSCH Narrowband Physical Uplink Shared CHannel
NPSS Narrowband Primary Synchronization Signal
NSSS Narrowband Secondary Synchronization Signal
NR New Radio, Neighbour Relation
NRF NF Repository Function
NRS Narrowband Reference Signal
NS Network Service
NSA Non-Standalone operation mode
NSD Network Service Descriptor
NSR Network Service Record
NSSAI Network Slice Selection Assistance Information
S-NNSAI Single-NSSAI
NSSF Network Slice Selection Function
NW Network
NWUS Narrowband wake-up signal, Narrowband WUS
NZP Non-Zero Power O&M Operation and Maintenance
ODU2 Optical channel Data Unit—type 2
OFDM Orthogonal Frequency Division Multiplexing
OFDMA Orthogonal Frequency Division Multiple Access
OOB Out-of-band
OPEX OPerating EXpense
OSI Other System Information
OSS Operations Support System
OTA over-the-air
PAPR Peak-to-Average Power Ratio
PAR Peak to Average Ratio
PBCH Physical Broadcast Channel
PC Power Control, Personal Computer
PCC Primary Component Carrier, Primary CC
PCell Primary Cell
PCI Physical Cell ID, Physical Cell Identity
PCEF Policy and Charging Enforcement Function
PCF Policy Control Function
PCRF Policy Control and Charging Rules Function
PDCP Packet Data Convergence Protocol, Packet Data Convergence Protocol layer
PDCCH Physical Downlink Control Channel
PDCP Packet Data Convergence Protocol
PDN Packet Data Network, Public Data Network
PDSCH Physical Downlink Shared Channel
PDU Protocol Data Unit
PEI Permanent Equipment Identifiers
PFD Packet Flow Description
P-GW PDN Gateway
PHICH Physical hybrid-ARQ indicator channel
PHY Physical layer
PLMN Public Land Mobile Network
PIN Personal Identification Number
PM Performance Measurement
PMI Precoding Matrix Indicator
PNF Physical Network Function
PNFD Physical Network Function Descriptor
PNFR Physical Network Function Record
POC PTT over Cellular
PP, PTP Point-to-Point
PPP Point-to-Point Protocol
PRACH Physical RACH
PRB Physical resource block
PRG Physical resource block group
ProSe Proximity Services, Proximity-Based Service
PRS Positioning Reference Signal
PS Packet Services
PSBCH Physical Sidelink Broadcast Channel
PSDCH Physical Sidelink Downlink Channel
PSCCH Physical Sidelink Control Channel
PSSCH Physical Sidelink Shared Channel
PSCell Primary SCell
PSS Primary Synchronization Signal
PSTN Public Switched Telephone Network
PT-RS Phase-tracking reference signal
PTT Push-to-Talk
PUCCH Physical Uplink Control Channel
PUSCH Physical Uplink Shared Channel
QAM Quadrature Amplitude Modulation
QCI QoS class of identifier
QCL Quasi co-location
QFI QoS Flow ID, QoS Flow Identifier
QoS Quality of Service
QPSK Quadrature (Quaternary) Phase Shift Keying
QZSS Quasi-Zenith Satellite System
RA-RNTI Random Access RNTI
RAB Radio Access Bearer, Random Access Burst RACH Random Access Channel
RADIUS Remote Authentication Dial In User Service
RAN Radio Access Network
RAND RANDom number (used for authentication)
RAR Random Access Response
RAT Radio Access Technology
RAU Routing Area Update
RB Resource block, Radio Bearer
RBG Resource block group
REG Resource Element Group
Rel Release
REQ REQuest
RF Radio Frequency
RI Rank Indicator
RIV Resource indicator value
RL Radio Link
RLC Radio Link Control, Radio Link Control layer
RLF Radio Link Failure
RLM Radio Link Monitoring
RLM-RS Reference Signal for RLM
RM Registration Management
RMC Reference Measurement Channel
RMSI Remaining MSI, Remaining Minimum System Information
RN Relay Node
RNC Radio Network Controller
RNL Radio Network Layer
RNTI Radio Network Temporary Identifier
ROHC RObust Header Compression
RRC Radio Resource Control, Radio Resource Control layer
RRM Radio Resource Management
RS Reference Signal
RSRP Reference Signal Received Power
RSRQ Reference Signal Received Quality
RSSI Received Signal Strength Indicator
RSU Road Side Unit
RSTD Reference Signal Time difference
RTP Real Time Protocol
RTS Ready-To-Send
RTT Round Trip Time
Rx Reception, Receiving, Receiver
S1AP S1 Application Protocol
S1-MME S1 for the control plane
S1-U S1 for the user plane
S-GW Serving Gateway
S-RNTI SRNC Radio Network Temporary Identity
S-TMSI SAE Temporary Mobile Station Identifier
SA Standalone operation mode
SAE System Architecture Evolution
SAP Service Access Point
SAPD Service Access Point Descriptor
SAPI Service Access Point Identifier
SCC Secondary Component Carrier, Secondary CC
SCell Secondary Cell
SC-FDMA Single Carrier Frequency Division Multiple Access
SCG Secondary Cell Group
SCM Security Context Management
SCS Subcarrier Spacing
SCTP Stream Control Transmission Protocol
SDAP Service Data Adaptation Protocol, Service Data Adaptation Protocol layer
SDL Supplementary Downlink
SDNF Structured Data Storage Network Function
SDP Service Discovery Protocol (Bluetooth related)
SDSF Structured Data Storage Function
SDU Service Data Unit
SEAF Security Anchor Function
SeNB secondary eNB
SEPP Security Edge Protection Proxy
SFI Slot format indication
SFTD Space-Frequency Time Diversity, SFN and frame timing difference
SFN System Frame Number
SgNB Secondary gNB
SGSN Serving GPRS Support Node
S-GW Serving Gateway
SI System Information
SI-RNTI System Information RNTI
SIB System Information Block
SIM Subscriber Identity Module
SIP Session Initiated Protocol
SiP System in Package
SL Sidelink
SLA Service Level Agreement
SM Session Management
SMF Session Management Function
SMS Short Message Service
SMSF SMS Function
SMTC SSB-based Measurement Timing Configuration
SN Secondary Node, Sequence Number
SoC System on Chip
SON Self-Organizing Network
SpCell Special Cell
SP-CSI-RNTI Semi-Persistent CSI RNTI
SPS Semi-Persistent Scheduling
SQN Sequence number
SR Scheduling Request
SRB Signalling Radio Bearer
SRS Sounding Reference Signal
SS Synchronization Signal
SSB Synchronization Signal Block, SS/PBCH Block
SSBRI SS/PBCH Block Resource Indicator, Synchronization Signal Block Resource Indicator
SSC Session and Service Continuity
SS-RSRP Synchronization Signal based Reference Signal Received Power
SS-RSRQ Synchronization Signal based Reference Signal Received Quality
SS-SINR Synchronization Signal based Signal to Noise and Interference Ratio
SSS Secondary Synchronization Signal
SST Slice/Service Types
SU-MIMO Single User MIMO
SUL Supplementary Uplink
TA Timing Advance, Tracking Area
TAC Tracking Area Code
TAG Timing Advance Group
TAU Tracking Area Update
TB Transport Block
TBS Transport Block Size
TBD To Be Defined
TCI Transmission Configuration Indicator
TCP Transmission Communication Protocol
TDD Time Division Duplex
TDM Time Division Multiplexing
TDMA Time Division Multiple Access
TE Terminal Equipment
TEID Tunnel End Point Identifier
TFT Traffic Flow Template
TMSI Temporary Mobile Subscriber Identity
TNL Transport Network Layer
TPC Transmit Power Control TPMI Transmitted Precoding Matrix Indicator
TR Technical Report
TRP, TRxP Transmission Reception Point
TRS Tracking Reference Signal
TRx Transceiver
TS Technical Specifications, Technical Standard
TTI Transmission Time Interval
Tx Transmission, Transmitting, Transmitter
U-RNTI UTRAN Radio Network Temporary Identity
UART Universal Asynchronous Receiver and Transmitter
UCI Uplink Control Information
UE User Equipment
UDM Unified Data Management
UDP User Datagram Protocol
UDSF Unstructured Data Storage Network Function
UICC Universal Integrated Circuit Card
UL Uplink
UM Unacknowledged Mode
UML Unified Modelling Language
UMTS Universal Mobile Telecommunications System
UP User Plane
UPF User Plane Function
URI Uniform Resource Identifier
URL Uniform Resource Locator
URLLC Ultra-Reliable and Low Latency
USB Universal Serial Bus
USIM Universal Subscriber Identity Module
USS UE-specific search space
UTRA UMTS Terrestrial Radio Access
UTRAN Universal Terrestrial Radio Access Network
UwPTS Uplink Pilot Time Slot
V2I Vehicle-to-Infrastructure
V2P Vehicle-to-Pedestrian
V2V Vehicle-to-Vehicle
V2X Vehicle-to-everything
VIM Virtualized Infrastructure Manager
VL Virtual Link,
VLAN Virtual LAN, Virtual Local Area Network
VM Virtual Machine
VNF Virtualized Network Function
VNFFG VNF Forwarding Graph
VNFFGD VNF Forwarding Graph Descriptor
VNFM VNF Manager
VoIP Voice-over-1P, Voice-over-Internet Protocol
VPLMN Visited Public Land Mobile Network
VPN Virtual Private Network
VRB Virtual Resource Block
WiMAX Worldwide Interoperability for Microwave Access
WLAN Wireless Local Area Network
WMAN Wireless Metropolitan Area Network
WPAN Wireless Personal Area Network
X2-C X2-Control plane
X2-U X2-User plane
XML eXtensible Markup Language
XRES EXpected user RESponse
XOR eXclusive OR
ZC Zadoff-Chu
ZP Zero Power In the present disclosure, "SMTC" refers to an SSB-based measurement timing configuration configured by SSB-MeasurementTimingConfiguration;

"SSB" refers to an SS/PBCH block; "field" may refer to individual contents of an information element; "information element" refers to a structural element containing a single or multiple fields;

a "Primary Cell" refers to the MCG cell, operating on the primary frequency, in which the UE either performs the initial connection establishment procedure or initiates the connection re-establishment procedure;

a "Primary SCG Cell" refers to the SCG cell in which the UE performs random access when performing the Reconfiguration with Sync procedure for DC operation;

a "Secondary Cell" refers to a cell providing additional radio resources on top of a Special Cell for a UE configured with CA;

a "Secondary Cell Group" refers to the subset of serving cells comprising the PSCell and zero or more secondary cells for a UE configured with DC;

a "Serving Cell" refers to the primary cell for a UE in RRC_CONNECTED not configured with CA/DC there is only one serving cell comprising of the primary cell;

a "serving cell" or "serving cells" refers to the set of cells comprising the Special Cell(s) and all secondary cells for a UE in RRC_CONNECTED configured with CA/DC; and a "Special Cell" refers to the PCell of the MCG or the PSCell of the SCG for DC operation; otherwise, the term "Special Cell" refers to the PCell.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A processor configured to:
receive a first configuration for a connected mode discontinuous reception (C-DRX) mode and a second configuration for receiving a wake-up indication in a first downlink control information (DCI) format on a physical downlink control channel (PDCCH), wherein the first DCI format includes a plurality of UE specific fields;
monitor, based at least in part on the second configuration, for the first DCI format during an OFF/non-active state of the C-DRX mode, wherein one or more fields of the plurality of UE specific fields of the first DCI format include a 1 bit indication to indicate whether or not there is a wake up indication, wherein a first value of the 1 bit indication corresponds to a wake up signal being detected, and wherein a second value of the 1 bit indication corresponds to a wake up signal not being detected; and
wake up, based at least in part on receiving the first DCI format with the 1 bit indication of the wake up indication, at a start of a next C-DRX ON duration associated with the first configuration, for downlink signal monitoring.

2. The processor of claim 1, wherein the first DCI format is a group-common DCI message comprising the plurality of UE specific fields.

3. The processor of claim 2, wherein the group-common DCI message is appended with a cyclic redundancy check (CRC) scrambled by a common Radio Network Temporary Identifier (RNTI).

4. The processor of claim 3, wherein the common RNTI is a Power saving RNTI (PSRNTI).

5. The processor of claim 1, wherein the processor is further configured to:
- operate in the C-DRX mode configured with the first configuration;
- receive the first DCI format in a first bandwidth part (BWP); and
- wake up, after receiving the first DCI format including the wake-up indication, in a second BWP, wherein the second BWP is different from the first BWP.

6. The processor of claim 5, wherein the first DCI format indicates a switch to the second BWP from the first BWP.

7. The processor of claim 6, wherein a bandwidth of the second BWP is smaller than a bandwidth of the first BWP.

8. The processor of claim 1, wherein a first value or a second value of the 1 bit indication respectively indicates whether or not there is the wake-up indication.

9. The processor of claim 1, wherein the processor refrains from starting a drx-onDurationTimer for the downlink signal monitoring at the start of the next C-DRX ON duration unless the wake-up indication is detected.

10. The processor of claim 9, wherein the processor is further configured to:
- receive the first DCI format, on the PDCCH in a common search space, including the 1 bit indication, wherein the 1 bit indication indicates the wake-up signal.

11. The processor of claim 1, wherein the processor is further configured to:
- receive a third configuration for a common search space for monitoring the first DCI format on the PDCCH, wherein the monitoring is performed according to the third configuration.

12. A method, comprising:
- transmitting to a user equipment (UE), a first configuration for a connected mode discontinuous reception (C-DRX) mode and a second configuration for a wake-up indication to be transmitted in a first downlink control information (DCI) format on a physical downlink control channel (PDCCH), wherein the first DCI format includes a plurality of UE specific fields, wherein one or more fields of the plurality of UE specific fields of the first DCI format include a 1 bit indication to indicate whether or not there is a wake-up indication, wherein a first value of the 1 bit indication corresponds to a wake up signal being detected, and wherein a second value of the 1 bit indication corresponds to a wake up signal not being detected; and
- transmitting the first DCI format to the UE on the PDCCH during a scheduled OFF/non-active state of the C-DRX mode associated with the first configuration for the UE, wherein the wake-up indication indicates for the UE to wake up at a start of a next C-DRX ON duration for downlink signal monitoring.

13. The method of claim 12, wherein the first DCI format is a group-common DCI message comprising the plurality of UE specific fields.

14. The method of claim 12, further comprising:
- transmitting the first DCI format, on the PDCCH in a common search space, including the 1 bit indication, wherein the 1 bit indication indicates the wake-up signal.

15. The method of claim 12, further comprising:
- transmitting, to the UE, a third configuration for a common search space for monitoring the first DCI format on the PDCCH.

16. A method, comprising:
- receiving a first configuration for a connected mode discontinuous reception (C-DRX) mode and a second configuration for receiving a wake-up indication in a first downlink control information (DCI) format on a physical downlink control channel (PDCCH), wherein the first DCI format includes a plurality of UE specific fields;
- monitoring, based at least in part on the second configuration, for the first DCI format during an OFF/non-active state of the C-DRX mode, wherein one or more fields of the plurality of UE specific fields of the first DCI format include a 1 bit indication to indicate whether or not there is a wake up indication, wherein a first value of the 1 bit indication corresponds to a wake up signal being detected, and wherein a second value of the 1 bit indication corresponds to a wake up signal not being detected; and
- waking up, based at least in part on receiving the first DCI format with the 1 bit indication of the wake up indication, at a start of a next C-DRX ON duration associated with the first configuration, for downlink signal monitoring.

17. The method of claim 16, further comprising:
- receiving a third configuration for a common search space for monitoring the first DCI format on the PDCCH, wherein the monitoring is performed according to the third configuration.

18. The method of claim 16, wherein the first DCI format is a group-common DCI message comprising the plurality of UE specific fields.

19. The method of claim 16, further comprising:
- operating in the C-DRX mode configured with the first configuration; and
- receive the first DCI format, on the PDCCH in a common search space, including the 1 bit indication, wherein the 1 bit indication indicates the wake-up signal.

20. The method of claim 16, further comprising:
- refraining from starting a drx-onDurationTimer for the downlink signal monitoring at the start of the next C-DRX ON duration unless the wake-up indication is detected.

* * * * *